(12) United States Patent
Son et al.

(10) Patent No.: US 10,826,799 B2
(45) Date of Patent: Nov. 3, 2020

(54) APPARATUS FOR PROVIDING CLOUD SERVICE BASED ON CLOUD SERVICE BROKERAGE AND METHOD THEREOF

(71) Applicant: ELECTRONICS AND TELECOMMUNICATIONS RESEARCH INSTITUTE, Daejeon (KR)

(72) Inventors: Seok-Ho Son, Daejeon (KR); Myeong-Hoon Oh, Daejeon (KR); Dong-Jae Kang, Daejeon (KR); Byoung-Seob Kim, Sejong (KR); Song-Woo Sok, Daejeon (KR); Byeong-Thaek Oh, Sejong (KR); Young-Woo Jung, Daejeon (KR); Hyun-Hwa Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/168,683

(22) Filed: Oct. 23, 2018

(65) Prior Publication Data
US 2019/0132222 A1 May 2, 2019

(30) Foreign Application Priority Data
Oct. 27, 2017 (KR) .................. 10-2017-0141487

(51) Int. Cl.
*H04L 12/24* (2006.01)
*H04L 12/911* (2013.01)
*H04L 29/08* (2006.01)

(52) U.S. Cl.
CPC ...... *H04L 41/5054* (2013.01); *H04L 41/0896* (2013.01); *H04L 41/5009* (2013.01);
(Continued)

(58) Field of Classification Search
CPC .............. H04L 41/5009; H04L 41/5041; H04L 41/5054
See application file for complete search history.

(56) References Cited

U.S. PATENT DOCUMENTS 10,009,425 B1 * 6/2018 Shavell ............... H04L 67/2809
2011/0213712 A1 * 9/2011 Hadar .................... G06Q 30/08
705/80
(Continued)

FOREIGN PATENT DOCUMENTS

| KR | 10-2013-0084796 A | 7/2013 |
| KR | 10-2016-0100713 A | 8/2016 |

(Continued)

OTHER PUBLICATIONS

Johan Tordsson et al., "Cloud brokering mechanisms for optimized placement of virtual machines across multiple providers," Future Generation Computer Systems, 2012, pp. 358-367, vol. 28, Issue 2, Elsevier B.V.

*Primary Examiner* — Jeong S Park

(57) ABSTRACT

Disclosed herein are an apparatus and method for providing a cloud service based on cloud service brokerage. The method includes receiving, by a cloud service broker, a first request for a cloud service from a cloud service client, wherein the cloud service broker is connected with the multiple cloud-computing systems; providing, by the cloud service broker, a cloud service brokerage based on cloud services of the cloud-computing systems, wherein the cloud service brokerage enables the cloud service complying with the first request to be provided to the cloud service client; and monitoring, by the cloud service broker, a service level of the cloud service during provision of the cloud service and controlling, by the cloud service broker, the cloud service such that the service level satisfies conditions of the first request.

7 Claims, 36 Drawing Sheets

(52) U.S. Cl.
CPC ...... *H04L 41/5025* (2013.01); *H04L 41/5041* (2013.01); *H04L 41/5096* (2013.01); *H04L 47/70* (2013.01); *H04L 67/2809* (2013.01)

(56) References Cited

U.S. PATENT DOCUMENTS

| | | | |
|---|---|---|---|
| 2013/0042003 A1* | 2/2013 | Franco | G06F 9/45558 709/226 |
| 2013/0066940 A1* | 3/2013 | Shao | H04L 67/1025 709/201 |
| 2014/0285836 A1* | 9/2014 | Muthukrishnan | G06F 3/1231 358/1.15 |
| 2015/0100696 A1 | 4/2015 | Lee et al. | |
| 2015/0134485 A1* | 5/2015 | Kim | G06Q 30/0623 705/26.41 |
| 2016/0364792 A1 | 12/2016 | Kang et al. | |
| 2017/0041384 A1 | 2/2017 | Son et al. | |
| 2018/0018195 A1* | 1/2018 | Kim | H04L 41/0813 |
| 2019/0026139 A1* | 1/2019 | Park | H04L 67/1012 |

FOREIGN PATENT DOCUMENTS

| | | |
|---|---|---|
| KR | 10-2016-0147573 A | 12/2016 |
| KR | 10-2017-0005274 A | 1/2017 |
| KR | 10-2017-0017049 A | 2/2017 |

\* cited by examiner

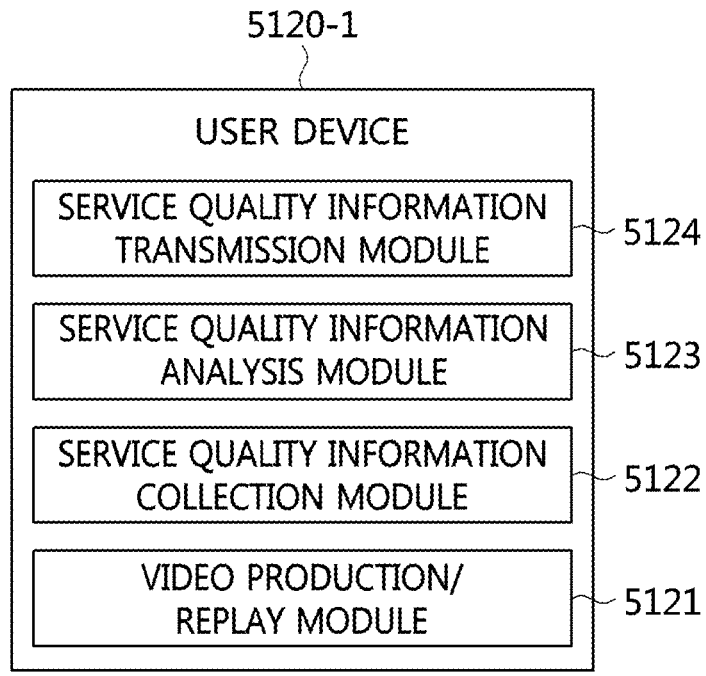

FIG. 34

| SERVICE TYPE | QUALITY ATTRIBUTE | CRITERIA |
|---|---|---|
| VIDEO PRODUCTION | BANDWIDTH FOR WRITE SERVICE | WriteServiceBandwidth = WriteTotalStreamSize / WriteServiceTime |
| VIDEO REPLAY | RESPONSE TIME OF READ SERVICE | ReadServiceResponseTime = DataFirstArrivalTime - ReadServiceRequestTime |
| | BANDWIDTH FOR READ SERVICE | ReadServiceBandwidth = ReadTotalStreamSize / ReadServiceTime |

FIG. 35

| QUALITY CRITERIA | | MIGRATION OF STREAMING SERVER | REPLICATION OF STREAMING SERVER | EXTENSION OF I/O PERFORMANCE OF STREAMING SERVER USING DATA REPLICATION |
|---|---|---|---|---|
| USER DEVICE QUALITY STATE | STREAMING SERVER QUALITY STATE | | | |
| $RS\_RT_{userDevice}(U_j) >$ Max Value AND $RW\_AB_{userDevice}(U_j) <$ Min Value | $RW\_AB_{streamServer}(S_j) <$ Max Value | V | | |
| $RW\_AB_{userDevice}(U_j) <$ Min Value | $RW\_AB_{streamServer}(S_j) >$ Max Value AND $UserNum_{streamServer}(S_j) >$ Max Value | | V | |
| $RW\_AB_{userDevice}(U_j) <$ Min Value | $RW\_AB_{streamServer}(S_j) >$ Max Value AND $UserNum_{streamServer}(S_j) <$ Max Value | | | V |

FIG. 38

APPARATUS FOR PROVIDING CLOUD SERVICE BASED ON CLOUD SERVICE BROKERAGE AND METHOD THEREOF

CROSS REFERENCE TO RELATED APPLICATION

This application claims the benefit of Korean Patent Application No. 10-2017-0141487, filed Oct. 27, 2017, which is hereby incorporated by reference in its entirety into this application.

BACKGROUND OF THE INVENTION

1. Technical Field

The present invention relates to a cloud brokerage apparatus based on multiple cloud-computing systems and an apparatus and method for providing a cloud service using the cloud brokerage apparatus.

2. Description of the Related Art

Recently, an increase in the number of newly constructed cloud data centers and the accelerated emergence of various application services based on the cloud are driving the need to deploy and manage services across multiple clouds, which leads to the proliferation of cloud service brokerage platforms.

User requirements for application services in a cloud environment have become more diverse, but it is not easy to provide various application services or to find the optimal application service that meets particular requirements. Also, difficult application service configurations, time-consuming service deployment, and different service environments of heterogeneous clouds impede the adoption of cloud service.

Therefore, it is necessary to provide an environment in which various application services based on a cloud may be easily accessed and in which application services may continue to be extended. Also, required is a new cloud service brokerage method through which a desired service may be quickly provided by simplifying the complicated configuration and deployment of the service.

SUMMARY OF THE INVENTION

The present invention intends to provide various cloud services that meet user requirements by offering intermediation for a plurality of heterogeneous cloud services that are geographically dispersed.

Also, the present invention intends to provide a method and apparatus for cloud service brokerage through which the optimal cloud service provider, which may provide a service complying with the requirements of a cloud service consumer, may be selected and offered in an environment in which multiple cloud service providers provide heterogeneous cloud-computing systems.

In order to accomplish the above objects, a method of providing a cloud brokerage service based on multiple cloud-computing systems according to an embodiment of the present invention includes receiving, by a cloud service broker, a first request for a cloud service from a cloud service client, wherein the cloud service broker is connected with the multiple cloud-computing systems; providing, by the cloud service broker, a cloud service brokerage based on cloud services of the cloud-computing systems, wherein the cloud service brokerage enables the cloud service complying with the first request to be provided to the cloud service client; and monitoring, by the cloud service broker, a service level of the cloud service during provision of the cloud service and controlling, by the cloud service broker, the cloud service such that the service level satisfies conditions of the first request.

Here, the method of providing a cloud brokerage service based on multiple cloud-computing systems may include transmitting, by the cloud service broker, a second request for additional cloud resources for the cloud service to one or more cloud-computing systems of the multiple cloud-computing systems when the cloud service client sends the second request for the additional cloud resources.

Here, the cloud service broker may validate a service status pertaining to whether or not the cloud service is provided in accordance with the first or second request for the cloud service.

Here, the cloud service broker may take remedies in terms of a service level agreement when the cloud service fails to meet the first or second request.

Also, an apparatus for providing a cloud brokerage service based on multiple cloud-computing systems according to an embodiment of the present invention includes a receiver for receiving a first request for a cloud service from a cloud service client; and a controller for providing a cloud service brokerage based on cloud services of the cloud-computing systems, monitoring a service level of the cloud service during provision of the cloud service, and controlling the cloud service such that the service level satisfies conditions of the first request, wherein the cloud service brokerage enables the cloud service complying with the first request to be provided to the cloud service client.

Here, when the cloud service client sends a second request for additional cloud resources for the cloud service, the controller may transmit the second request for the additional cloud resources to one or more cloud-computing systems of the multiple cloud-computing systems.

Here, the controller may validate a service status pertaining to whether or not the cloud service is provided in accordance with the first or second request for the cloud service.

Here, the controller may take remedies in terms of a service level agreement when the cloud service fails to meet the first or second request.

Also, there is provided a medium for storing a program that provides a cloud brokerage service based on multiple cloud-computing systems according to an embodiment of the present invention, the program including a receiving module for receiving a first request for a cloud service from a cloud service client; and a control module for providing a cloud service brokerage based on cloud services of the cloud-computing systems, monitoring a service level of the cloud service during provision of the cloud service, and controlling the cloud service such that the service level satisfies conditions of the first request, wherein the cloud service brokerage enables the cloud service complying with the first request to be provided to the cloud service client.

BRIEF DESCRIPTION OF THE DRAWINGS

The above and other objects, features and advantages of the present invention will be more clearly understood from the following detailed description taken in conjunction with the accompanying drawings, in which:

FIG. 34 is a block diagram that shows an example of the user device illustrated in FIG. 32;

FIG. 35 is a view that shows an example of a method for calculating the quality of service provided to a user device according to the present invention;

FIG. 38 is a view that shows an example of a process for selecting a quality assurance activity according to the present invention;

DESCRIPTION OF THE PREFERRED EMBODIMENTS

Hereinafter, embodiments of the present invention will be described in detail with reference to the accompanying drawings.

Repeated descriptions and descriptions of known functions and configurations which have been deemed to make the gist of the present invention unnecessarily obscure will be omitted below. Also, the terms used herein are defined in consideration of functions of the present invention, and may be changed according to the custom or intention of users or operators. Therefore, the definitions of the terms should be understood according to the overall disclosures set forth herein.

Figure 1:
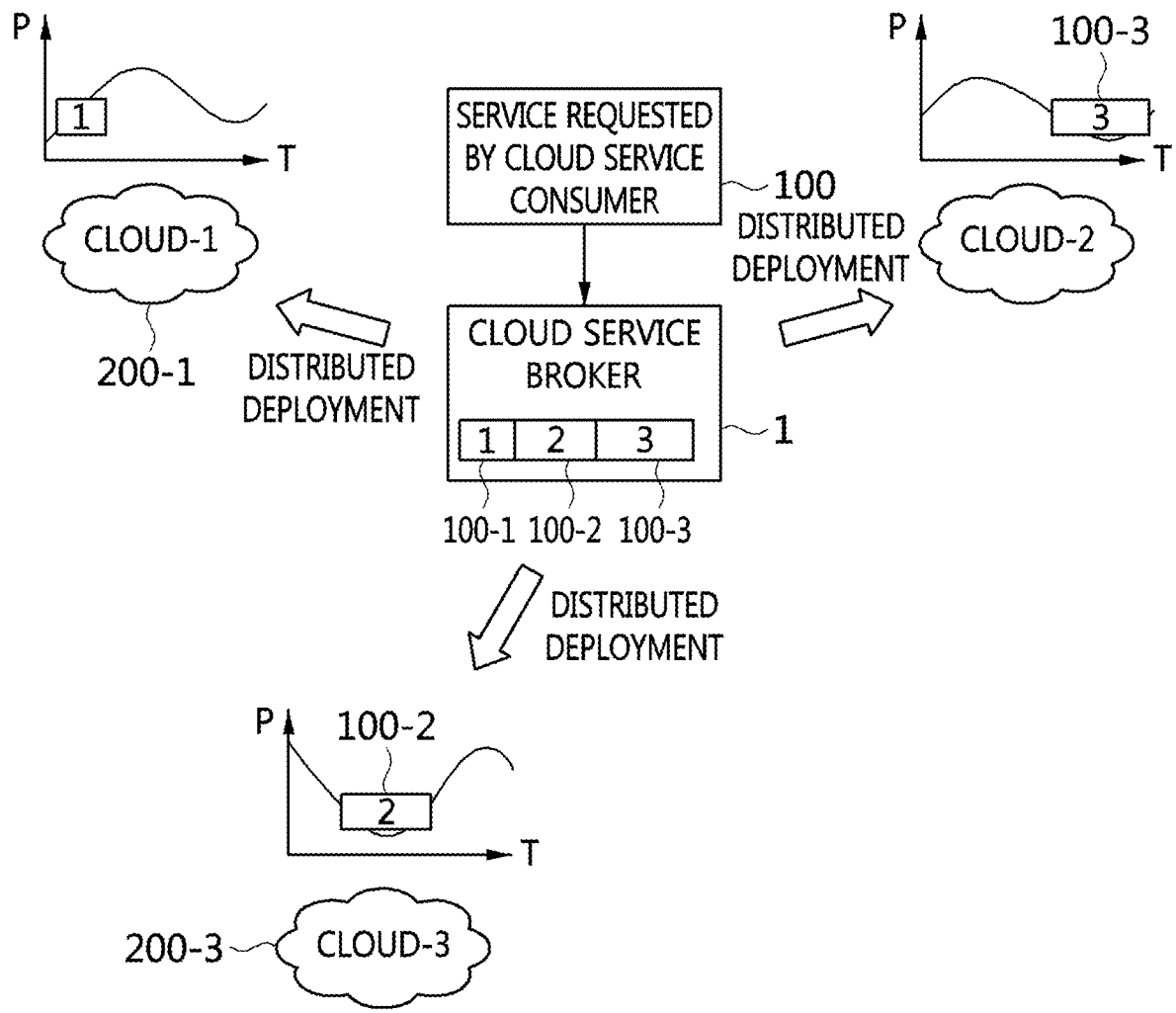
FIG. 1 is a concept diagram for explaining cloud service segmentation and deployment by a cloud service broker according to an embodiment of the present invention.

FIG. 1 is a concept diagram for explaining cloud service segmentation and deployment by a cloud service broker according to an embodiment of the present invention.

Generally, a cloud service provider provides a cloud service at a fixed price or a price that varies over time. Regardless of the pricing strategy used by the cloud service provider, the conventional methods are configured such that a cloud service broker may assign a single cloud service to a single cloud.

However, geographically dispersed clouds have different conditions and policies, and thus the pricing thereof varies by region. Therefore, a cloud service broker 1 according to an embodiment does not assign a cloud service to a single cloud, but segments the cloud service into multiple cloud services and distributes the segmented cloud services across multiple clouds, whereby the multiple distributed clouds may be used simultaneously.

For example, in order to make the best use of the advantages of the multiple distributed clouds, the cloud service broker 1 dynamically distributes the cloud service 100 requested by a cloud service consumer across multiple clouds 200-1, 200-2 and 200-3, as shown in FIG. 1. Here, the cloud service broker 1 segments the cloud service 100, requested by the cloud service consumer, into multiple cloud services 100-1, 100-2 and 100-3 so as to reduce the price (p) of the cloud service over time (t) to the minimum, and assigns the segmented cloud services 100-1, 100-2 and 100-3 to the clouds 200-1, 200-3 and 200-2, which are mapped to the segmented cloud services 100-1, 100-2 and 100-3 depending on the price. Accordingly, the cloud service broker 1 may provide the cloud service to the cloud service consumer at a lower price.

Figure 2:
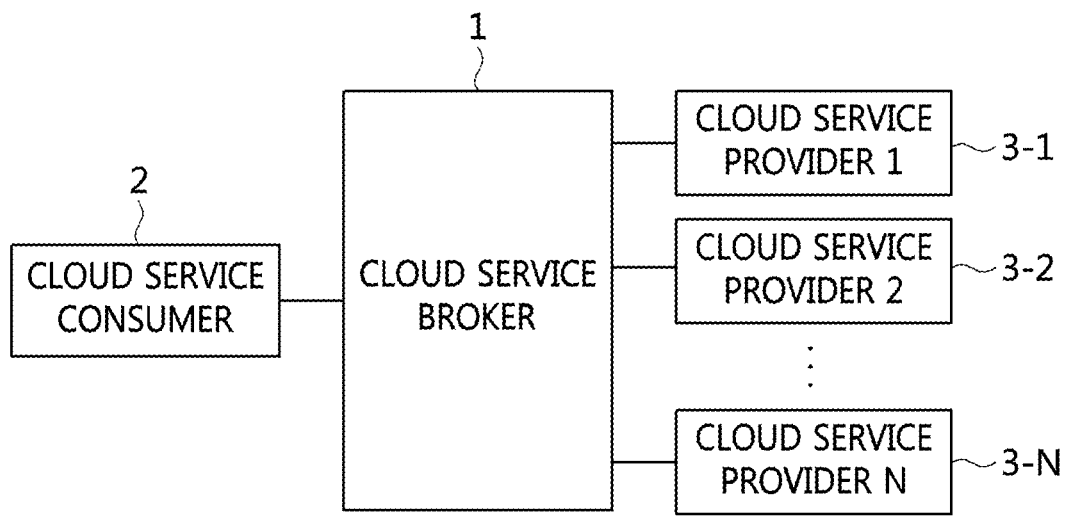
FIG. 2 is a block diagram of a cloud service system according to an embodiment of the present invention.

FIG. 2 is a block diagram of a cloud service system according to an embodiment of the present invention.

Referring to FIG. 2, a cloud service system includes a cloud service consumer 2, cloud service providers 3-1 to 3-n, and a cloud service broker 1 for mediating between the cloud service consumer 2 and the cloud service providers 3-1 to 3-n.

The cloud service providers 3-1 to 3-n for providing cloud services are geographically dispersed. When the cloud service consumer 2 requests a cloud service from the cloud service broker 1, the cloud service broker 1 selects a cloud that meets the requirements of the cloud service consumer 2 and requests the selected cloud to actually provide the requested cloud service.

The cloud service broker 1 may segment the cloud service requested by the cloud service consumer 2 into multiple cloud services. Then, the cloud service broker 1 distributes the segmented cloud services across multiple clouds. Each of the multiple clouds provides the segmented cloud service assigned thereto. Here, the single cloud service, requested by the cloud service consumer 2, may be segmented into multiple cloud services based on service prices. Then, the segmented cloud services may be distributed across the multiple clouds.

Figure 3:
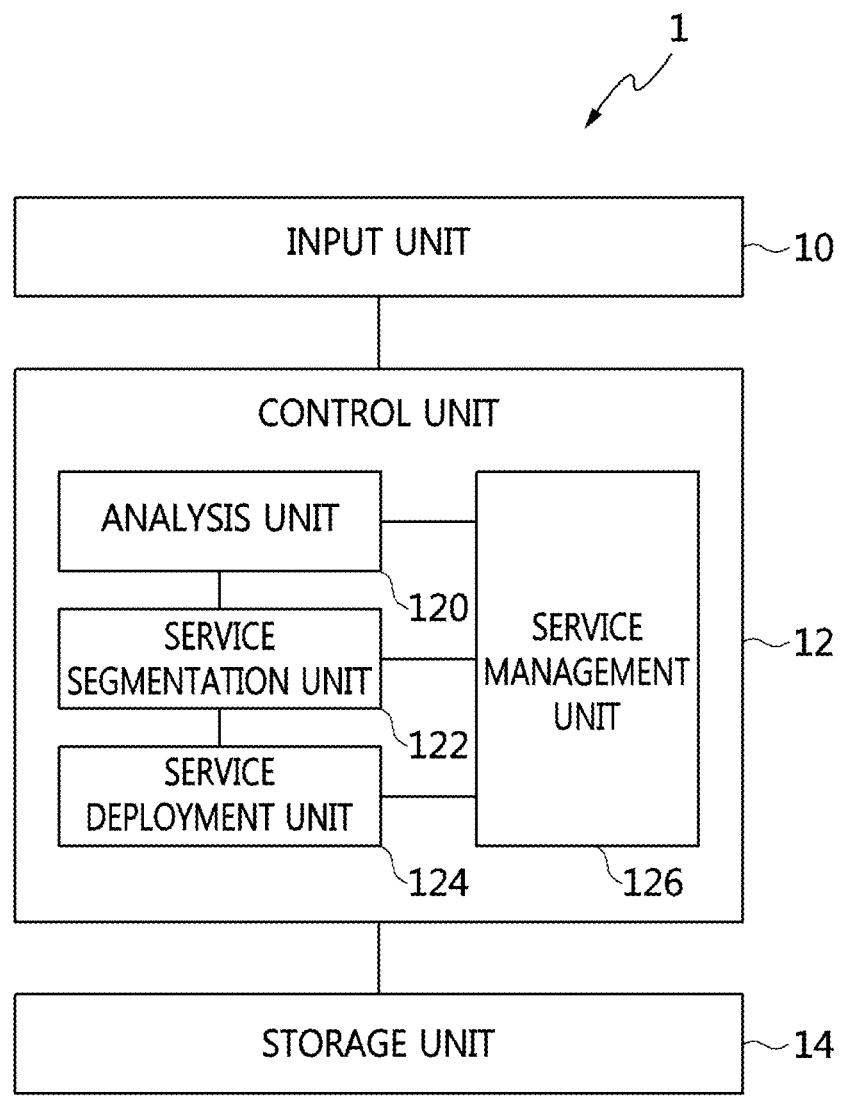
FIG. 3 is a block diagram that shows the components of a cloud service broker according to an embodiment of the present invention.

FIG. 3 is a block diagram that shows the components of a cloud service broker according to an embodiment of the present invention.

Referring to FIG. 3, a cloud service broker 1 includes an input unit 10, a control unit 12, and a storage unit 14. The control unit 12 may include an analysis unit 120, a service segmentation unit 122, a service deployment unit 124, and a service management unit 126.

The input unit 10 collects information about clouds of all registered cloud service providers. The information about clouds may include the type of cloud service provided by each cloud, the price thereof, a Service Level Agreement (SLA), and the like. Also, the input unit 10 receives a request for cloud service from a cloud service consumer. Here, when it receives a request for cloud service from a cloud service consumer, the input unit 10 may also receive requirements, such as the desired price for the requested cloud service, the service type, the performance level, and the like.

The analysis unit 120 analyzes the collected information about clouds and the requirements for the requested cloud service, which are acquired by the input unit 10. The service segmentation unit 122 segments the requested cloud service into multiple cloud services for respective time sections using the result of analysis performed by the analysis unit 120. The service segmentation unit 122 according to an embodiment selects an available cloud group, which is a group of clouds that may provide the requested cloud service. Then, the service segmentation unit 122 compares the service prices of the clouds included in the available cloud group and segments the requested cloud service into cloud services, each of which may be provided at the lowest price in each time section. Then, the service segmentation unit 122 selects the clouds, each of which offers the lowest service price in each time section, as the clouds to be mapped to the segmented cloud services.

The service deployment unit 124 assigns the multiple cloud services segmented by the service segmentation unit 122 to the respective clouds using the mapping information. The service management unit 126 provides a single address to the cloud service consumer in order to make the cloud services segmented by the service segmentation unit 122 appear to the cloud service consumer as a single cloud service. The storage unit 14 stores the information received by the input unit 10, the results of analysis performed by the analysis unit 120, and information required for the operation of the control unit 12.

Figure 4:
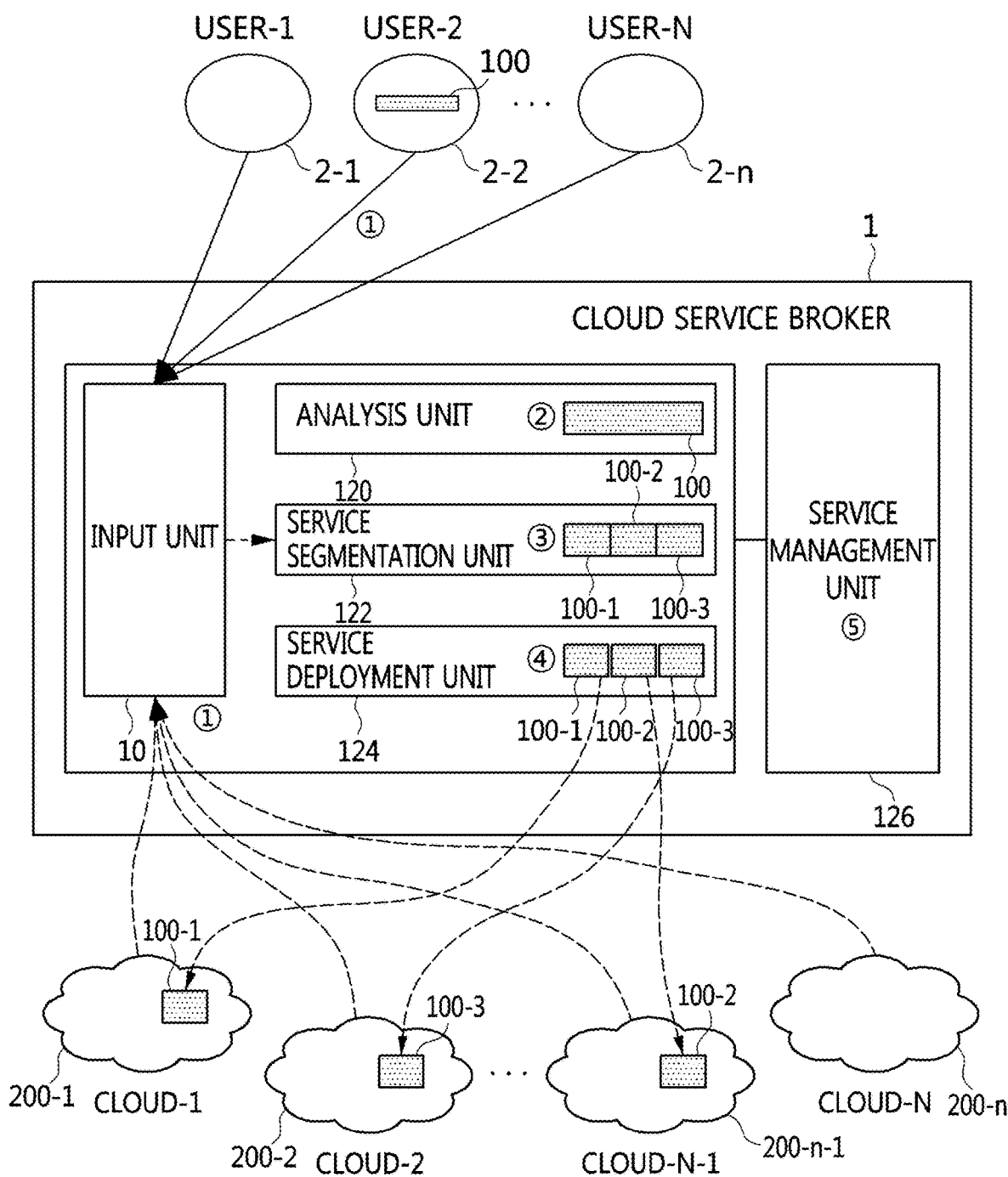
FIG. 4 is a reference view for explaining a cloud service segmentation process and a distributed deployment process performed by a cloud service broker according to an embodiment of the present invention.

FIG. 4 is a reference view for explaining a cloud service segmentation process and a distributed deployment process performed by a cloud service broker according to an embodiment of the present invention.

Referring to FIG. 4, first, the input unit 10 obtains information about all clouds from cloud service providers and receives a request for cloud service from a cloud service consumer 2-2 (①). The information about clouds may include the type of cloud service provided by each cloud, the price of the cloud service, a Service Level Agreement (SLA), and the like. When it receives the request for cloud service from the cloud service consumer 2-2, the input unit 10 may receive a desired price for the requested cloud service, a service type, a performance level, and the like along with the request.

Then, the analysis unit 120 analyzes the information about clouds and the requirements for the requested cloud service, which are acquired by the input unit 10, (②). Then, the service segmentation unit 122 segments the requested cloud service into multiple cloud services based on time sections (③) using the result of analysis performed by the analysis unit 120. For example, the requested cloud service 100 may be segmented into three cloud services 100-1, 100-2 and 100-3, as shown in FIG. 4.

Then, the service deployment unit 124 distributes the multiple cloud services, segmented by the service segmentation unit 122, across clouds 200-1 to 200-n (④) using mapping information. For example, the segmented cloud service 1 100-1, the segmented cloud service 2 100-2, and the segmented cloud service 3 100-3 may be assigned to cloud-1 200-1, cloud-N-1 200-n-1, and cloud-2 200-2, respectively, as shown in FIG. 4.

Then, the service management unit 126 provides a single address to the cloud service consumer (⑤) in order to make the cloud services segmented by the service segmentation unit 122 appear to the cloud service consumer as a single cloud service.

Figure 5:
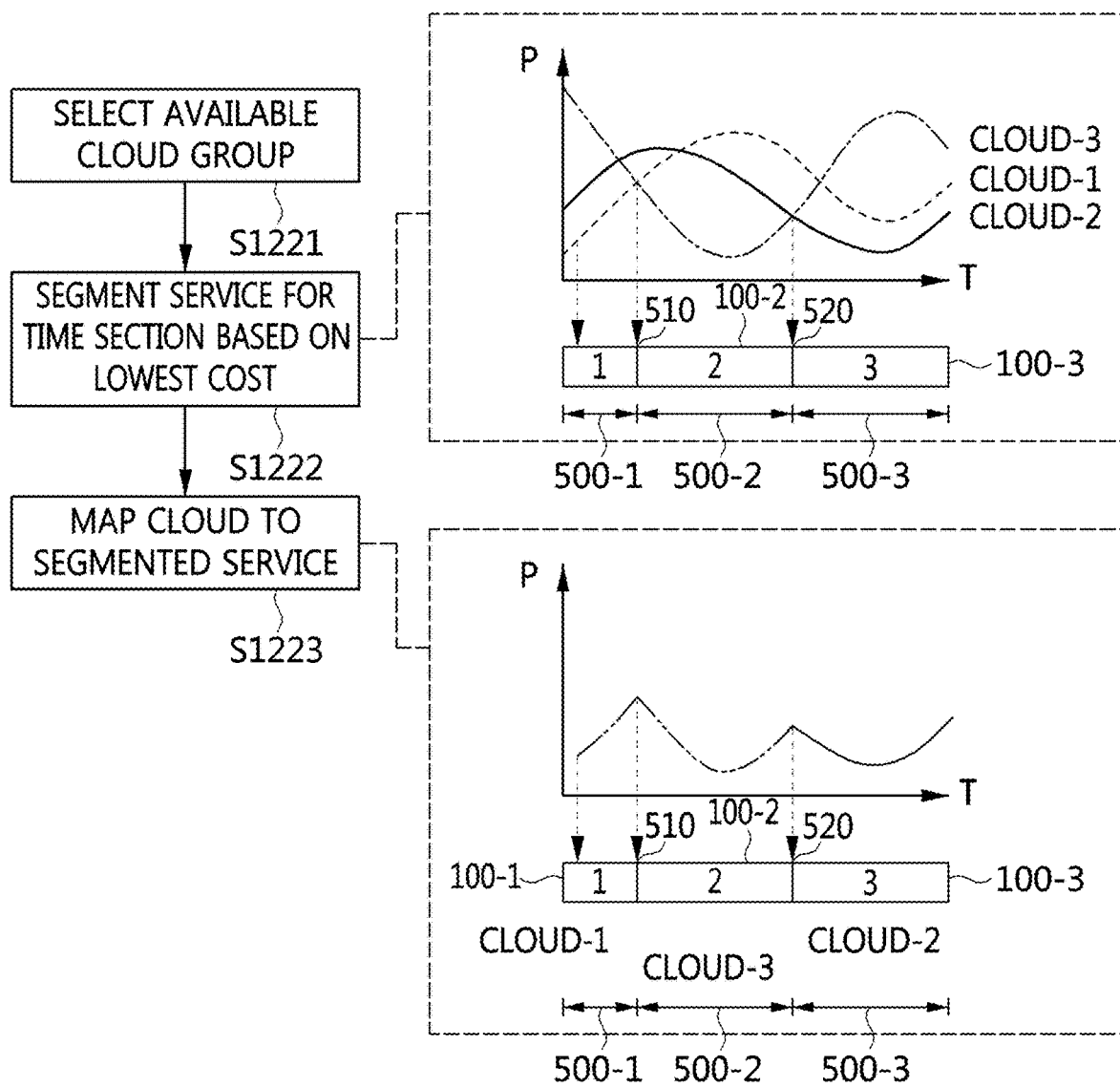
FIG. 5 is a reference view that shows a service segmentation process performed by a service segmentation unit and an example of service segmentation using a graph of a service price (P) of each cloud over time (t) according to an embodiment of the present invention.

FIG. 5 is a reference view that shows a service segmentation process performed by a service segmentation unit and an example of service segmentation using a graph of a service price (P) of each cloud over time (t) according to an embodiment of the present invention.

Referring to FIG. 5, the service segmentation unit 122 first selects an available cloud group, which is a group of clouds that may provide the cloud service requested by a cloud service consumer, at step S1221. The service segmentation unit 122 may select the available cloud group by analyzing information about clouds and requirements of the cloud service consumer. For example, the service segmentation unit 122 may select the available cloud group using the information about clouds and a Service Level Agreement (SLA) with the cloud service consumer.

Then, the service segmentation unit 122 compares the service prices of the clouds included in the available cloud group and segments the requested cloud service into cloud services for time sections, each of which may be provided at the lowest service price in each time section, at step S1222. Here, the service segmentation unit 122 compares the service prices of the clouds with each other, selects the cloud that offers the lowest service price at a predetermined time (t), and arranges the cloud service provided by the selected cloud until it finds another cloud offering a lower service price. The service segmentation unit 122 segments the requested cloud service at the point at which the service price lines of neighboring clouds intersect each other, and replaces the cloud with another. The above-described segmentation process is repeated until the total length of the segmented services becomes the total length of the requested cloud service.

Describing the above process with reference to the graph of the service price (P) of each cloud over time (t) in FIG. 5, it is assumed that the clouds included in the available cloud group are cloud-1, cloud-2, and cloud-3. Here, the requested cloud service is segmented into cloud services, each of which is provided by the cloud that offers the lowest cloud service price in each time section, among the clouds included in the available cloud group. For example, cloud service 1 100-1 provided by cloud-1 is selected in the first time section 500-1, cloud service 2 100-2 provided by cloud-3 is selected in the second time section 500-2, and cloud service 3 100-3 provided by cloud-2 is selected in the third time section 500-3. Accordingly, the requested cloud service may be segmented into cloud service 1 100-1, cloud service 2 100-2, and cloud service 3 100-3 in a time-ordered sequence. The above-described segmentation process is repeated until the total length of the segmented services becomes the total length of the requested cloud service. The point at which the cloud service is segmented is the point at which the service price lines of neighboring clouds intersect each other. For example, the segmentation point 510 between the first time section 500-1 and the second time section 500-2 and the segmentation point 520 between the second time section 500-2 and the third time section 500-3 are such points. Then, clouds are arranged for the segmented cloud services in respective time sections at step S1223. For example, cloud-1 is arranged for the cloud service 1 100-1 in the first time section 500-1, cloud-3 is arranged for the cloud service 2 100-2 in the second time section 500-2, and cloud-2 is arranged for the cloud service 3 100-3 in the third time section 500-3.

Figure 6:
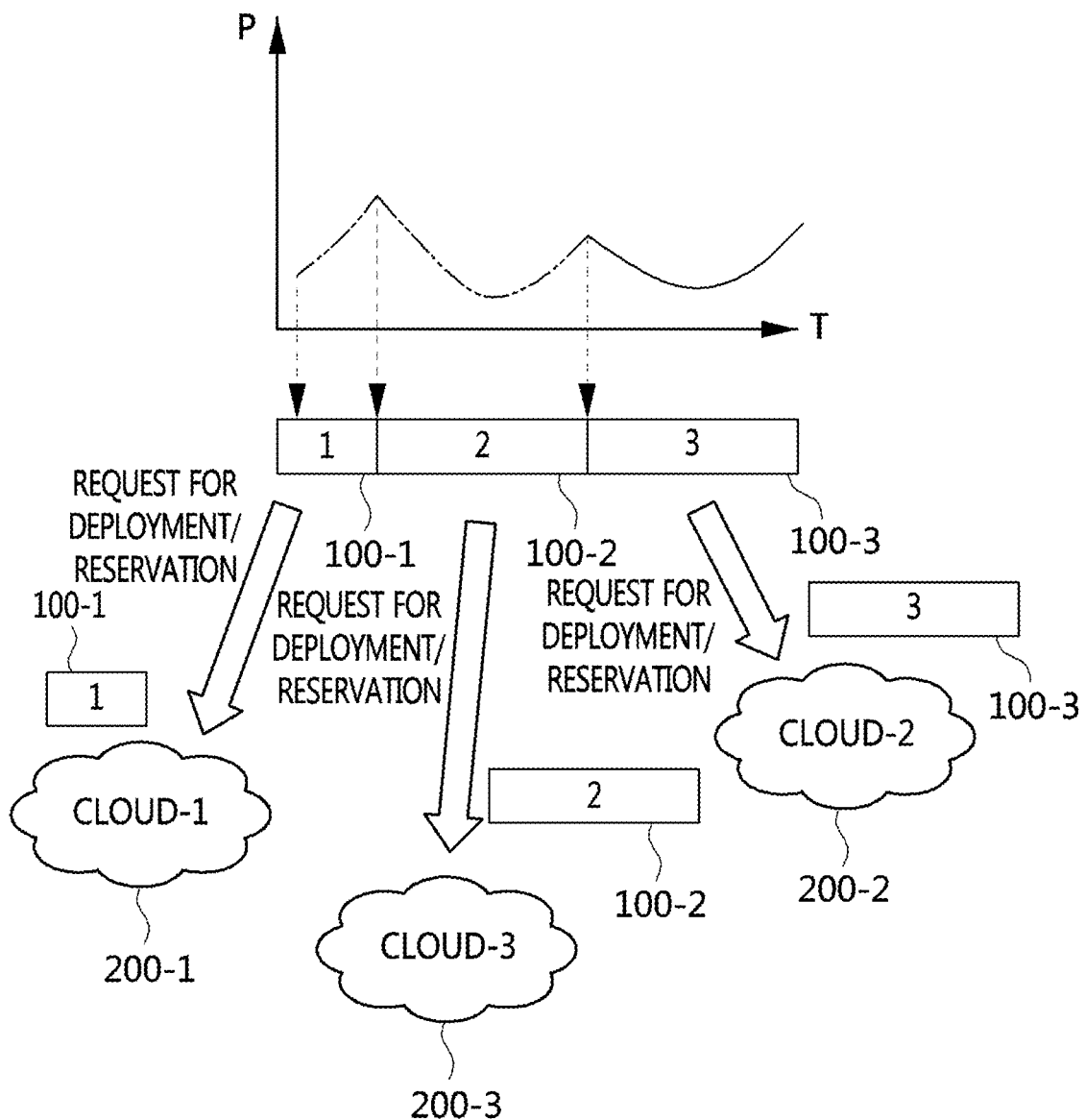
FIG. 6 is a reference view for explaining a service deployment process performed by a service deployment unit according to an embodiment of the present invention.

FIG. 6 is a reference view for explaining a service deployment process performed by a service deployment unit according to an embodiment of the present invention.

Referring to FIG. 5 and FIG. 6, the service deployment unit 124 may request the selected clouds to deploy the segmented services therein. Here, the request may be made at the time t at which the cloud service is run. Alternatively, if the cloud supports a reservation system, a request for a reservation for running a cloud service at the service time may be made. For all of the segmented cloud services, the request for deploying the segmented cloud service is sent to each of the selected clouds, whereby the process of deploying the entire cloud service is completed. For example, cloud-1 200-1 is requested to deploy cloud service 1 100-1 therein, cloud-3 200-3 is requested to deploy cloud service 2 100-2 therein, and cloud-2 200-2 is requested to deploy cloud service 3 100-3 therein, as shown in FIG. 6. The above-described embodiment is merely for helping understanding of the present invention, and the present invention is not limited thereto.

Figure 7:
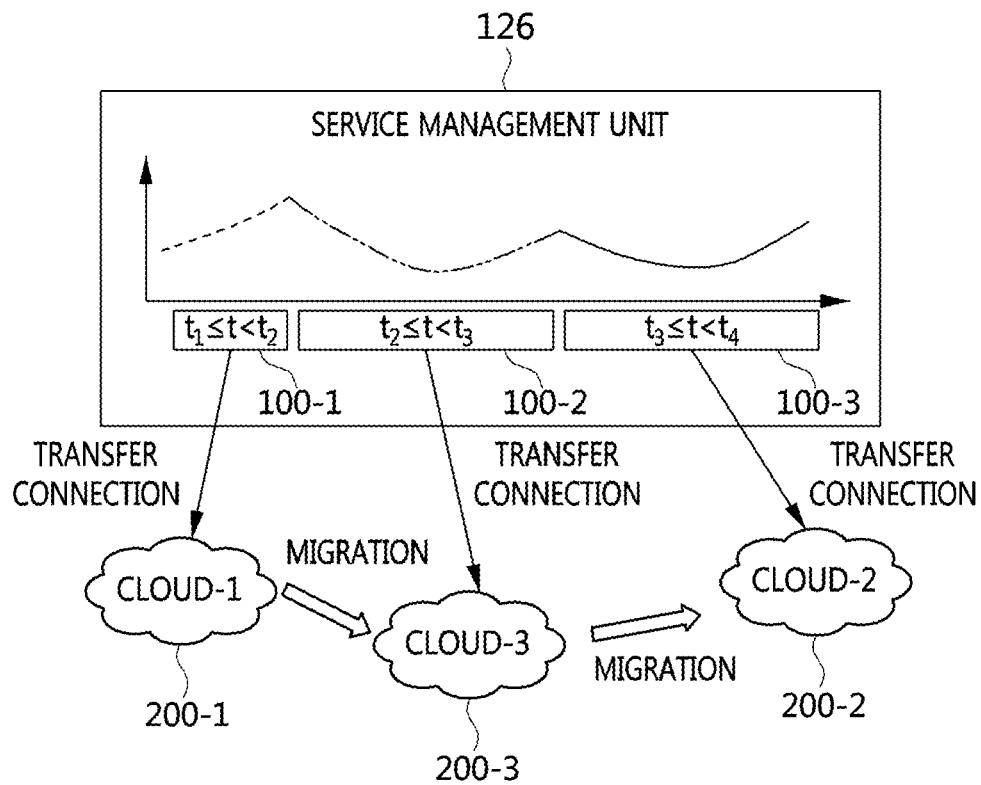
FIG. 7 is a reference view for explaining a service access management process performed by a service access management unit according to an embodiment of the present invention.

FIG. 7 is a reference view for explaining a service access management process performed by a service management unit according to an embodiment of the present invention.

Referring to FIG. 7, the service management unit 126 provides a single address to a cloud service consumer in order to make the segmented cloud services appear to the cloud service consumer as a single cloud service. As illustrated in FIG. 7, the cloud service consumer connects to the cloud service using the single address, and the service management unit 126 transfers the connection to the cloud that provides the segmented cloud service corresponding to the time t. For example, when the service time t is t2≤t≤t3 (corresponding to cloud service 2 100-2), the service management unit 126 transfers the connection of the cloud service consumer to the service address of cloud-3 200-3, in which the cloud service 2 100-2 is deployed.

The service management unit 126 according to an embodiment supports service migration between clouds when a cloud for providing a cloud service is replaced with another cloud. Service migration may be performed using the method of transmitting only the status of the cloud service so as to maintain consistency or using the method of making an image from the cloud service using a snapshot and reconstructing the cloud service in another cloud using the image. Through the service management unit 126, the cloud service consumer may recognize the segmented cloud services as a single cloud service.

Figure 8:
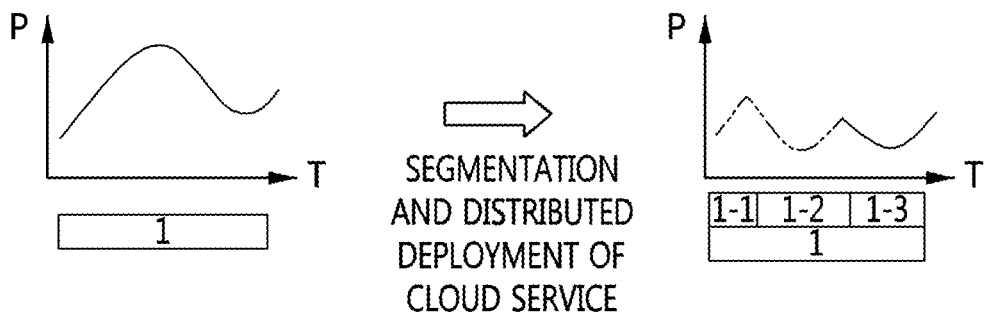
FIG. 8 is a graph of the price of a cloud service over time for explaining the effect of cloud service deployment performed by a cloud service broker according to an embodiment of the present invention.

FIG. 8 is a graph of the price of a cloud service over time for explaining the effect of cloud service deployment performed by a cloud service broker according to an embodiment of the present invention.

Referring to FIG. 8, using a cloud service broker, a single cloud service that used to be assigned to a single cloud may be distributed to multiple clouds, each of which offers the lowest price in each time section.

Figure 9:
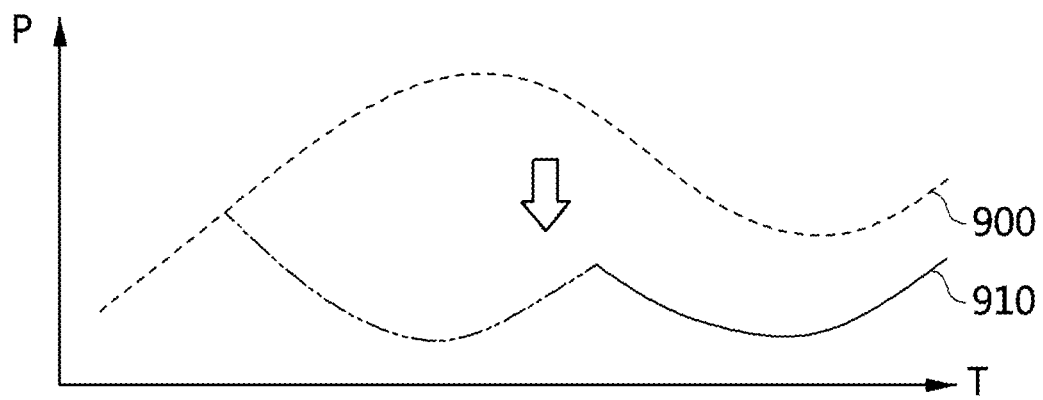
FIG. 9 is a graph that shows the effect of cloud service segmentation and distributed deployment according to an embodiment of the present invention.

FIG. 9 is a graph that shows the effect of cloud service segmentation and distributed deployment according to an embodiment of the present invention.

Referring to FIG. 9, when it deploys a cloud service requested by a cloud service consumer in a cloud, the cloud service broker may reduce expenses using multiple clouds. For example, when a cloud service is provided in the form of multiple cloud services distributed across multiple clouds (910 in the graph) in consideration of service prices according to the present invention, a cloud service consumer may be provided with the corresponding cloud service at a lower price than in the case in which the single cloud service is provided using a single cloud (900 in the graph). Also, if the cloud service broker profits from brokerage, revenue is expected to rise.

The present invention may be applied not only to a cloud service brokerage platform but also to a cost-effective service deployment method in a multiple-cloud environment, which is a kind of cloud service brokerage platform, or in a single large-scale cloud environment in which distributed data centers are managed.

Figure 10:
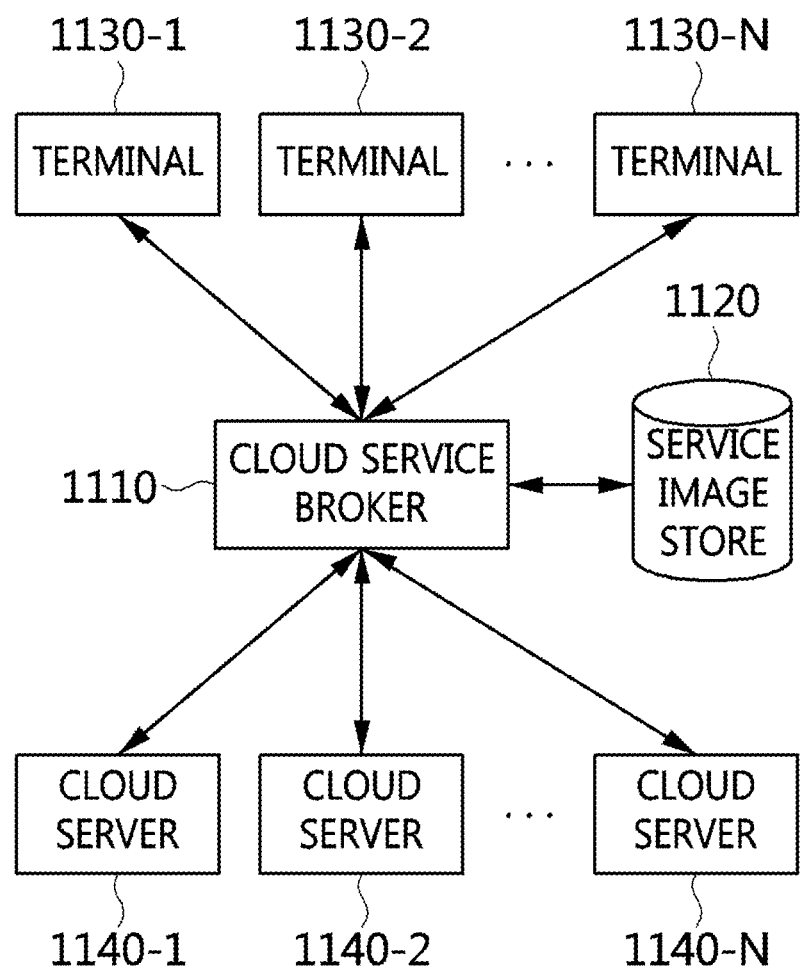
FIG. 10 is a block diagram that shows a cloud service brokerage system using a service image store according to an embodiment of the present invention.

FIG. 10 is a block diagram that shows a cloud service brokerage system using a service image store according to an embodiment of the present invention.

Referring to FIG. 10, a cloud service brokerage system using a service image store according to an embodiment of the present invention may include a cloud service broker 1110, a service image store 1120, terminals 1130-1 to 1130-N of users, and cloud servers 1140-1 to 1140-N.

The cloud service broker 1110 receives service requirements from the terminals 1130-1 to 1130-N.

Also, the cloud service broker 1110 recommends one or more candidate service images that meet the requirements, among multiple service images stored in the service image store 1120.

Here, the cloud service broker 1110 may recommend one or more candidate service images using image metadata, which include at least one of basic information about a service image, image execution environment information, and store management information corresponding to each of the multiple service images.

Here, the service image store 1120 may categorize the multiple service images into public service images accessible by all users and private service images accessible by the owner based on information about ownership included in the store management information, and may store the public service images separately from the private service images.

Here, the one or more candidate service images may be recommended based on at least one of a cloud type, a service specification, a service type, a price, and a location corresponding to the requirements.

Here, when the one or more candidate service images are public service images, whether the one or more candidate service images are paid images is checked, and information for purchasing the candidate service images may be provided to a user when the candidate service images are paid images.

Also, the cloud service broker 1110 recommends one or more candidate cloud servers that meet the requirements, among the multiple cloud servers 1140-1 to 1140-N.

Here, the one or more candidate cloud servers may be recommended based on image execution environment information corresponding to the one or more candidate service images.

Also, the cloud service broker 1110 registers the optimal service image, which is selected by a user from among the one or more candidate service images, in the optimal cloud server, which is selected by the user from among the one or more candidate cloud servers.

Also, the cloud service broker 1110 transmits the service result, acquired by running the optimal service image on the optimal cloud server, to the terminal of the user, which is one of the terminals 1130-1 to 1130-N.

Also, when a user attempts to obtain a public service image from the service image store 1120, the cloud service broker 1110 creates a new private service image that is the same as the public service image and creates new image metadata for the new private service image by copying image metadata of the public service image.

Here, the store management information of the public service image is checked, and when it is determined that the public service image is being used, a new private service image may not be created.

Also, when a user attempts to share a private service image, the cloud service broker 1110 creates a new public service image that is the same as the private service image and creates new image metadata for the new public service image by copying image metadata of the private service image.

Here, when the new public service image to be shared is a paid image, the price information is written to the new image metadata, and the new public service image may be set to a paid image.

The service image store 1120 functions to register, share and manage various service images.

Here, the service image may be a file that is created so as to be immediately run when it is deployed in a cloud server because completely installed and configured target software is contained therein in order to enable a user to quickly use a certain application service such as a web server, a collaboration tool, office software, Enterprise Relationship Management (ERM) software, or the like. That is, the service image may be a virtual-machine image in which the installation and configuration of software required for a virtual machine are completed.

The terminals 1130-1 to 1130-N may be devices through which a user may receive a service result from the cloud servers 1140-1 to 1140-N via the cloud service broker 1110.

Here, the users of the terminals 1130-1 to 1130-N may be companies or individuals that intend to use a cloud service provided by the cloud service broker 1110. For example, the users of the terminals 1130-1 to 1130-N may be application providers for providing an application service based on a virtual system or general users.

Also, the terminals 1130-1 to 1130-N are devices that are capable of receiving a service result based on a cloud service brokerage system by being connected to a communication network, and may be various kinds of terminals, including all information communication devices, multimedia terminals, wired terminals, fixed-type terminals, Internet Protocol (IP) terminals, and the like, without limitation to mobile communication terminals. Also, each of the terminals 1130-1 to 1130-N may be a mobile terminal having various mobile communication specifications, such as a mobile phone, a Portable Multimedia Player (PMP), a Mobile Internet Device (MID), a smart phone, a desktop PC, a tablet PC, a laptop, a netbook, a Personal Digital Assistant (PDA), a smart TV, an information communication device, or the like.

The cloud servers 1140-1 to 1140-N may be service infrastructure of cloud service providers that intend to provide services to users through the cloud service broker 1110, and Infrastructure-as-a-Service (IaaS), on which a virtual machine may be run, is the most common example thereof. Therefore, the cloud servers 1140-1 to 1140-N may be servers registered in the cloud service broker 1110. For example, multiple heterogeneous cloud service providers register services with the cloud service broker 1110, and the registered services may be provided to the user terminals 1130-1 to 1130-N along with additional services.

Therefore, the cloud service broker 1110 may build an open market for selling services for cloud service providers, and may provide convenience to cloud service consumers when the cloud service consumers retrieve, select, deploy and manage various cloud services. That is, the cloud service broker 1110 mediates a cloud service between a consumer and a provider, thereby providing an open cloud service market.

Figure 11:
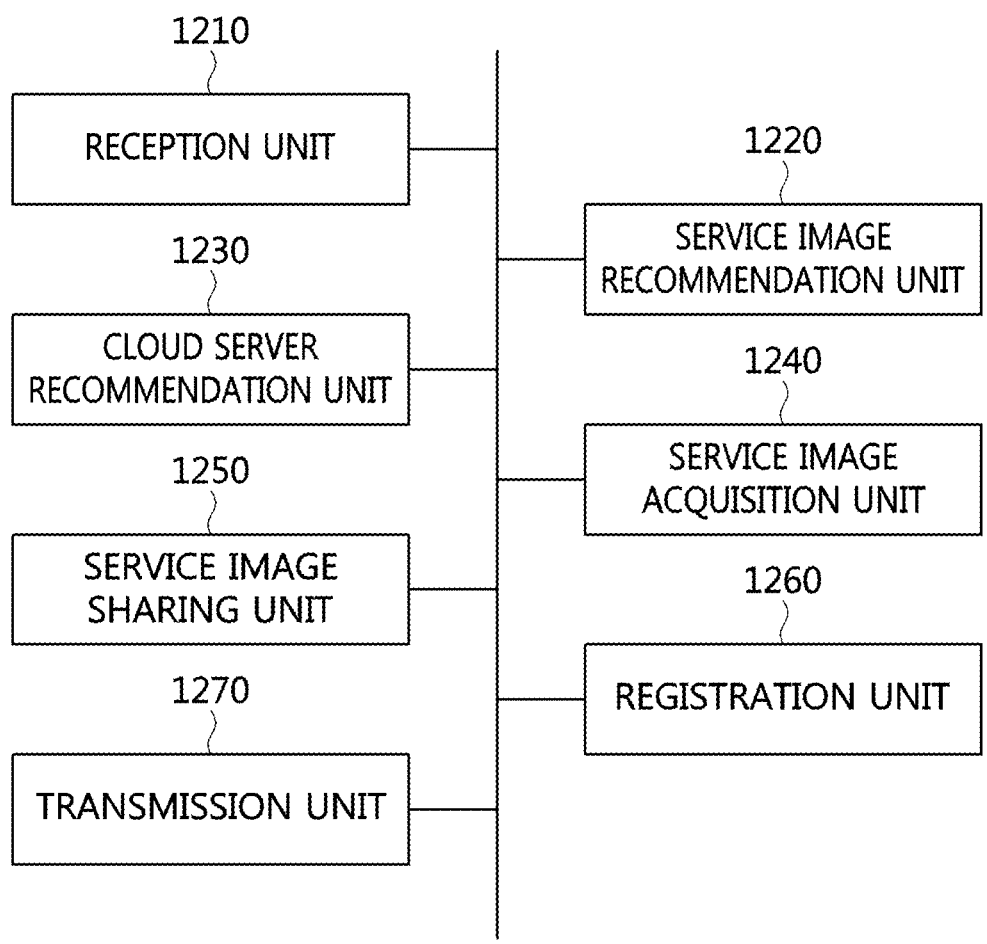
FIG. 11 is a block diagram that shows an example of the cloud service broker illustrated in FIG. 10.

FIG. 11 is a block diagram that shows an example of the cloud service broker illustrated in FIG. 10.

Referring to FIG. 11, the cloud service broker 1110 illustrated in FIG. 10 may include a reception unit 1210, a service image recommendation unit 1220, a cloud server recommendation unit 1230, a service image acquisition unit 1240, a service image sharing unit 1250, a registration unit 1260, and a transmission unit 1270.

The reception unit 1210 receives service requirements from a user. For example, when users, such as companies or individuals that want to use a cloud service, input requirements for a desired service using terminals, the reception unit 1210 may receive the requirements input by the users through a communication network.

Here, the received requirements may include information such as the type of cloud server, service specifications, the type of service, the price, the location, and the like.

The service image recommendation unit 1220 recommends one or more candidate service images that meet the requirements, among the multiple service images stored in the service image store.

Here, the service image store may manage various kinds of service images in order to provide a greater variety of services to users. Therefore, among the various kinds of service images stored in the service image store, a candidate service image that meets the requirements of the user may be recommended. Also, depending on the requirements, one or more candidate service images may be recommended.

Here, the service image may be a file that is created so as to be immediately run when it is deployed in a cloud server because completely installed and configured target software is contained therein in order to enable a user to quickly use a certain application service such as a web server, a collaboration tool, office software, ERM software, or the like. That is, the service image may be a virtual-machine image in which the installation and configuration of software required for a virtual machine are completed.

Here, one or more candidate service images may be recommended using image metadata, which include at least one of basic information about a service image, image execution environment information, and store management information corresponding to each of the multiple service images. That is, the image metadata may include various kinds of additional information, including the identifier of each service image stored in the service image store, and may be stored inside or outside the apparatus that functions as the cloud service broker.

Therefore, the one or more candidate service images may be retrieved using the image metadata, without accessing the service image store that stores the actual service images therein.

Here, the basic information about a service image is information about the service image itself, and the image execution environment information is information that is necessary in order to deploy and run the service image in a cloud server. The store management information may be information that is necessary in order to manage and maintain the service image store. For example, the basic information may include the name and the identifier of a service image, the location of the service image in the service image store, information about service configuration and settings included in the service image, the price of the service image, and the like.

Also, the image execution environment information may include information about an execution environment, specifications of resources, the type of hypervisor, the type of cloud that is suitable to run the service image, and the like. The store management information may include information about ownership for restricting users that are allowed to access the corresponding service image and information about whether the corresponding service image is being used. Here, when the ownership of the service image is public ownership, all users may access the service image, whereas when the ownership of the service image is private ownership, only the user who registers the service image may access the service image. Also, when the service image is being used, this may mean that purchase or acquisition of the service image, sharing or sale of the service image, deletion of the service image, or the like is being processed.

Therefore, metadata including such information may be in the form of a database.

Here, the service image store may categorize the multiple service images into public service images accessible by all users and private service images accessible only by the owner based on information about ownership included in the store management information, and may store the public service images so as to be separate from the private service images.

Also, the service image store may store actual service images therein, and may be divided into a public image repository for storing public service images and a private image repository for storing private service images. Also, in the private image repository, user image storage for each user may be provided.

That is, public service images are service images accessible by all users, and may be stored in the public image repository. Also, a public service image may be a free image or a paid image depending on the intention of the user who registers the service image. Also, a private service image is a service image that is accessible only by the user who registers the service image, and may be stored in the private image repository of the user who registers the service image.

Therefore, when a user retrieves a service image, the service image may be retrieved from all service images stored in the public image repository and service images stored in the private image repository of the user who retrieves the service image. Here, image searching may be performed based on the values of basic information about a service image and image execution environment information. For example, the retrieval of a web server service image that can be run on an OpenStack cloud server, supports load balancing, and is priced at 300 dollars or less may correspond to an image search based on the values of basic information and image execution environment information.

Here, one or more candidate service images may be recommended based on at least one of a cloud type, service specifications, a service type, a price and a location corresponding to the requirements. For example, a candidate service image may be retrieved and recommended based on information about items related to the selection of a candidate service image, among information included in the requirements.

Here, when the one or more candidate service images are public service images, whether the one or more candidate service images are paid images is checked, and purchase information may be provided to a user if the one or more candidate service images are paid images. For example, when the recommended candidate service image is a paid image, a payment button for performing a payment process may be provided along with the price of the paid image.

The cloud server recommendation unit 1230 recommends one or more candidate cloud servers corresponding to the requirements, among the multiple cloud servers. That is, a cloud server that is capable of running the one or more candidate service images, which are recommended based on the requirements, may be recommended.

Here, one or more candidate cloud servers may be recommended based on image execution environment information of the one or more candidate service images. For example, after information about a cloud server that is suitable to deploy the corresponding service images therein is acquired from image execution environment information, a candidate cloud server may be retrieved using the acquired information, and the retrieved candidate cloud server may be recommended.

The service image acquisition unit 1240 creates a new private service image that is the same as a public service image when a user acquires the public service image from the service image store, and creates new image metadata for the new private service image by copying the image metadata of the public service image.

Here, the store management information of the public service image is checked, and when the public service image is being used, a new private service image may not be created.

For example, when a user attempts to acquire service image A, registered in the public image repository, in order to use the same, whether service image A is being used may be checked first using the image metadata of service image A. When it is determined that service image A is not being used, new image metadata B are created by copying the image metadata of service image A, and image metadata B may be set to 'in use'. Then, a private service image B may be created by copying service image A to the image repository of the user. Then, information corresponding to the private service image B is written to the created image metadata B, and both service image A and the private service image B may be set to 'not in use'.

The service image sharing unit 1250 creates a new public service image that is the same as a private service image when a user shares the private service image, and creates new image metadata for the new public service image by copying the image metadata of the private service image.

Here, when the new public service image to be shared is a paid image, price information is written to the new image meta data, and the new public service image may be set to a paid image.

For example, when a user shares service image C, registered in the private image repository, in the public image repository, whether service image C is being used may be checked first using the image metadata of service image C. When it is determined that service image C is not being used, new image metadata D are created by copying the image metadata of service image C, and image metadata D may be set to 'in use'. Then, a public service image D may be created by copying service image C to the public image repository. Then, information about the public service image D is written to the created image metadata D, and both service image C and the public service image D may be set to 'not in use'.

The registration unit 1260 registers the optimal service image, which is selected by a user from among the one or more candidate service images, in the optimal cloud server, which is selected by the user from among the one or more candidate cloud servers.

Here, in order to enable the user to select the optimal cloud server, information about the one or more candidate cloud servers may be provided to the user. Also, in order to enable the user to select the optimal service image, information about the one or more candidate service images may be provided to the user.

The transmission unit 1270 sends the user the service result acquired by running the optimal service image on the optimal cloud server. That is, the service requested by the user is run by running the optimal service image on the optimal cloud server, and the result is sent back to the user, whereby the cloud service may be provided.

Figure 12:
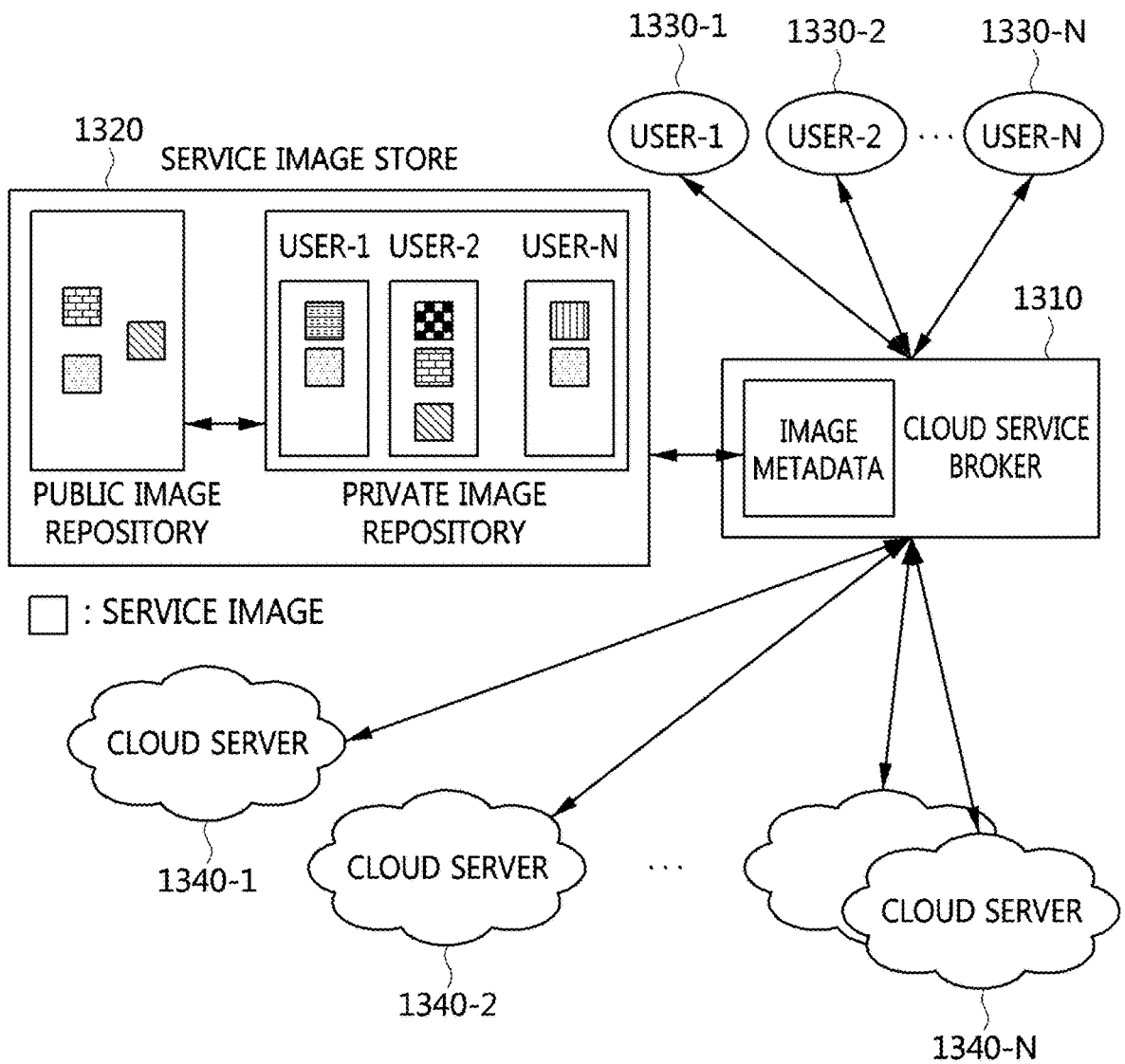
FIG. 12 is a block diagram that specifically shows a cloud service brokerage system using a service image store according to an embodiment of the present invention.

FIG. 12 is a block diagram that specifically shows a cloud service brokerage system using a service image store according to an embodiment of the present invention.

Referring to FIG. 12, in a cloud service brokerage system using a service image store according to an embodiment of the present invention, users 1330-1 to 1330-N that use a cloud service broker 1310 may be companies or individuals that want to use cloud services provided by the cloud service broker 1310. That is, the users 1330-1 to 1330-N may be application providers for providing application services based on a virtual system or general users.

The cloud service broker 1310 may register the services of multiple heterogeneous cloud service providers, and may provide the services to the users 1330-1 to 1330-N along with additional services. That is, the cloud service broker 1310 may build an open market for selling services for cloud service providers, and may provide convenience to cloud service consumers when the cloud service consumers retrieve, select, deploy, and manage various cloud services.

Here, image metadata include various kinds of additional information, including the identifier of each service image stored in the service image store 1320, and may be stored inside or outside the apparatus functioning as the cloud service broker 1310.

The service image store 1320 stores actual service images therein, and may be divided into a public image repository and a private image repository. In the private image repository, user image storage for each user may be provided.

The cloud servers 1340-1 to 1340-N connected with the cloud service broker 1310 are service infrastructure of cloud providers that intend to provide services to users 1330-1 to 1330-N through the cloud service broker 1310, and Infrastructure-as-a-Service (IaaS), on which virtual machines may be run, is the most common example thereof.

Figure 13:
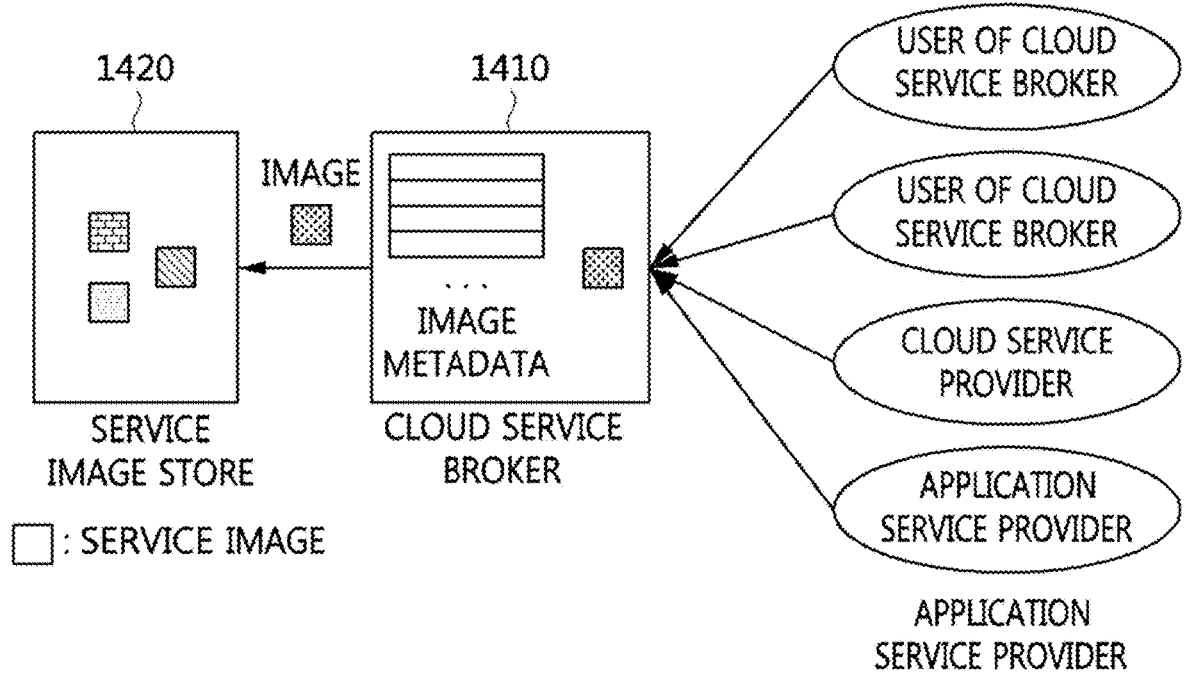
FIG. 13 is a view that shows an entity that registers a service image in a service image store according to an embodiment of the present invention.

FIG. 13 is a view that shows an entity that registers a service image in a service image store according to an embodiment of the present invention.

Referring to FIG. 13, a service image may be registered in a service image store 1420 according to an embodiment of the present invention by any of various entities, for example, a user of a cloud service broker, a cloud service brokerage provider, a cloud service provider, an application service provider, and the like.

Here, when a service image is stored, that is, registered, input of information about image metadata may be required along with the service image to be registered.

Here, the image metadata may be in the form of a file or database, and may be configured with basic information about the service image, image execution environment information, store management information, and the like.

Here, the basic information about a service image is information about the service image itself, and may include the name and the identifier of the service image to be registered, the location of the service image in the service image store 1420, information about service configuration and settings included in the service image, the price of the service image, and the like.

Also, the image execution environment information is information that is necessary in order to deploy and run the service image in a cloud server, and may include at least one of information about an execution environment such as the specifications of resources, the type of hypervisor, the type of cloud that is suitable to run the service image, and the like.

Also, the store management information is information that is necessary in order to manage and maintain the service image store, and may include at least one of information about ownership, information about whether a service image is being used, and the like. Here, the ownership restricts users that are allowed to access the corresponding service image. When the ownership of the service image is public ownership, all users may access the service image, whereas when the ownership thereof is private ownership, only the user who registers the service image may access the service image. Also, information about whether the service image is being used is a value that is set to 'in use' when the corresponding service image is being accessed by another user. For example, when a public service image is being deleted or when a user copies a public service image in order to store the same in the private image repository in the process of purchasing the public service image, the corresponding service image may be regarded as being used.

Figure 14:
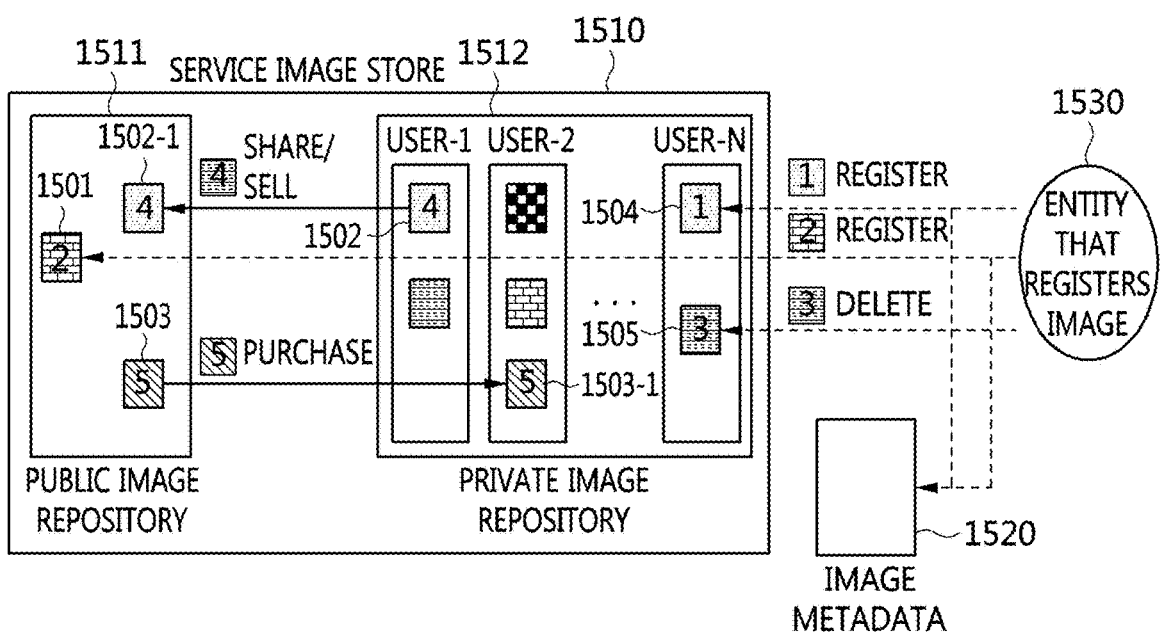
FIG. 14 is a view that shows a method for managing a service image in a service image store according to an embodiment of the present invention.

FIG. 14 is a view that shows a method for managing a service image in a service image store according to an embodiment of the present invention.

Referring to FIG. 14, an entity 1530 that registers a service image according to an embodiment of the present invention may input image metadata along with the service image to be registered in a service image store 1510.

Here, as shown in FIG. 14, the service images 1501 and 1504 to be registered may be registered separately in the public image repository 1511 and the private image repository 1521 depending on information about the ownership, which is input to the image metadata.

Here, the public service image to be stored in the public image repository 1511 may be a service image that may be accessed by all users that use the cloud service broker. Also, the public service image may be a free image or a paid image depending on the intention of the user who registers the public service image.

Also, the private service image to be stored in the private image repository 1512 may be a service image that may be accessed only by the user who registers the service image. Also, the private service image may be stored in the storage of the user who registers the service image.

Here, the public service image and the private service image may be deleted in the same manner.

Describing an example of the process of deleting a service image, whether the service image 1505 to be deleted is being used may be checked using the image metadata thereof. If the service image 1505 to be deleted is being used, the service image 1505 may not be deleted, but otherwise, the image metadata thereof may be set to 'in use' in order to delete the service image 1505. Then, the service image 1505 is deleted from the service image store 1510, and the image metadata thereof may also be deleted.

Also, the retrieval of a service image may be performed using an operation that does not access the service image store 1510 in which the service image is actually stored, and the service image may be retrieved based on image metadata thereof. Also, when a user retrieves a service image, the service image may be retrieved from all of the public service images stored in the public image repository and the service images stored in the private image repository of the user who retrieves the service image.

Also, search criteria for retrieving a service image may correspond to basic information about the service image and image execution environment information. For example, a web server service image that can be run on an OpenStack cloud server, supports load balancing, and is priced at 300 dollars or less may be used as search criteria.

Here, the requests to share and sell a service image may be processed depending on information about ownership, which is set when the service image is registered.

If the ownership of a service image is set to public ownership when the service image is registered, the service image may be accessed by all users, in which case a reasonable price may also be input if the service image is for sale. Also, when the service image is for sharing for free, the service image may be released for free.

Also, if the ownership of a service image is set to private ownership when the service image is registered, the private service image may be changed to a public service image only when the user who registered the service image changes the ownership into public ownership. Here, the service image stored in the private image repository may be copied to the public image repository.

For example, first, whether the service image 1502, which is stored in the private image repository 1512 but is to be shared, is being used may be determined by checking the image metadata thereof. If it is determined that the service image 1502 is being used, the service image 1502 may not be shared at that time, but otherwise, the image metadata of the service image 1502 to be shared may be set to 'in use' in order to share the service image 1502.

Then, new image metadata for a service image 1502-1 to be created as the result of sharing are created by copying the image metadata of the image 1520 to be shared, and the value of the new image metadata may be set to 'in use'.

Then, the image 1502 to be shared, which is stored in the private image repository 1512, may be copied to the public image repository 1511.

Then, information about the shared service image 1502-1, which is stored in the public image repository 1511 as the result of copying, is written to the new image metadata, and the service image 1502 and the shared service image 1502-1 may be set to 'not in use'.

Also, a request to purchase or acquire a service image may be made when a user intends to purchase the service image registered in the public image repository or acquire the same for free.

For example, first, whether the service image 1503 to be purchased or acquired is being used may be determined by checking the image metadata thereof. If the service image is being used, the service image may not be purchased or acquired at that time, but otherwise, the value of the image metadata of the service image 1503 to be purchased or acquired may be set to 'in use' in order to process the purchase or acquisition thereof.

Then, new image metadata for a service image 1503-1 to be created as the result of purchase or acquisition are created by copying the image metadata of the service image 1503 to be purchased or acquired, and the value of the new image metadata may be set to 'in use'.

Then, the service image 1503 to be purchased or acquired may be copied from the public image repository 1511 to the private image repository 1512 of the user who requested the purchase or acquisition of the service image 1503.

Then, information about the purchased service image 1503-1, which is stored in the private image repository 1512 as the result of copying, is written to the new image metadata, and the service image 1503 and the purchased service image 1503-1 may be set to 'not in use'.

Figure 15:
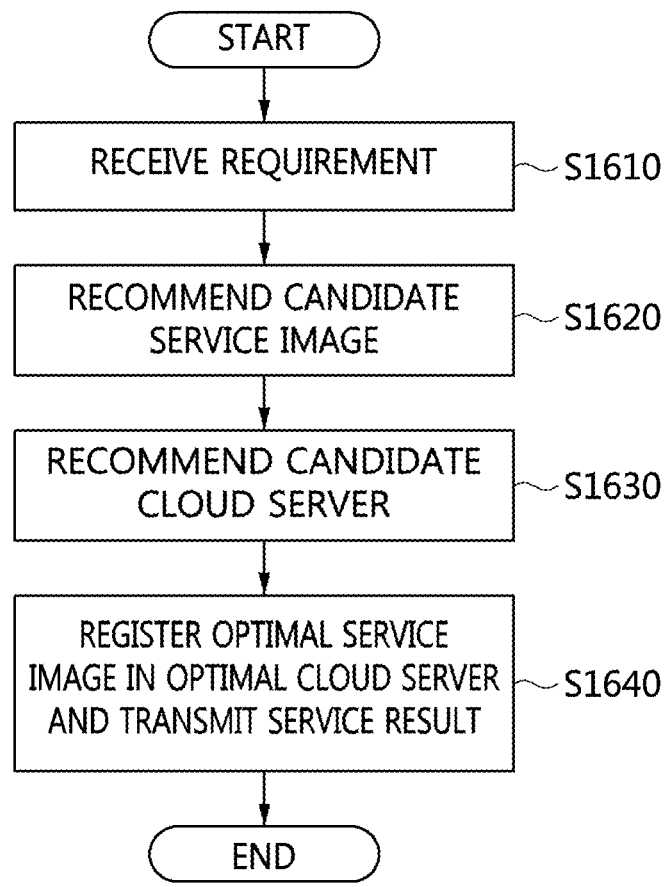
FIG. 15 is a flowchart that shows a cloud service brokerage method using a service image store according to an embodiment of the present invention.

FIG. 15 is a flowchart that shows a cloud service brokerage method using a service image store according to an embodiment of the present invention.

Referring to FIG. 15, in the cloud service brokerage method using a service image store according to an embodiment of the present invention, service requirements are received from a user at step S1610. For example, when users, such as companies or individuals that want to use a cloud service, input requirements for a desired service using their terminals, the requirements may be received through a communication network.

Here, the received requirements may include information such as the type of cloud server, service specifications, the type of service, the price, the location, and the like.

Also, in the cloud service brokerage method using a service image store according to an embodiment of the present invention, one or more candidate service images that meet the requirements are recommended at step S1620, among multiple service images stored in the service image store.

Here, the service image store may manage various kinds of service images in order to provide a greater variety of services to users. Therefore, among the various kinds of service images stored in the service image store, a candidate service image that meets the requirements of the user may be recommended. Also, depending on the requirements, one or more candidate service images may be recommended.

Here, the service image may be a file that is created so as to be immediately run when it is deployed in a cloud server because completely installed and configured target software is contained therein in order to enable a user to quickly use a certain application service such as a web server, a collaboration tool, office software, ERM software, or the like. That is, the service image may be a virtual-machine image in which the installation and configuration of software required for a virtual machine are completed.

Here, one or more candidate service images may be recommended using image metadata, which include at least one of basic information about a service image, image execution environment information, and store management information corresponding to each of the multiple service images. That is, the image metadata may include various kinds of additional information, including the identifier of each service image stored in the service image store, and may be stored inside or outside the apparatus functioning as the cloud service broker.

Therefore, the one or more candidate service images may be retrieved using the image metadata, without accessing the service image store that stores the actual service images therein.

Here, the basic information about a service image is information about the service image itself, and the image execution environment information is information that is necessary in order to deploy and run the service image in a cloud server. The store management information may be information that is necessary in order to manage and maintain the service image store. For example, the basic information may include the name and the identifier of a service image, the location of the service image in the service image store, information about service configuration and settings included in the service image, the price of the service image, and the like.

Also, the image execution environment information may include information about an execution environment, specifications of resources, the type of hypervisor, the type of cloud that is suitable to run the service image, and the like. The store management information may include information about ownership for restricting users that are allowed to access the corresponding service image and information about whether the corresponding service image is being used. Here, when the ownership of the service image is public ownership, all users may access the service image, whereas when the ownership of the service image is private ownership, only the user who registers the service image may access the service image. Also, when the service image is being used, this may mean that purchase or acquisition of the service image, sharing or sale of the service image, deletion of the service image, or the like is being processed.

Therefore, metadata including such information may be in the form of a database.

Here, the service image store may categorize the multiple service images into public service images accessible by all users and private service images accessible only by the owner based on information about the ownership included in the store management information, and may store the public service images so as to be separate from the private service images.

Also, the service image store may store actual service images therein, and may be divided into a public image repository for storing public service images and a private image repository for storing private service images. Also, in the private image repository, user image storage for each user may be provided.

That is, public service images are service images accessible by all users, and may be stored in the public image repository. Also, a public service image may be a free image or a paid image depending on the intention of the user who registers the service image. Also, a private service image is a service image that is accessible only by the user who registers the service image, and may be stored in the private image repository of the user who registers the service image.

Therefore, when a user retrieves a service image, the service image may be retrieved from all service images stored in the public image repository and service images stored in the private image repository of the user who retrieves the service image. Here, image searching may be performed based on the values of basic information about a service image and image execution environment information. For example, the retrieval of a web server service image that can be run on an OpenStack cloud server, supports load balancing, and is priced at 300 dollars or less may correspond to an image search based on the values of basic information and image execution environment information.

Here, one or more candidate service images may be recommended based on at least one of a cloud type, service specifications, a service type, a price and a location corresponding to the requirements. For example, a candidate service image may be retrieved and recommended based on information about items related to the selection of a candidate service image, among information included in the requirements.

Here, when the one or more candidate service images are public service images, whether the one or more candidate service images are paid images is checked, and purchase information may be provided to a user if the one or more candidate service images are paid images. For example, when the recommended candidate service image is a paid image, a payment button for performing a payment process may be provided along with the price of the paid image.

Also, in the cloud service brokerage method using a service image store according to an embodiment of the present invention, one or more candidate cloud servers corresponding to the requirements are recommended at step S1630, among multiple cloud servers. That is, a cloud server that is capable of running the one or more candidate service images, which are recommended based on the requirements, may be recommended.

Here, one or more candidate cloud servers may be recommended based on image execution environment information corresponding to the one or more candidate service images. For example, after information about a cloud server that is suitable to deploy the corresponding service images therein is acquired from image execution environment information, a candidate cloud server may be retrieved using the acquired information, and the retrieved candidate cloud server may be recommended.

Also, in the cloud service brokerage method using a service image store according to an embodiment of the present invention, a service result, acquired by registering and running the optimal service image, which is selected by the user from among the one or more candidate service images, in the optimal cloud server, which is selected by the user from among the one or more candidate cloud servers, is transmitted to the user at step S1640. That is, the service requested by the user is run by running the optimal service image on the optimal cloud server, and the result is sent back to the user, whereby the cloud service may be provided.

Here, in order to enable the user to select the optimal cloud server, information about the one or more candidate cloud servers may be provided to the user. Also, in order to enable the user to select the optimal service image, information about the one or more candidate service images may be provided to the user.

Also, although not illustrated in FIG. 15, in the cloud service brokerage method using a service image store according to an embodiment of the present invention, when a user acquires a public service image from the service image store, a new private service image that is the same as the public service image is created, and new image metadata for the new private service image are created by copying the image metadata of the public service image.

Here, the store management information of the public service image is checked, and when it is determined that the public service image is being used, a new private service image may not be created.

For example, when a user attempts to acquire service image A, registered in the public image repository, in order to use the same, whether service image A is being used may be checked first using the image metadata of service image A. When it is determined that service image A is not being used, new image metadata B are created by copying the image metadata of service image A, and image metadata B may be set to 'in use'. Then, a private service image B may be created by copying service image A to the image repository of the user. Then, information corresponding to the private service image B is written to the created image metadata B, and both service image A and the private service image B may be set to 'not in use'.

Also, although not illustrated in FIG. 15, in the cloud service brokerage method using a service image store according to an embodiment of the present invention, when a user shares a private service image, a new public service image that is the same as the private service image is created, and new image metadata for the new public service image are created by copying the image metadata of the private service image.

Here, when the new public service image to be shared is a paid image, price information is written to the new image meta data, and the new public service image may be set to a paid image.

For example, when a user shares service image C, registered in the private image repository, in the public image repository, whether service image C is being used may be checked first using the image metadata of service image C. When it is determined that service image C is not being used, new image metadata D are created by copying the image metadata of service image C, and image metadata D may be set to 'in use'. Then, a public service image D may be created by copying service image C to the public image repository. Then, information corresponding to the public service image D is written to the created image metadata D, and both service image C and the public service image D may be set to 'not in use'.

Figure 16:
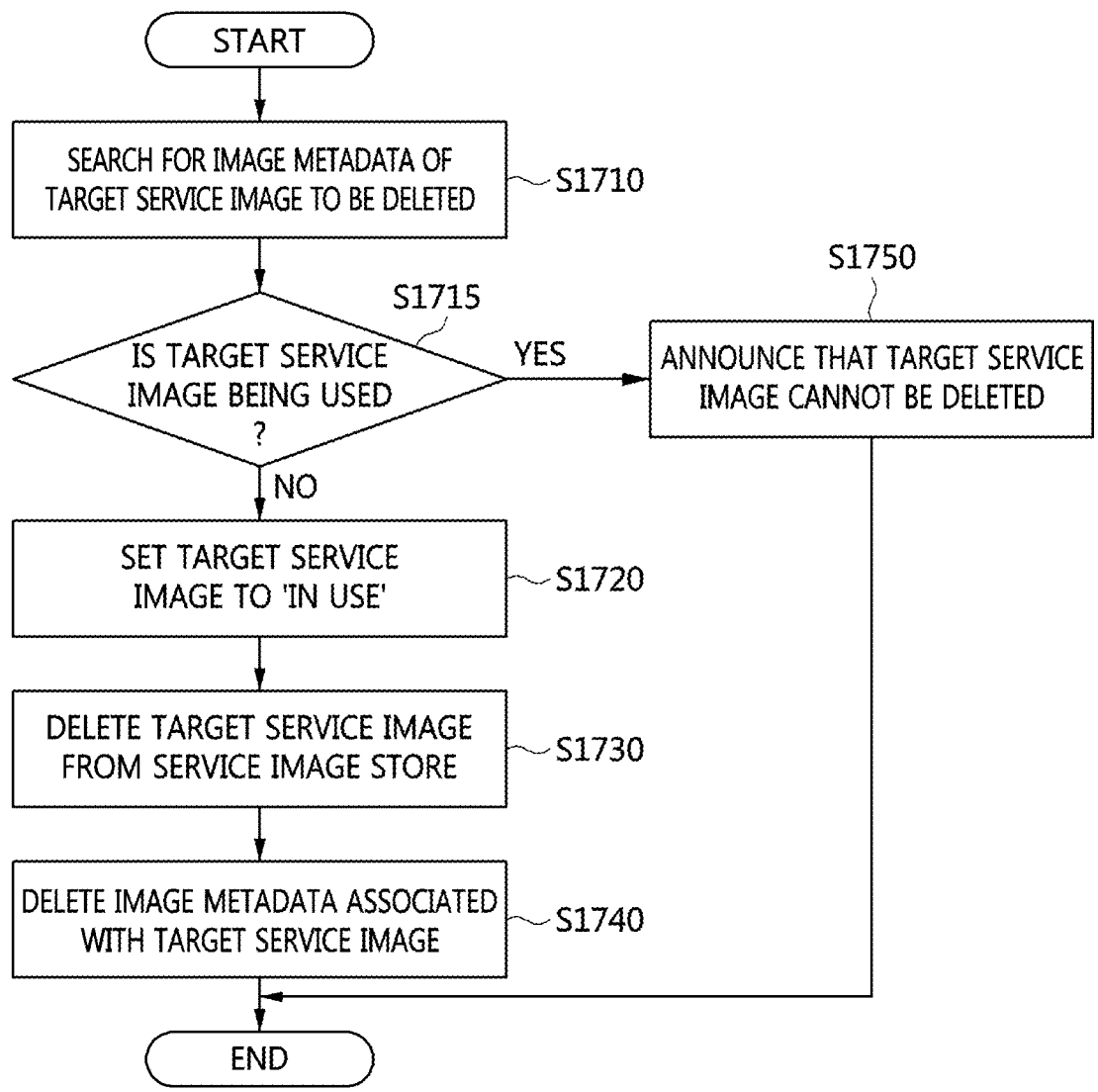
FIG. 16 is a flowchart that shows a method for deleting a service image from a service image store according to an embodiment of the present invention.

FIG. 16 is a flowchart that shows a method for deleting a service image from a service image store according to an embodiment of the present invention.

Referring to FIG. 16, in the method for deleting a service image from a service image store according to an embodiment of the present invention, first, the image metadata of the service image to be deleted may be retrieved at step S1710.

Then, whether the service image to be deleted is being used may be determined by checking the value of the image metadata at step S1715.

When it is determined at step S1715 that the service image to be deleted is not being used, the value of the image metadata of the service image to be deleted may be set to 'in use' at step S1720.

Then, the service image to be deleted is deleted from the service image store at step S1730, and image metadata corresponding thereto may also be deleted at step S1740.

Also, when it is determined at step S1715 that the service image to be deleted is being used, it is determined that the corresponding service image may not be deleted because it is being used, and information thereabout may be provided to the user at step S1750.

Figure 17:
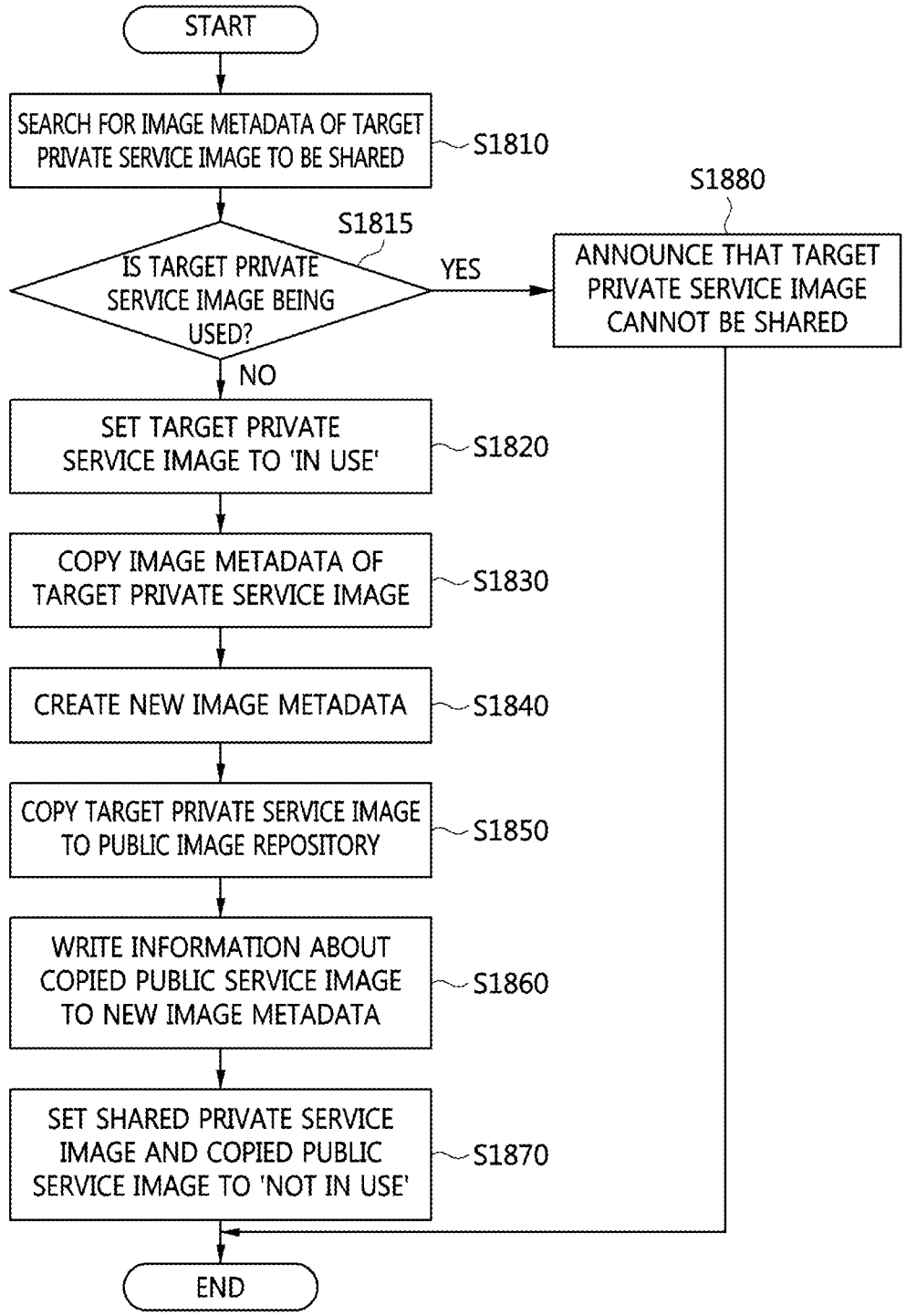
FIG. 17 is a flowchart that shows a method for sharing a private service image in a service image store according to an embodiment of the present invention.

FIG. 17 is a flowchart that shows a method for sharing a private service image in a service image store according to an embodiment of the present invention.

Referring to FIG. 17, in the method for sharing a private service image in a service image store according to an embodiment of the present invention, the image metadata of the private service image to be shared may be retrieved at step S1810.

Then, whether the private service image to be shared is being used may be determined by checking the value of the image metadata thereof at step S1815.

When it is determined at step S1815 that the private service image to be shared is not being used, the value of the image metadata of the private service image to be shared may be set to 'in use' at step S1820.

Then, the image metadata of the private service image to be shared are copied at step S1830, whereby new image metadata may be created at step S1840.

Then, the private service image to be shared is copied to the public image repository at step S1850, and information about the public service image, created as the result of the copying, may be written to the new image metadata at step S1860.

Then, the value of the image metadata of each of the shared private service image and the copied public service image is set to 'not in use'.

Also, when it is determined at step S1815 that the private service image to be shared is being used, it is determined that the corresponding service image may not be shared because it is being used, and information thereabout may be provided to the user at step S1880.

Figure 18:
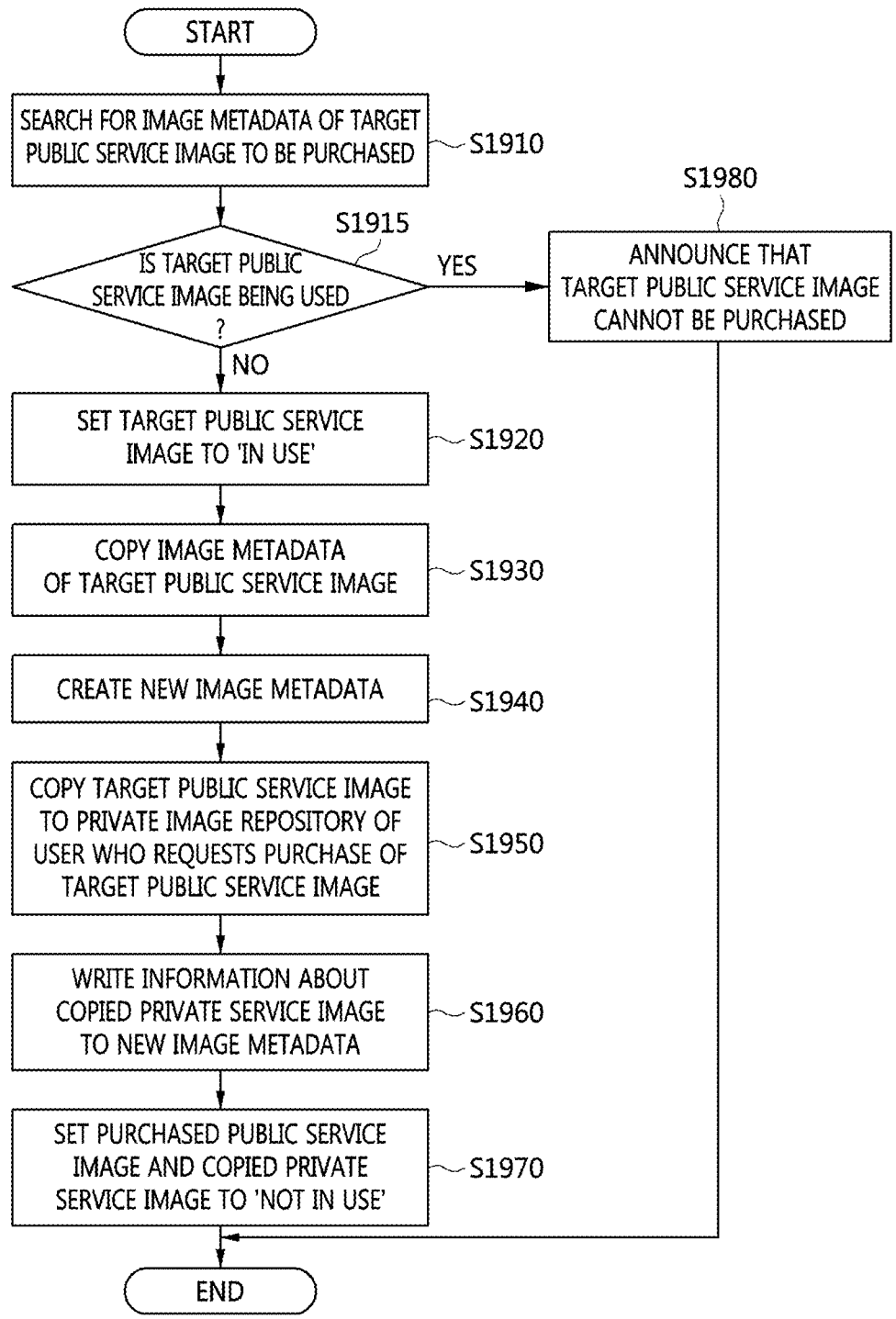
FIG. 18 is a flowchart that shows a method for purchasing a public service image in a service image store according to an embodiment of the present invention.

FIG. 18 is a flowchart that shows a method for purchasing a public service image in a service image store according to an embodiment of the present invention.

Referring to FIG. 18, in the method for purchasing a public service image in a service image store according to an embodiment of the present invention, the image metadata of the public service image to be purchased may be retrieved at step S1910.

Then, whether the public service image to be purchased is being used may be determined at step S1915 by checking the value of the image metadata thereof.

When it is determined at step S1915 that the public service image to be purchased is not being used, the value of the image metadata of the public service image to be purchased may be set to 'in use' at step S1920.

Then, the image metadata of the public service image to be purchased are copied at step S1930, whereby new image metadata may be created at step S1940.

Then, the public service image to be purchased is copied to the private image repository of the user who requested the purchase of the public service image at step S1950, and information about the private service image, created as the result of copying, may be written to the new image metadata at step S1960.

Then, the value of the image metadata of each of the purchased public service image and the copied private service image may be set to 'not in use' at step S1970.

Also, when it is determined at step S1915 that the public service image to be purchased is being used, it is determined that the corresponding service image may not be purchased because it is being used, and information thereabout may be provided to the user at step S1980.

The present invention provides a method and apparatus for cloud service brokerage including service configuration and management methods for effective cloud service brokerage between a cloud service provider and a cloud service consumer in a heterogeneous cloud-computing environment in which multiple cloud service providers exist.

Hereinafter, a cloud service provider that registers and sells a cloud service in a cloud-computing environment is abbreviated as a 'CSP', a cloud service consumer that requests and uses a cloud service is abbreviated as a 'CSC', and a cloud service broker that mediates and manages the connection between a CSP and a CSC in a heterogeneous cloud-computing environment including multiple CSPs is abbreviated as a 'CSB' for the convenience of description.

Hereinafter, an embodiment of the present invention will be described in detail with reference to the accompanying drawings.

Figure 19:
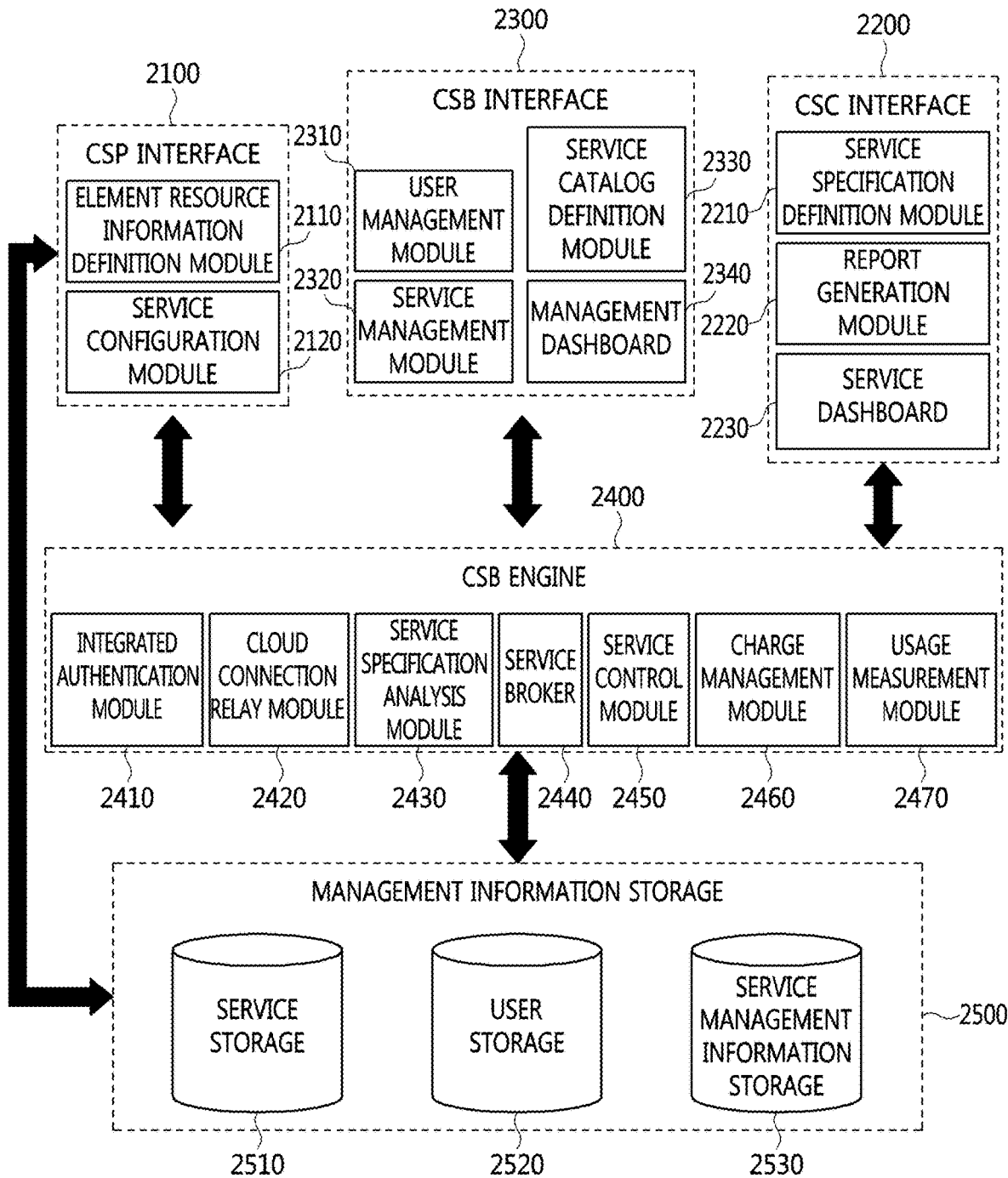
FIG. 19 is a block diagram of an apparatus for cloud service brokerage according to an embodiment of the present invention.

FIG. 19 shows an apparatus for cloud service brokerage according to an embodiment of the present invention.

Referring to FIG. 19, in order to enable a CSP, a CSC, and a CSB to appropriately set and manage a cloud service, an apparatus for cloud service brokerage according to an embodiment of the present invention includes a cloud service provider interface 2100 (hereinafter, referred to as a 'CSP interface'), a cloud service consumer interface 2200 (hereinafter, referred to as a 'CSC interface'), a cloud service broker interface 2300 (hereinafter, referred to as a 'CSB interface'), a CSB engine 2400, and management information storage 2500.

The CSP interface 2100 is an interface through which CSPs may easily use and operate cloud resources when they use multiple clouds in an environment in which multiple CSPs provide heterogeneous clouds. Each CSP registers information about the cloud to sell and registers services providable in the corresponding cloud using the CSP interface 2100. That is, each CSP inputs information about the cloud service to sell using the CSP interface 2100. Particularly, each CSP sets the unique name of a service cloud, an endpoint URL, access account information, and cloud location information so that the service to sell may be retrieved from a service catalogue configured by a CSB.

The CSP interface 2100 includes an element resource information definition module 2110 and a service configuration module 2120.

The element resource information definition module 2110 receives information about element resources that form each cloud service from each of CSPs.

Additionally, the CSB or the CSB engine 2400 may provide CSPs with the CSB interface as the workspace for the CSPs, thereby enabling the CSPs to register a cloud service in the CSB or to provide registration information to the CSB. Here, information about the CSP includes the name of the CSP, the entry-point URL thereof, information about the physical location thereof, access account information thereof, and the like.

The service configuration module 2120 receives the service type and purpose of each cloud service from a corresponding CSP, and combines information about the element resources that form the corresponding cloud service.

The CSC interface 2200 is an interface provided to a CSC in order for the CSC to easily use a cloud resource and request the operation of the cloud resource for a desired service in the heterogeneous cloud environment including multiple clouds. The CSC inputs requirements for the desired service using the CSC interface 2200 and requests the use of the service. For example, the CSC selects a desired service type from a service catalogue and inputs a service item for the purpose of the use, whereby the CSC may request the use of the service and receive the service.

The CSC interface 2200 includes a service specification definition module 2210, a report generation module 2220, and a service dashboard 2230.

The service specification definition module 2210 defines each service item of the service requested by the CSC in connection with a system, a platform, and software that provides a cloud service.

The report generation module 2220 generates a report including the period during which the corresponding service is used, a usage amount, and a fee for use of the service in response to a request from a CSC to generate a report about service usage. For example, when it receives a request from a CSC to write a report, the report generation module 2220 generates a report by aggregating a service use period, a service list, the offered service amount and the used service amount for each service type, the fee for use of the service, and the like for each tenant. The report generation module 2220 operates at regular intervals, or when a request to generate a report is made by a CSC.

The service dashboard 2230 shows monitoring information about the list of services requested by the CSC, services in use, and the like, thereby enabling the CSC to monitor the current status of the service in use.

The CSB interface 2300 is an interface invoked by a CSB in order for the CSB to easily perform and manage cloud service brokerage. The CSB selects a cloud that is capable of providing a service that meets the requirements of the CSC from a list of available services and provides information about the selected cloud to the CSC. That is, the CSB selects a suitable service cloud, from which the CSC may be provided with a service that meets the requirements, and relays the connection to the selected service cloud.

The CSB interface 2300 includes a user management module 2310, a service management module 2320, a service catalogue definition module 2330, and a management dashboard 2340.

The user management module 2310 approves registration of a user who wants to use the CSP interface 2100, the CSC interface 2200, and the CSB interface 2300, and manages the registered user. To this end, the user management module 2310 creates user information in the management information storage 2500, retrieves user information therefrom, deletes user information therefrom, or modifies user information therein.

The service management module 2320 manages the service requested by a CSC. That is, the service management module 2320 may start, restart, interrupt or delete the service requested by the CSC.

The service catalogue definition module 2330 defines a directory structure for classifying cloud services that may be provided by CSPs, and also defines service information, such as a service type, the purpose of a service, and the like. The service catalogue definition module 2330 includes detailed information that is necessary in order to register, retrieve, modify, or request a service.

The management dashboard 2340 extracts user information managed by a CSB and services that are being used, and shows summarized information. For example, the management dashboard 2340 may show summarized information, such as service usage depending on windows of time throughout the day, such as daylight hours, late hours, or a specific time, or the maximum number of users.

The CSB engine 2400 provides functions that are necessary for cloud service brokerage and management. To this end, the CSB engine 2400 includes an integrated authentication module 2410, a cloud connection relay module 2420, a service specification analysis module 2430, a service broker 2440, a service control module 2450, a charge management module 2460, and a usage measurement module 2470.

The integrated authentication module 2410 provides integrated management and processing of authentication of access permissions, which is necessary in order for the user who uses the CSP interface 2100, the CSC interface 2200, or the CSB interface 2300 to access the apparatus for cloud service brokerage.

The cloud connection relay module 2420 functions as a proxy server for relaying a request from a client in a local network in order to make a connection with a heterogenous cloud when a cloud service is brokered.

The service specification analysis module 2430 analyzes requirements for cloud service to be allocated to a CSC and converts the same into a format that may be interpreted by the service broker 2440. For example, the service specification analysis module 2430 analyzes the configuration of a service desired by a CSC, cloud account information, a service type, a function, and conditions, and converts the analysis result into the format that may be interpreted by the service broker 2440.

The service broker 2440 selects the optimal CSP that meets the service specifications converted by the service specification analysis module 2430 and allocates the resource requested by the CSC, among the resources possessed by the optimal CSP. To this end, the service broker 2440 selects the optimal CSP for each of the services specified in the converted service specifications, and arranges a resource for the service requested by the CSC, among all of the resources possessed by the selected CSP.

The service control module 2450 controls and manages the status of a service provided by a cloud, such as the connection to a cloud for a service, service deployment, start of a service, interruption of a service, and termination of a service.

The charge management module 2460 calculates the fee for the service used by a CSC, charges the CSC for the service, and manages a history of charging and payment.

The usage measurement module 2470 measures and manages the usage of a service provide by a cloud. For example, the usage measurement module 2470 may measure and manage how many services are requested, among the services that may be brokered by the CSB, and the number of remaining services. To this end, the usage measurement module 2470 measures and manages the number of services provided by CSPs and the number of services provided to each CSC.

The management information storage 2500 stores metadata, required for cloud service brokerage and integrated management, and actual operational data. To this end, the management information storage 2500 includes service storage 2510, user storage 2520, and service management information storage 2530.

The service storage 2510 stores cloud information input via the CSP interface 2100 and information about element resources that may be provided from each cloud.

The user storage 2520 stores and manages information about users that request registration using the CSP interface 2100, the CSC interface 2200, or the CSB interface 2300.

The service management information storage 2530 stores service management information that is necessary in order for the CSB engine 2400 to perform control and management. The service management information storage 2530 stores and manages a service analysis file, a file converted therefrom, brokerage state information, and service status information.

The cloud service brokerage method using a cloud service brokerage apparatus according to the above-described embodiment of the present invention includes receiving information about services for sale from multiple CSPs, receiving service requirements from a CSC, selecting a single optimal CSP from among the multiple CSPs based on the service requirements, and connecting the CSC to the cloud provided by the selected CSP.

A service registration process, a service request registration process, a service brokerage operation, and a service brokerage management process, performed in the respective steps of the cloud service brokerage method, will be described in detail with reference to FIGS. 20 to 23.

Figure 20:
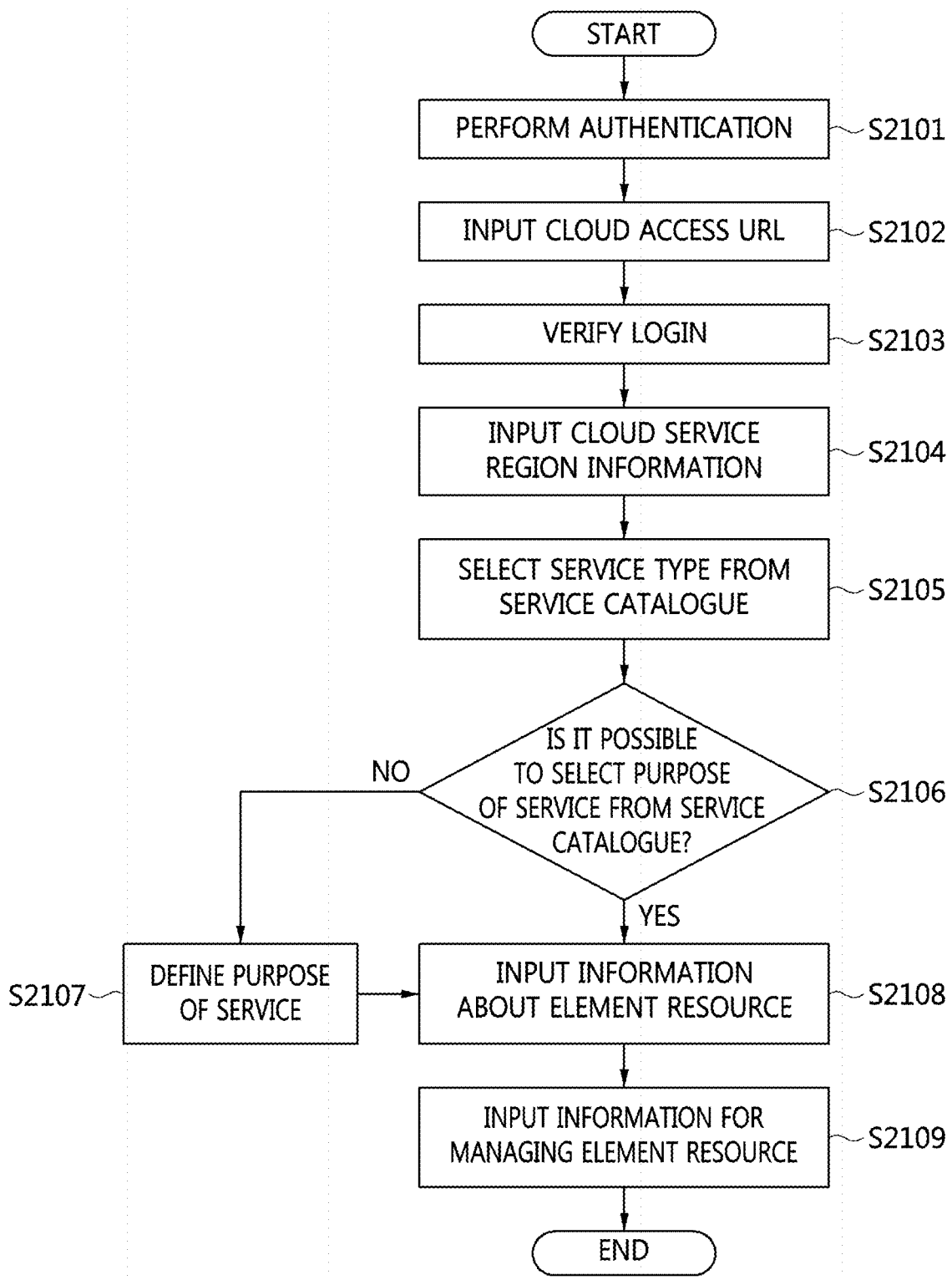
FIG. 20 is a flowchart that shows a procedure in which a cloud service provider registers a service according to an embodiment of the present invention.

FIG. 20 is a flowchart that shows a procedure in which a CSP registers a service according to an embodiment of the present invention. Particularly, FIG. 20 shows a procedure in which a service provided by each CSP is registered so as to be retrieved from a service catalogue.

Referring to FIG. 20, a CSP inputs information about the service to sell using the CSP interface 2100, thereby registering the corresponding service.

To this end, first, the CSP logs on to the CSP interface 2100 and obtains access privileges at step S2101.

Then, the CSP connects to the endpoint URL in order to access a selected cloud in the heterogenous cloud environment and inputs an id and a password required to access the cloud at step S2102.

Then, the login is internally verified in order to verify that access to the cloud via the URL is permitted at step S2103.

When the access by the CSP to the cloud is validated, the CSP inputs region information as information about the region in which a cloud service is provided at step S2104.

Then, in order to register the cloud service, the CSP selects the type thereof from a service catalogue at step S2105, and checks whether the purpose of the service to register can be selected from directories defined in the service catalogue. To this end, the CSP may check whether the purpose of the corresponding service (e.g., a virtual machine, a platform, or an application) can be selected from the service catalogue at step S2106.

When a directory matching the purpose of the service is not present in the service catalogue, the CSP defines the purpose for which the corresponding service can be used at step S2107, and the process moves to inputting information about an element resource provided by the cloud.

Conversely, when a directory matching the purpose of the service is present in the service catalogue, the CSP selects the service purpose in the service catalogue and then inputs information about an element resource provided by the cloud at step S2108.

As an example of the element resource, there may be a virtual machine when the service purpose is Infrastructure-as-a-Service (IaaS), or there may be a development environment when the service purpose is Platform-as-a-Service (PaaS). When information about the element resource is input, for example, if the element resource is a virtual machine, which is an infrastructure resource, information about vCore, vMemory, a disk in which an OS is to be installed (root disk), and the like may be input as element resource information.

When input of information about the element resource is completed, the CSP inputs information related to management of the element resource at step S2109. As an example of the information related to management of the element resource, there may be price information for selling the element resource, conditions for guaranteeing provision of the resource when the resources is provided in the form of a service, and anything particular related to resource management.

When information about the element resource, information related to management of the element resource, and the like have been input, the procedure in which the CSP registers the service is completed.

Figure 21:
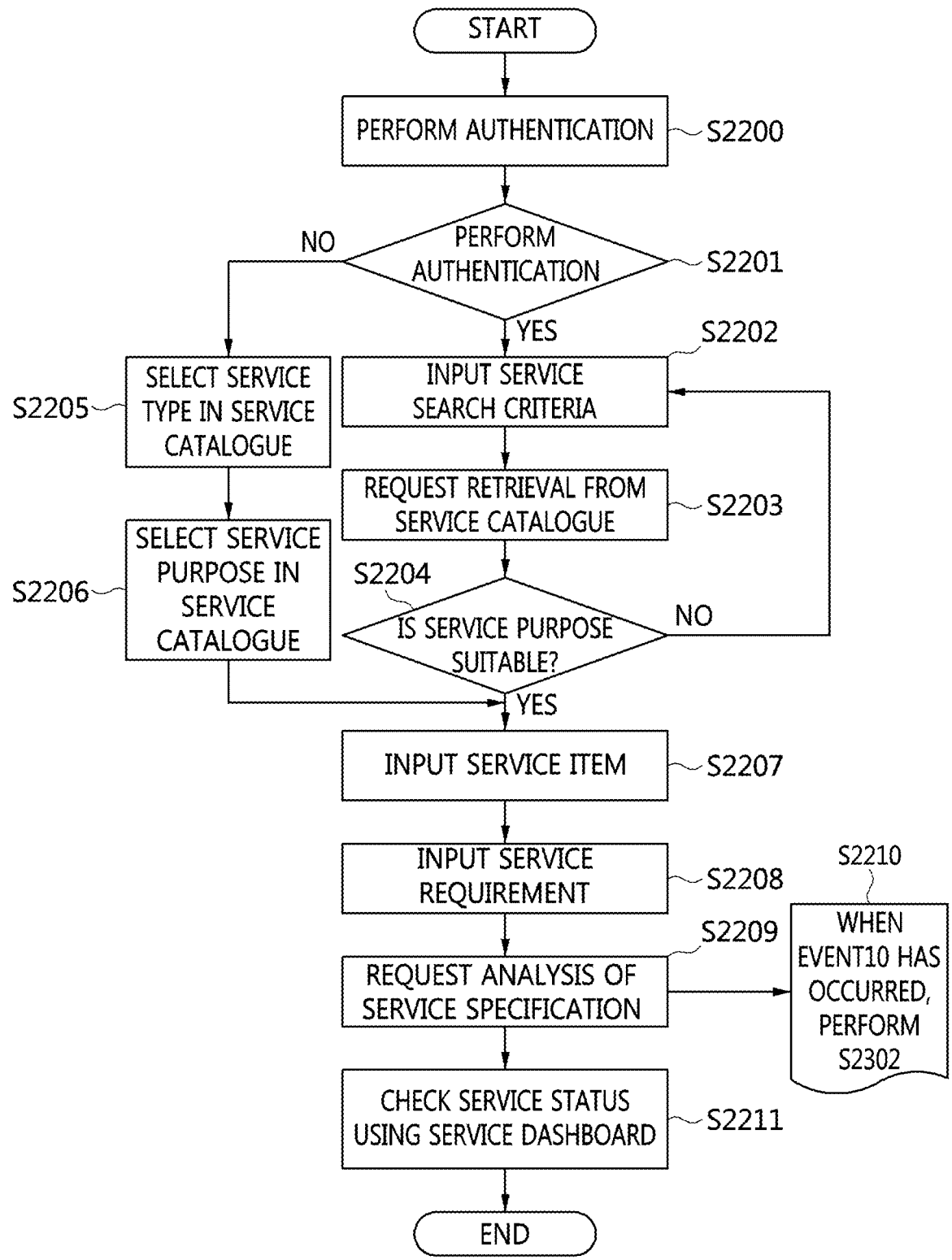
FIG. 21 is a flowchart that shows a procedure in which a cloud service consumer registers and manages a service request according to an embodiment of the present invention.

FIG. 21 is a flowchart that shows a procedure in which a CSC registers and manages a service request according to an embodiment of the present invention. Particularly, FIG. 21 shows the procedure in which each CSC sets service specifications in order to request a service, thereby inputting requirements for the service.

Referring to FIG. 21, in order to register and manage a service request, a CSC logs on to the CSC interface 2200 and obtains access privileges at step S2200.

When user authentication is successfully completed, the CSC inputs a desired service type and the purpose of the service. Here, the CSC selects a service search option in order to search a service catalogue for a directory in which the desired service is included at step S2201.

When the CSC wants to search for a service, the CSC inputs service search criteria based on keywords that match the service type and purpose at step S2202, and requests retrieval from the service catalogue at step S2203.

Then, the CSC determines whether the service purpose found in the service catalogue is suitable and sets the location at which the service requested by the CSC is to be located in the service catalogue at step S2204.

However, when it is determined that the service purpose found in the service catalogue is not suitable, the CSC returns to the process of inputting the service search criteria at step S2202 and inputs different service search criteria by changing a keyword. The CSC may repeat inputting service search criteria at step S2202, requesting retrieval from the service catalogue at step S2203, and determining whether the found service purpose is suitable at step S2204 until it is determined that the service purpose found in the service catalogue is suitable.

When it is determined that the service purpose found in the service catalogue is suitable, the location of the cloud from which the service requested by the CSC is provided is selected in the service catalogue.

Meanwhile, the CSC may search for the desired service by scanning the directories of the service catalogue, rather than using service search criteria based on keywords.

In this case, the CSC selects the service type in the service catalogue at step S2205, selects the service purpose in the service catalogue at step S2206, and checks a category and a subcategory into which services are classified.

When the service matching the desired purpose and location is selected in the service catalogue, the CSC inputs service specifications. The service specifications are defined by combining service items with service requirements. The CSC inputs service element information at step S2207 and inputs service requirements at step S2208.

The service description includes a Service Level Agreement (SLA), and the SLA includes the concept of a cloud service to be created or provided, terms used therein, definitions, content, and conditions related to the cloud service. The cloud service broker may provide a CSC with an SLA model in which the definition of a cloud service, terms used therein, conditions related thereto, and the like are described. Here, the SLA may include at least one of the SLA between a CSP and a cloud service broker and the SLA between cloud service broker and a CSC.

When service specifications are defined, the CSC requests analysis of the service specifications using the CSC interface 2200 at step S2209.

Meanwhile, when analysis of the service specifications is requested, a service specification analysis request event (event10) is triggered, whereby a distributed system for brokering is operated at step S2210.

After the CSC requests analysis of the service specifications, the CSC checks creation of a service and the status thereof using the service dashboard 2230 at step S2211.

When the service requested by the CSC is verified to be in the normal state, the procedure in which the CSC sets the service specifications is completed.

Figure 22:
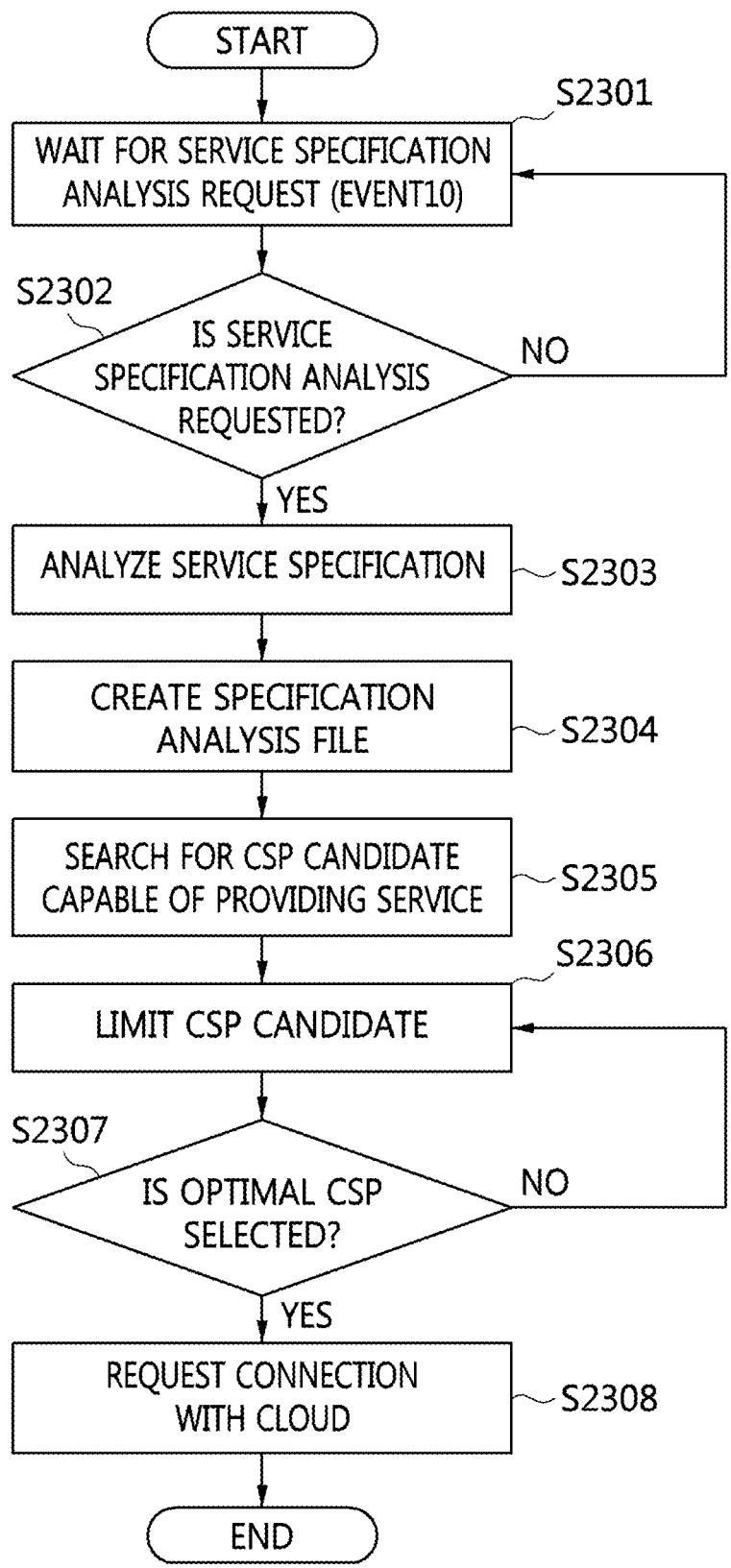
FIG. 22 is a flowchart that shows a procedure in which a cloud service broker performs service brokerage according to an embodiment of the present invention.

FIG. 22 is a flowchart that shows a procedure in which a CSB performs service brokerage according to an embodiment of the present invention. Particularly, FIG. 22 shows a procedure in which a CSB selects at least one of multiple CSPs based on the service requirements of a CSC and mediates a cloud service between the CSP and the CSC, and the brokerage process may be performed by operating modules included in the CSB engine 2400 in parallel.

Referring to FIG. 22, when the procedure in which a CSB performs cloud service brokerage is started, the service specification analysis module 2430 in the CSB engine 2400 waits for a service specification analysis request (event10) at step S2301. The service specification analysis request may be made by a CSC.

When a service specification analysis request is received at step S2302, the service specification analysis module 2430 analyzes the service specifications at step S2303 and creates a specification analysis file at step S2304 by converting the requirements for the virtual service to be allocated to the CSC into a format that can be interpreted by the service broker 2440.

When the specification analysis file is created, the service broker 2440 searches for CSP candidates that are capable of providing a service corresponding to the specification analysis file at step S2305.

Then, the service broker 2440 may select the optimal CSP by executing an optimal CSP selection algorithm for searching for the optimal CSP.

For example, the service broker 2440 limits the number of CSP candidates at step S2306 by first selecting CSP candidates that better meet the requirements of the CSC from among the found CSP candidates, and may then select the optimal CSP therefrom at step S2307.

When a CSC searches for the optimal CSP or the optimal cloud, a cloud service that is selected depending on criteria in which the requirements of the CSC are reflected may be provided.

When the optimal CSP is selected, information thereabout is provided to the CSC, and the CSP is finally selected as the optimal CSP upon approval from the CSC.

When the optimal CSP is finally selected, the cloud connection relay module 2420 makes a request for connecting the CSC to the cloud provided by the optimal CSP at step S2308.

Meanwhile, when the CSC, which received information about the optimal CSP selected by the service broker 2440, requests the selection of another CSP, selecting any one of the CSP candidates, which are selected in the process of limiting the number of CSP candidates (S2306), as the optimal CSP, providing information thereabout to the CSC, and receiving approval from the CSC may be repeatedly performed.

When the request from the cloud connection relay module 2420 to connect the CSC to the cloud is processed normally, the procedure in which the CSB performs cloud service brokerage is completed.

Meanwhile, FIG. 22 specifically shows only the procedure in which the CSB performs cloud service brokerage, but the CSB also configures an environment for facilitating the cloud service brokerage procedure before the cloud service brokerage procedure is performed.

To this end, the CSB predicts information about services to be sold by CSPs and service requirements of each CSC, classifies cloud services such that the information about the services of the CSPs and the service requirements of the CSC may be selected from directories, and forms a service catalogue based thereon.

Then, the CSB provides the service catalogue to the CSPs and the CSCs, thereby helping the CSPs register services and helping the CSCs register service requests.

Figure 23:
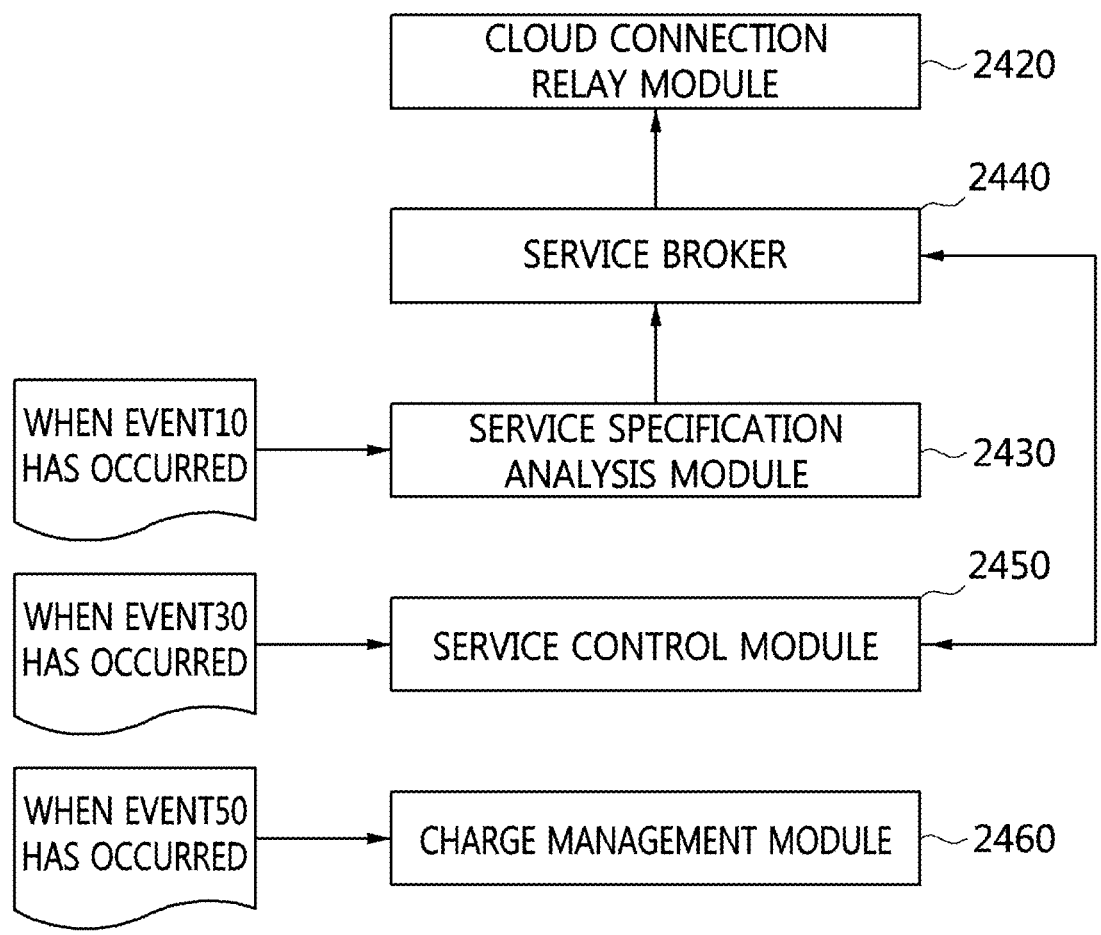
FIG. 23 is a block diagram that shows the dynamic operation of a cloud service brokerage engine according to an embodiment of the present invention.

FIG. 23 is a block diagram that shows the dynamic operation of a CSB engine according to an embodiment of the present invention.

Referring to FIG. 23, when a request for analysis of service specifications is made (that is, when event10 has occurred), the service specification analysis module 2430 creates a specification analysis file by analyzing the service specifications for providing a cloud service, and sends the same to the service broker 2440.

The service broker 2440 performs a brokering operation for selecting the optimal CSP. When the optimal CSP is selected, the cloud connection relay module 2420 enables the CSC to be connected with the cloud provided by the optimal CSP by relaying the connection. Meanwhile, when a request for service control, such as start, interruption, resumption, or deletion of a service, is made by the CSC or the like (that is, when event30 has occurred), the service control module 2450 performs a dynamic control operation for controlling the service in response to the request for service control. To this end, the service control module 2450 may control the operation of the service broker 2440.

Also, after every predetermined period of time, or when a request to generate a report is made by the CSC (that is, when event50 has occurred), the charge management module 2460 dynamically calculates the fee for using the service based on the amount of services used during the service use period and charges the CSC the fee. Also, the charge management module 2460 calculates the service fee to be paid to the CSP based on the amount of services that are used and pays the service fee to the CSP.

Figure 24:
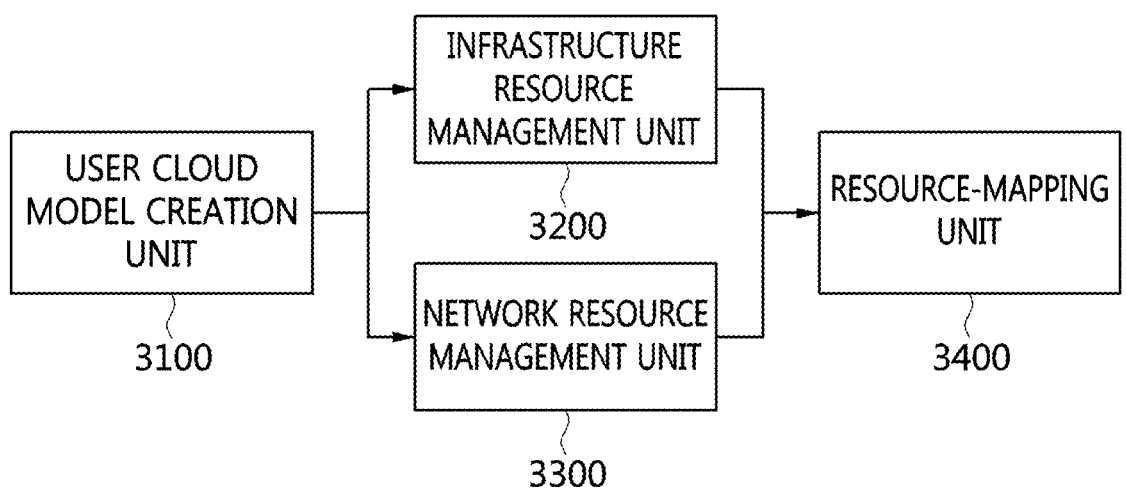
FIG. 24 is a block diagram of a resource brokerage provision device for providing a user cloud service according to a first embodiment of the present invention.

FIG. 24 is a block diagram of a resource brokerage provision device for providing a user cloud service according to a first embodiment of the present invention.

Referring to FIG. 24, the resource brokerage provision device 3000 for providing a user cloud service according to the first embodiment of the present invention may include a user cloud model creation unit 3100, an infrastructure resource management unit 3200, a network resource management unit 3300, and a resource-mapping unit 3400.

The user cloud model creation unit 3100 may create a user cloud model in response to a cloud service request from a user, and may assign a user cloud ID to the created user cloud model.

Here, the cloud resource information may include information about a cloud service and information about a cloud system that is selected so as to allocate available resources, among one or more cloud systems connected with the resource brokerage provision device 3000, in order to provide a service that meets the requirements for the cloud service desired by the user.

According to an embodiment of the present invention, the information about a cloud service may include information about a virtual machine (VM), storage, a network, and the like included in the selected cloud system.

According to an embodiment of the present invention, a user cloud model may be a model that is designed so as to reconstruct a single cloud system by being allocated resources included in one or more cloud systems that are selected based on information about the resources thereof in order to provide a cloud service that meets the requirements of a user.

Such a user cloud model may be used as a kind of design when a single cloud system is realized by requesting infrastructure resources and/or network resources from the resource brokerage provision device 3000 and aggregating the resources.

According to an embodiment of the present invention, the selected cloud system may be an Infrastructure-as-a-Service (IaaS) cloud system or a Network-as-a-Service (NaaS) cloud system, but without limitation thereto, a Platform-as-a-Service (PaaS) cloud system or a Software-as-a-Service (SaaS) cloud system may also be used.

According to an embodiment of the present invention, the user cloud ID is a unique identifier for identifying each of the created user cloud models, and may consist of numbers, alphabetic characters, or special characters, but the format is not limited thereto.

The infrastructure resource management unit 3200 sends an allocation request message to infrastructure resources, including a virtual machine, a virtual network, and virtual storage that are required for the user cloud model, and receives access information in response thereto, thereby managing the virtual machine, the virtual network, and the virtual storage.

Here, the infrastructure resource means a computing resource included in an IaaS cloud system, and more specifically, may include a virtual machine, a virtual network, and virtual storage.

Here, the computing resource may be a device capable of computation, which forms the cloud system, and may be a server or storage.

According to an embodiment of the present invention, IaaS provides a service so as to enable the use of infrastructure resources according to need by creating a virtualized environment using a server, storage, a network of virtual machines, and the like. Also, the IaaS cloud system may be a cloud system that is capable of providing such a service.

According to an embodiment of the present invention, the allocation request message may be a message that is sent in order to request the IaaS cloud system, which is selected based on the user cloud system model, to allow use of the capabilities of the computing resources included therein, that is, in order to request the IaaS cloud system to allow access to the computing resources thereof so as to be used to configure the user cloud system.

Also, according to an embodiment of the present invention, the access information in response to the allocation request message may include information about the computing resources included in the IaaS cloud system that received the allocation request message. For example, the access information may include the identification code of the cloud system, in which the computing resources are included, information about whether replication or load balancing is supported when the computing resource is a server, whether a firewall is present, and the like, but without limitation thereto, any information including details of the computing devices may be used.

According to an embodiment of the present invention, if the infrastructure resource to be used is a virtual machine, an allocation request message (including a target cloud and virtual machine configuration information) is sent to the virtual machine, and in response thereto, virtual machine access information (including a virtual machine URL, a gateway address, a cloud access address, and the like) is received from the virtual machine, whereby the virtual machine may be managed.

According to an embodiment of the present invention, if the infrastructure resource to be used is virtual storage, an allocation request message (including a target cloud and storage configuration information) is sent to the virtual storage, and in response thereto, virtual storage access information (including a virtual storage URL, a gateway address, a cloud access address, and the like) is received from the virtual storage, whereby the virtual storage may be managed.

According to an embodiment of the present invention, if the infrastructure to be used is a virtual network, an allocation request message (including a target cloud and virtual network configuration information, including replication, load balancing, firewall, and the like) is sent to the virtual network, and in response thereto, the virtual network access information is received from the virtual network, whereby the virtual network may be managed.

According to an embodiment of the present invention, the infrastructure resource management unit 3200 may be connected with a heterogenous cloud connection device, and through the connection therewith, the infrastructure resource management unit 3200 may access a different type of cloud system, request the cloud system to allow access to the infrastructure resources included therein, and receive access information from the cloud system, thereby managing the infrastructure resources.

The network resource management unit 3300 may send a network creation request message to network resources required for the user cloud model, and may receive access information in response thereto.

According to an embodiment of the present invention, a network resource may be a computing device connected over a network in order to form a cloud system.

According to an embodiment of the present invention, the network creation request message may be a message for requesting the creation of a network in order to enable the NaaS cloud system, selected based on the user cloud system model, to be used to form the user cloud system.

According to an embodiment of the present invention, the user cloud system model may also request a network between virtual servers that are physically distant from each other.

Also, the access information in response to the network creation request message may include information about the computing resources that are connected to a network and form the NaaS cloud system that received the network creation request message. For example, the access information may include the identification code of a cloud system, in which the computing resources are included, information about whether replication or load balancing is supported when the computing resource is a server, information about whether a firewall is present, and the like, but without limitation thereto, any information including details of the computing device may be used.

The resource-mapping unit 3400 may map the infrastructure resources and network resources to the user cloud model based thereon, and may request cloud resources from the cloud system connected with the resource brokerage provision device.

According to an embodiment of the present invention, mapping the infrastructure resources and the network resources is configured to send a message to a cloud system in order to request creation of a user cloud system based on the user cloud model, to receive information about the result of connection with each of the resources from the cloud system in response to the message, and to manage information about the result of the connection with the resources based on the user cloud model.

Figure 25:
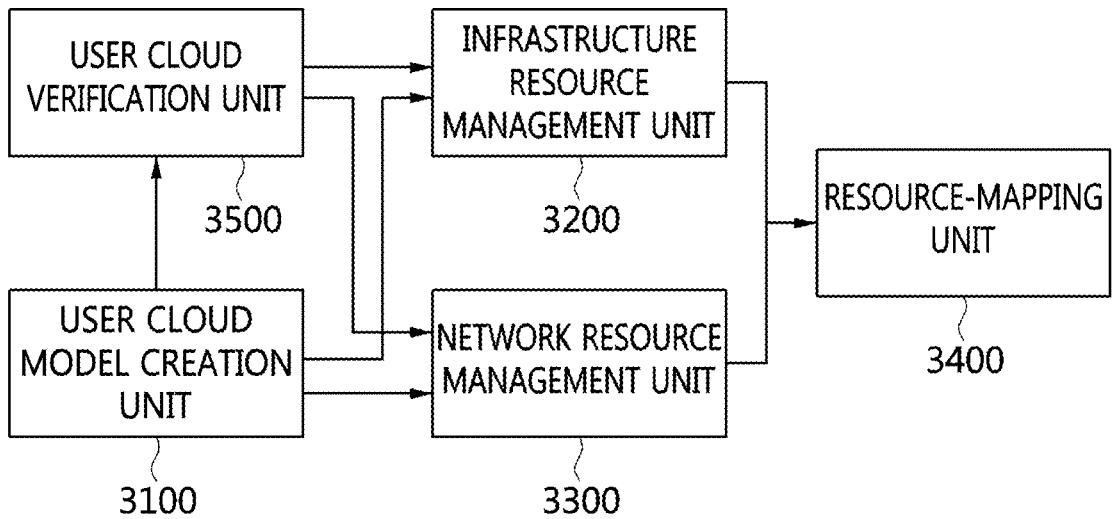
FIG. 25 is a block diagram of a resource brokerage provision device for providing a user cloud service according to a second embodiment of the present invention.

FIG. 25 is a block diagram of a resource brokerage provision device for providing a user cloud service according to a second embodiment of the present invention.

Referring to FIG. 25, the resource brokerage provision device for providing a user cloud service according to the second embodiment of the present invention may further include a user cloud verification unit 3500 in the components of the resource brokerage provision device for providing a user cloud service according to an embodiment in FIG. 24.

The user cloud verification unit 3500 may verify whether the mapped infrastructure resources and networking resources match the user cloud model and send the result of verification to the user.

According to an embodiment of the present invention, the user cloud verification unit 3500 may periodically monitor the state in which the user cloud model, created in response to the request from the user cloud model creation unit, is managed by the infrastructure resource management unit and the network resource management unit, and may verify the service requirements of the user.

Accordingly, the cloud service resource brokerage provision device or the CSB may check the service requirements of the CSC based on the cloud service requirement template.

Figure 26:
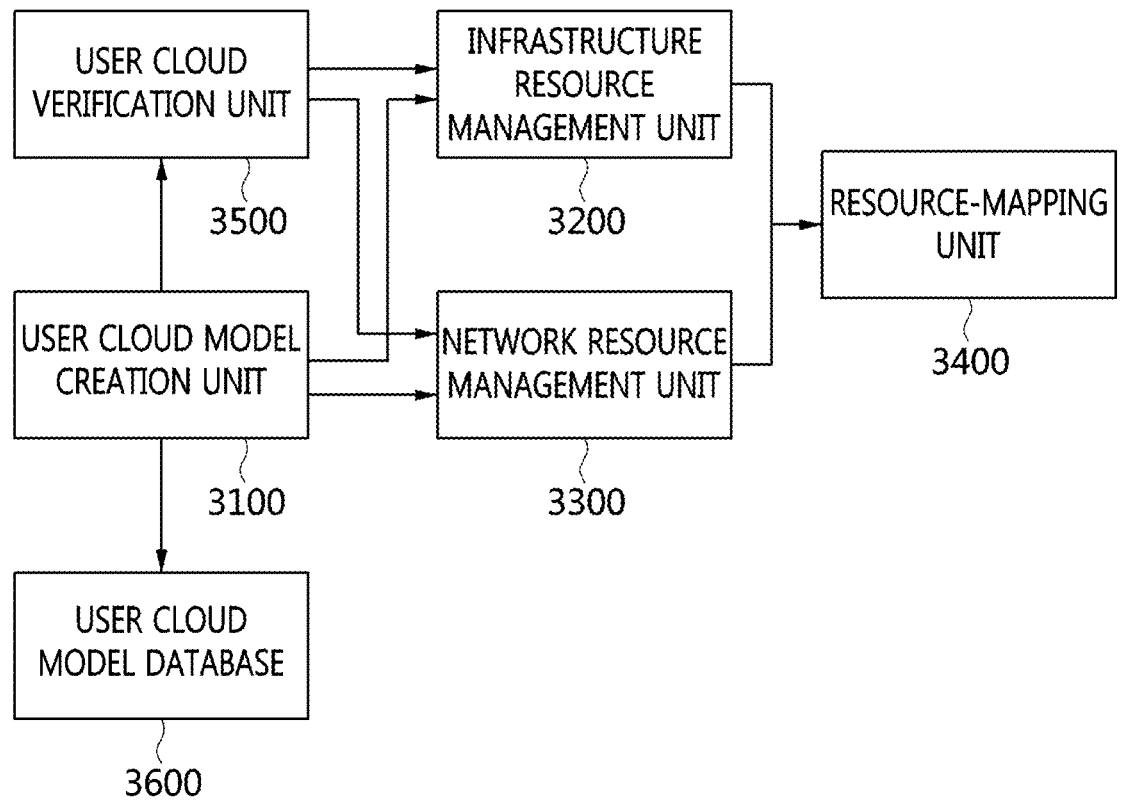
FIG. 26 is a block diagram of a resource brokerage provision device for providing a user cloud service according to a third embodiment of the present invention.

FIG. 26 is a block diagram of a resource brokerage provision device for providing a user cloud service according to a third embodiment of the present invention.

Referring to FIG. 26, the resource brokerage provision device for providing a user cloud service according to the third embodiment of the present invention may further include a user cloud model database 3600 in the components of the resource brokerage provision device for providing a user cloud service according to an embodiment in FIG. 25.

The user cloud model database 3600 may store information about the details of a user cloud model, the quality of the managed user cloud model, and a user cloud ID.

Figure 27:
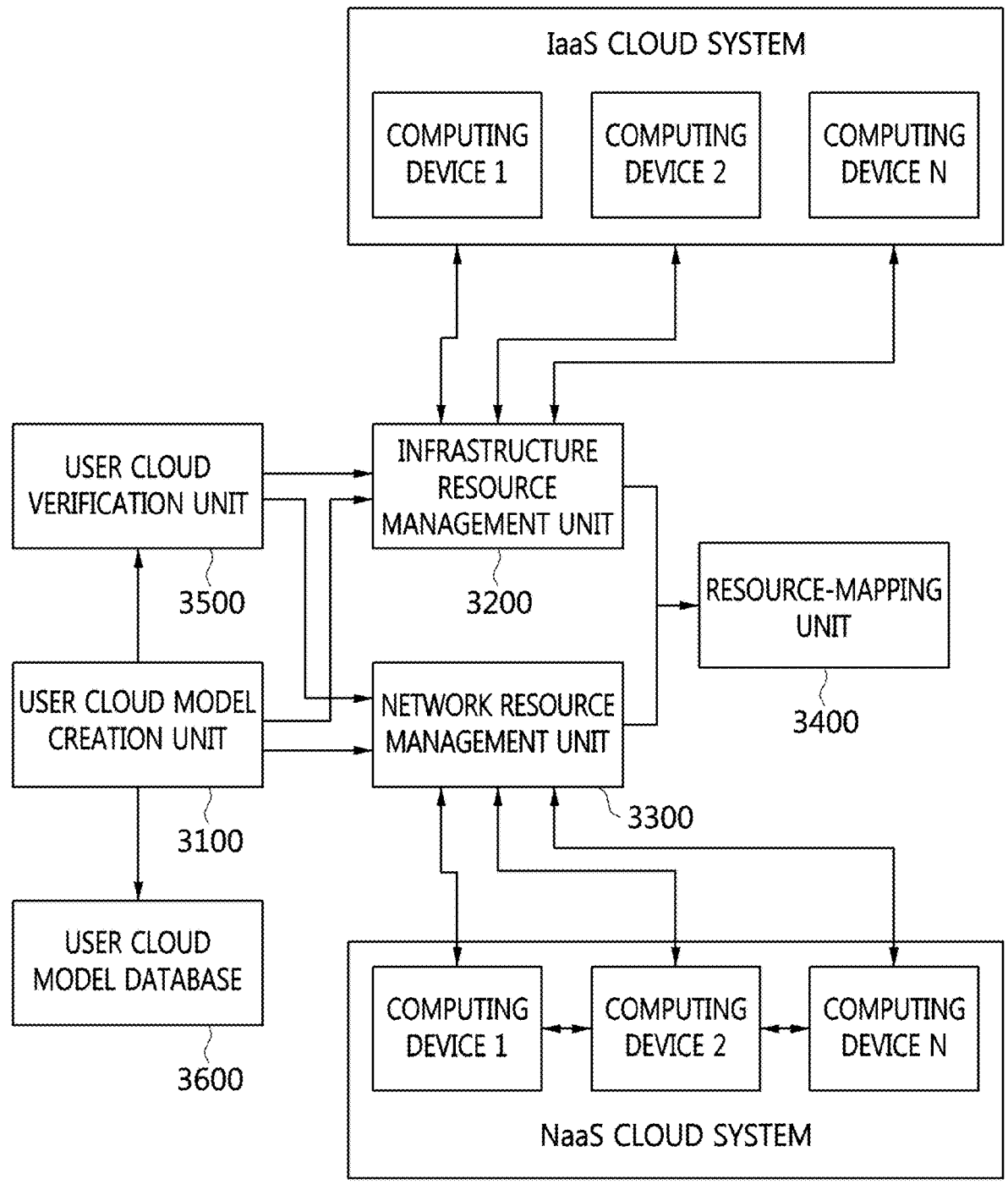
FIG. 27 is a view that shows data flow in a resource brokerage provision device for providing a user cloud service according to an embodiment of the present invention.

FIG. 27 is a view that shows data flow in a resource brokerage provision device 3000 for providing a user cloud service according to an embodiment of the present invention.

According to an embodiment of the present invention, a user cloud model creation unit 3100 may receive cloud resource information, and may create information about a user cloud model and a user cloud ID using the received cloud resource information.

According to an embodiment of the present invention, the user cloud model creation unit 3100 may send the information about the user cloud model to the infrastructure resource management unit 3200 and the network resource management unit 3300.

According to another embodiment, the user cloud model creation unit 3100 may send the information about the user cloud model to the user cloud model database 3600.

According to an embodiment of the present invention, the infrastructure resource management unit 3200 may send an allocation request message to a computing device included in the IaaS cloud system.

Also, the infrastructure management unit 3200 may receive access information from the computing device included in the IaaS cloud system in response to the allocation request message.

Also, according to an embodiment of the present invention, the network resource management unit 3300 may send a network creation request message to the computing device that is connected to a network in the NaaS cloud system.

Also, the network resource management unit 3300 may receive access information from the computing device included in the NaaS cloud system in response to the network creation request message.

The resource-mapping unit 3400 may receive the access information and the information about the user cloud model from each of the infrastructure resource management unit 3200 and the network resource management unit 3300.

According to an embodiment of the present invention, based on the access information about the mapped infrastructure resource and network resource, which is created by the resource-mapping unit 3400, a request for connection may be sent to the corresponding resources.

According to another embodiment of the present invention, the user cloud verification unit 3500 may periodically monitor the state in which the user cloud model, created in response to the request from the user cloud model creation unit, is managed by the infrastructure resource management unit and the network resource management unit, and may verify the service requirements of the user.

The user cloud verification unit 3500 may send the result of verification to the user. Here, when it is determined that the mapped resources do not match the user cloud model, the user cloud verification unit 3500 may send information including an instruction to perform a mapping operation to the resource-mapping unit 3400. Conversely, when it is determined that the mapped resources match the user cloud model, the user cloud verification unit 3500 may send the result of verification to the user.

Figure 28:
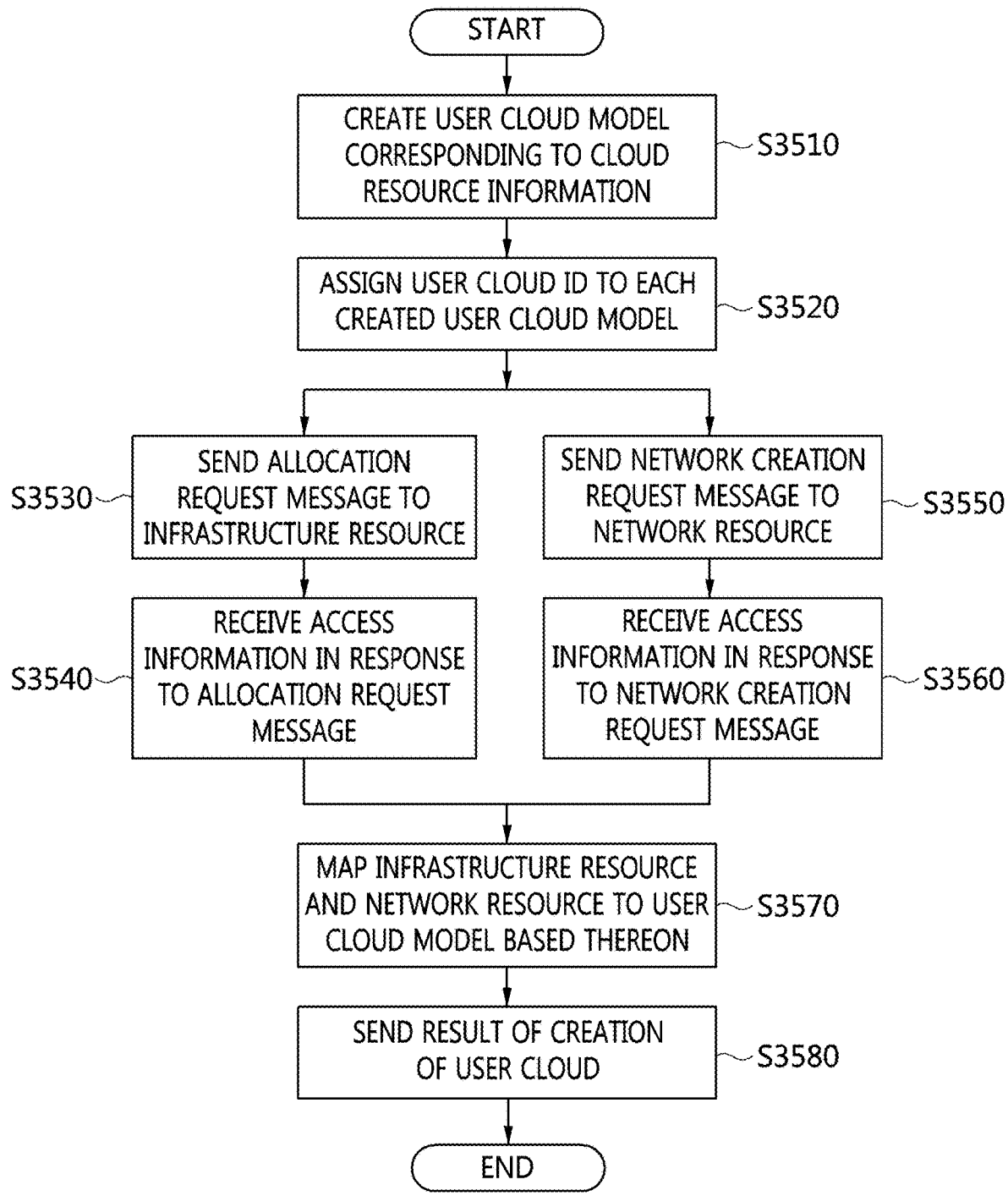
FIG. 28 is a flowchart that shows a resource brokerage provision method for providing a user cloud service according to an embodiment of the present invention.

FIG. 28 is a flowchart that shows a resource brokerage provision method for providing a user cloud service according to an embodiment of the present invention.

First, a user cloud model corresponding to cloud resource information is created at step S3510.

The cloud resource information is a list of at least one cloud resource connected with the resource brokerage provision device 3000 in order to provide a service that meets the requirements for a cloud requested by the user.

According to an embodiment of the present invention, the list of cloud resources may include information about a virtual machine (VM), storage, a network, and the like.

Then, a user cloud ID is assigned to each of the created user cloud models at step S3520.

According to an embodiment of the present invention, a user cloud ID may be assigned to each of the created user cloud models.

According to an embodiment of the present invention, the user cloud ID is a unique identifier for identifying each of the created user cloud models.

Then, an allocation request message is sent to an infrastructure resource at step S3530.

According to an embodiment of the present invention, an allocation request message may be sent to an infrastructure resource that is required for the user cloud model.

According to an embodiment of the present invention, IaaS may provide a service so as to enable the use of infrastructure resources according to need by creating a virtualized environment using a server, storage, a network of virtual machines, and the like. Also, an IaaS cloud system may be a cloud system that is capable of providing such a service.

Then, access information is received in response to the allocation request message at step S3540.

According to an embodiment of the present invention, the access information in response to the allocation request message may include the unique identification number of the cloud resource that forms the user cloud, configuration information, and the result of the allocation request (success or failure).

Then, a network creation request message is sent to a network resource at step S3550.

According to an embodiment of the present invention, the network creation request message may be a message for requesting the NaaS cloud system, which is selected based on the user cloud system model, to create a network.

Then, access information in response to the network creation request message is received at step S3560.

According to an embodiment of the present invention, access information in response to the network creation request message may be received.

The access information in response to the network creation request message may include the unique identification number of a network resource forming the user cloud, configuration information, and the result of the creation request (success or failure).

Then, based on the user cloud model, the infrastructure resource and network resource are mapped thereto at step S3570.

According to an embodiment of the present invention, the infrastructure resource and the network resource may be mapped to the user cloud model based on the user cloud model.

According to an embodiment of the present invention, mapping the infrastructure resource and the network resource may be performed using the method of connecting the infrastructure resource and the network resource, which are allocated to form a cloud system based on the user cloud model, over a network.

Then, the result of creation of the user cloud is sent at step S3580.

According to an embodiment of the present invention, a result, such as success or failure, of the creation of the user cloud model identified by each user cloud ID may be sent.

Figure 29:
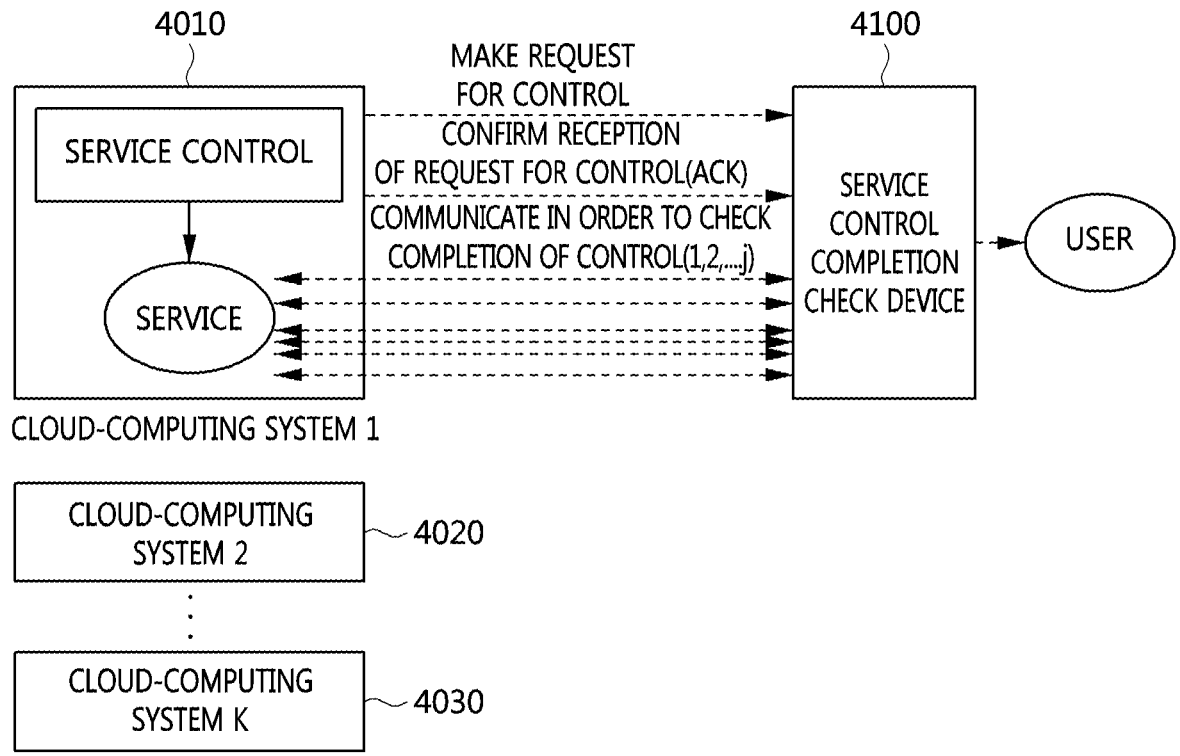
FIG. 29 is a block diagram that shows a system operating in connection with a cloud according to an embodiment of the present invention.

FIG. 29 is a block diagram that shows a system operating in connection with a cloud according to an embodiment of the present invention.

Referring to FIG. 29, a system operating in connection with a cloud is configured such that a service control completion check device 4100 may communicate with multiple cloud-computing systems 4010, 4020 and 4030, and such that the service control completion check device 4100 may request service control therefrom.

The service control completion check device 4100 may request service control from the computing system 4010 by sending a service control message thereto.

Here, service control may be requested in order to create, interrupt, resume or terminate a service.

e, interrupt, resume or terminate a service.

Here, the computing system 4010 may actually control the service in response to the request from the service control completion check device 4100.

Here, the computing system 4010 may send an acknowledgement (ACK) back to the service control completion check device 4100 in order to announce the reception of the service control message.

Here, because there is no guarantee that service control is completed when the ACK is sent, the service control completion check device 4100 needs to check whether service control is completed after receiving the ACK.

Here, the service control completion check device 4100 communicates with the computing system at every check period in order to check whether service control is completed. Here, the check period may be set using a probability-based statistical technique.

Here, the service control completion check device 4100 may change the number of attempts to check the completion of service control and the check period depending on the control completion probability.

That is, when the control completion probability is high, the service control completion check device 4100 may communicate with the computing device more frequently in order to check the completion of service control, whereas when the control completion probability is low, the service control completion check device 4100 may communicate with the computing device less frequently.

Accordingly, the communication load of the system operating in connection with cloud-computing systems and the multiple cloud-computing systems is decreased, and the responsiveness to user requests and the quality of experience may be improved.

Also, the service control completion check device 4100 may update the status of service control and provide information thereabout to the user.

Figure 30:
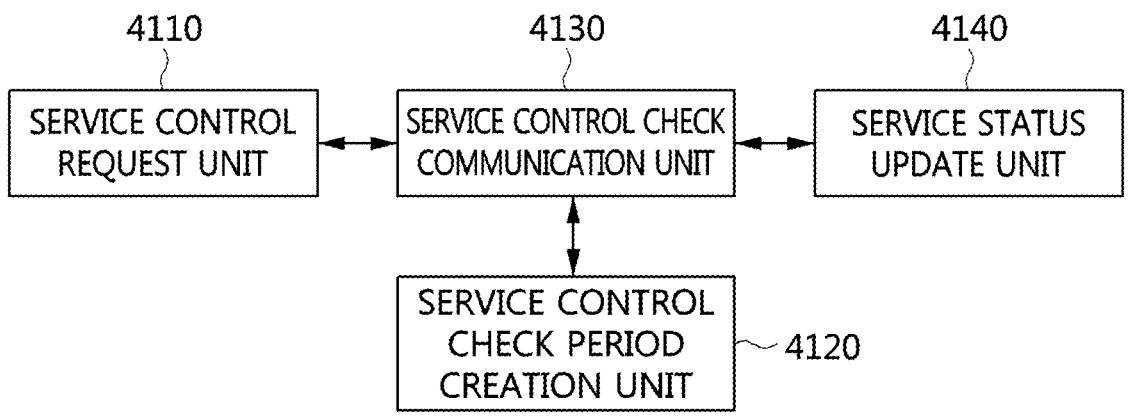
FIG. 30 is a block diagram that shows a service control completion check device according to an embodiment of the present invention.

FIG. 30 is a block diagram that shows a service control completion check device according to an embodiment of the present invention.

Referring to FIG. 30, the service control completion check device 4100 according to an embodiment of the present invention includes a service control request unit 4110, a service control check period creation unit 4120, a service control check communication unit 4130, and a service status update unit 4140.

The service control request unit 4110 may request service control from a computing system 4010.

Here, the service control request unit 4110 sends a service control request message to the computing system 4010 in order to perform a service task requested by the user, and receives an ACK from the computing system 4010 in response thereto.

That is, the service control request unit 4110 of the cloud service resource brokerage provision device (a system operating in conjunction with a cloud) or of a CSB starts a validation process for checking a service control status after the cloud service broker receives an acknowledgement (ACK) in response to a service control request. The ACK made in response to the service control request is a message sent by a CSP, and is a response confirming that the CSP has received the service control request from the cloud service resource brokerage provision device (a system operating in conjunction with a cloud) or the CSB.

The service control check period creation unit 4120 may set a check period in order to check the completion of service control.

Here, the service control check period creation unit 4120 may set the check period by predicting the service control completion time.

Here, using a history, the service control check period creation unit 4120 may predict the service control completion time depending on the type of the service.

Here, the service control check period creation unit 4120 may store a history in which a service control completion time of a control request transaction for each service type is included.

The history may be input using statistical data for each service type based on user configurations, or may be information in which a past service control completion time, at which the completion of service control was confirmed, is stored.

Figure 31:
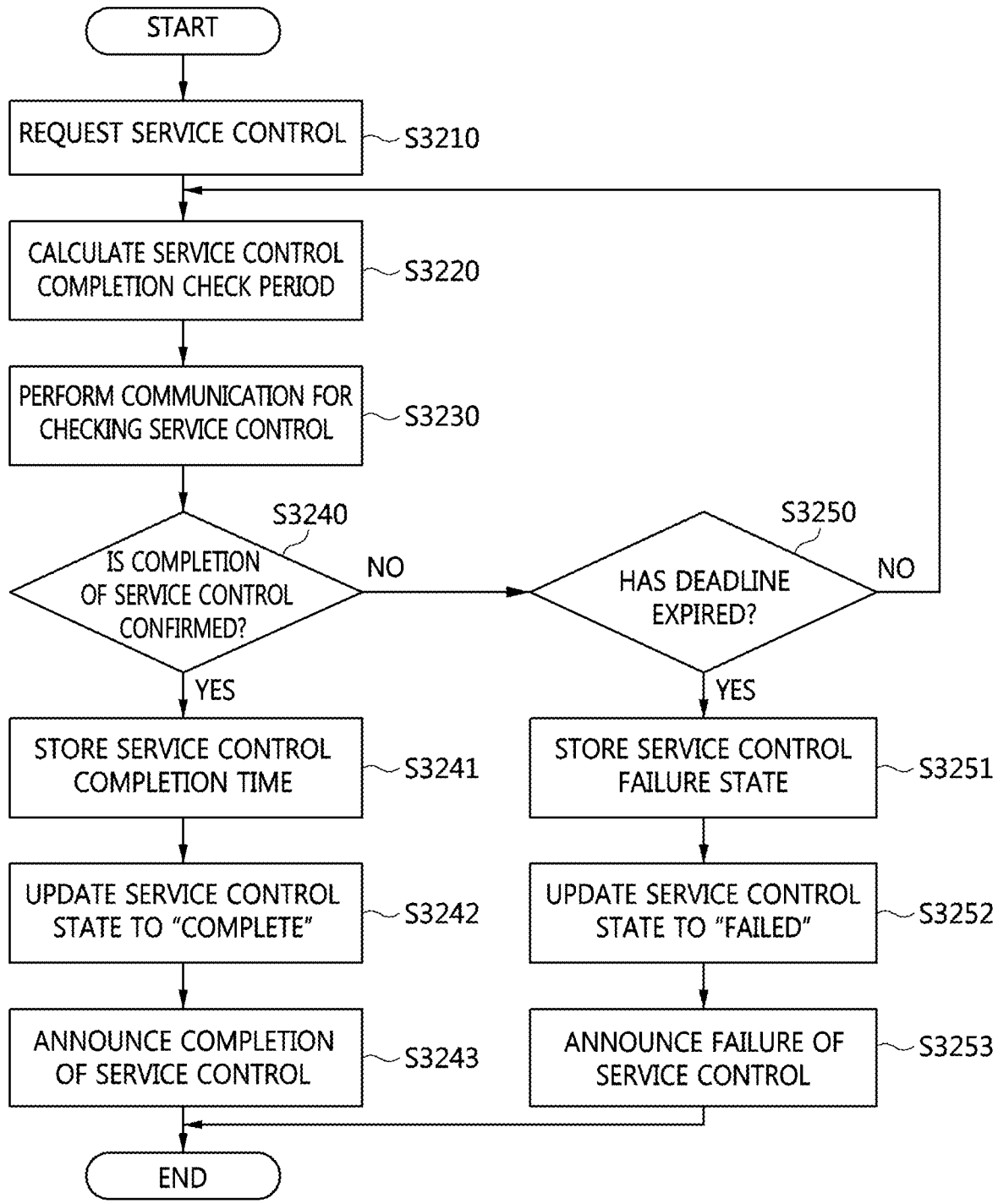
FIG. 31 is a flowchart that shows a method for checking the completion of service control according to an embodiment of the present invention.

FIG. 31 is a flowchart that shows a method for checking the completion of service control according to an embodiment of the present invention.

Referring to FIG. 31, in the method for checking the completion of service control according to an embodiment of the present invention, first, service control may be requested at step S3210.

That is, a request for service control may be sent to a computing system 4010 at step S3210.

Here, at step S3210, a service control request message may be sent to the computing system 4010 in order to perform a service task requested by a user, and an ACK may be received from the computing system 4010 in response thereto.

Also, in the method for checking the completion of service control according to an embodiment of the present invention, a check period may be set at step S3220.

Here, because setting a check period at step S3220 is performed in the same manner as the method of setting the check period using the service control period creation unit 4120, a description thereof will be omitted.

Also, in the method for checking the completion of service control according to an embodiment of the present invention, communication for checking service control may be performed at step S3230.

That is, at step S3230, communication with the computing system may be performed based on the check period in order to check the status of service control.

Also, in the method for checking the completion of service control according to an embodiment of the present invention, whether service control is completed may be checked at step S3240.

That is, when the completion of service control is confirmed at step S3240, the status of service control may be updated to 'complete' at steps S3241, S3242 and S3243, whereas when it is confirmed that service control is not complete at step S3240, whether a deadline has expired is checked at step S3250.

Here, at step S3241, a service control completion time may be stored in a history.

Here, at step S3242, the status of service control may be updated to 'complete'.

Here, at step S3243, the completion of service control may be made known to the user.

Also, when it is determined at step S3250 that the deadline has expired, the status of service control may be updated to 'failed' at steps S3251, S3252 and S3253, whereas when it is determined at step S3250 that the deadline has not expired, the process returns to step S3220 and setting the check period may be requested again.

Here, at step S3251, the failure state is stored in the history.

Here, at step S3252, the status of service control may be updated to 'failed'.

Here, at step S3253, the failure of service control may be made known to the user.

Figure 32:
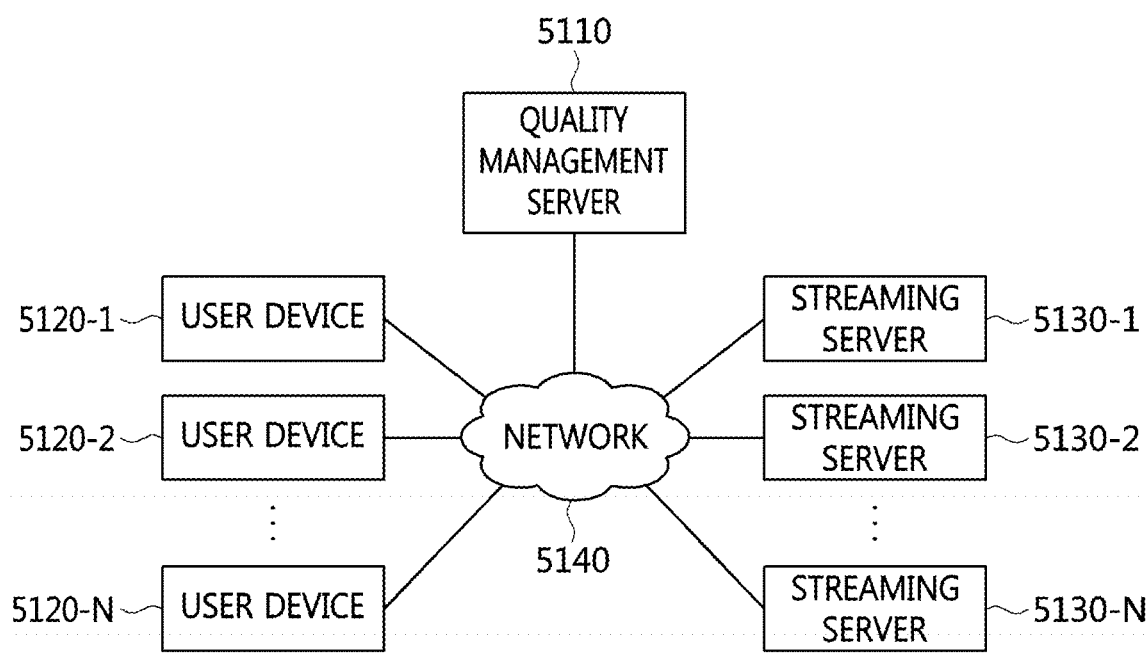
FIG. 32 is a view that shows a system for improving the performance of a streaming service according to an embodiment of the present invention.

FIG. 32 is a view that shows a system for improving the performance of a streaming service according to an embodiment of the present invention.

Referring to FIG. 32, a system for improving the performance of a streaming service according to an embodiment of the present invention includes a quality management server 5110, user devices 5120-1 to 5120-N, streaming servers 5130-1 to 5130-N, and a network 5140.

Each of the user devices 5120-1 to 5120-N may be a device that is provided with a streaming service based on the cloud. For example, each of the user devices may be a smartphone, a cellphone, a laptop, a computing node, or the like, which is capable of producing and playing video.

The streaming servers 5130-1 to 5130-N may provide a streaming service based on the cloud. For example, the streaming servers 5130-1 to 5130-N provide streaming data, which are input from the user devices 5120-1 to 5120-N, to be input to or output from a storage device, such as a disk or the like, thereby providing a streaming service.

The quality management server 5110 receives information about the service quality of the streaming service from at least one of the user devices 5120-1 to 5120-N and the streaming servers 5130-1 to 5130-N, thereby monitoring whether the quality of the service provided to the user devices 5120-1 to 5120-N is degraded.

Also, the quality management server 5110 may perform a quality assurance activity on the streaming servers 5130-1 to 5130-N in order to manage the service quality for the user devices 5120-1 to 5120-N.

For example, the quality assurance activity may be at least one of migration of a streaming server, replication of a streaming server, and extending the I/O performance of a streaming server using data replication.

The network 5140 provides a channel via which the quality management server 5110, the user devices 5120-1 to 5120-N, and the streaming servers 5130-1 to 5130-N transmit data therebetween, and may be conceptually understood as including networks that are currently being used and networks that have yet to be developed.

For example, the network 5140 may be any one of wired and wireless local area networks for providing communication between various kinds of data devices in a limited area, a mobile communication network for providing communication between mobile devices or between a mobile device and the outside thereof, a satellite network for providing communication between earth stations using a satellite, and a wired and wireless communication network, or may be a combination of two or more selected therefrom. Meanwhile, the transfer protocol standard for the network 5140 is not limited to existing transfer protocol standards, but includes all transfer protocol standards to be developed in the future. Also, the network depicted as being used between the quality management server 5110, the user devices 5120-1 to 5120-N, and the streaming servers 5130-1 to 5130-N in FIG. 32 may differ from the network between the user devices 5120-1 to 5120-N or the network between the streaming servers 5130-1 to 5130-N, or may be the same as the network between the user devices 5120-1 to 5120-N or the network between the streaming servers 5130-1 to 5130-N.

Figure 33:
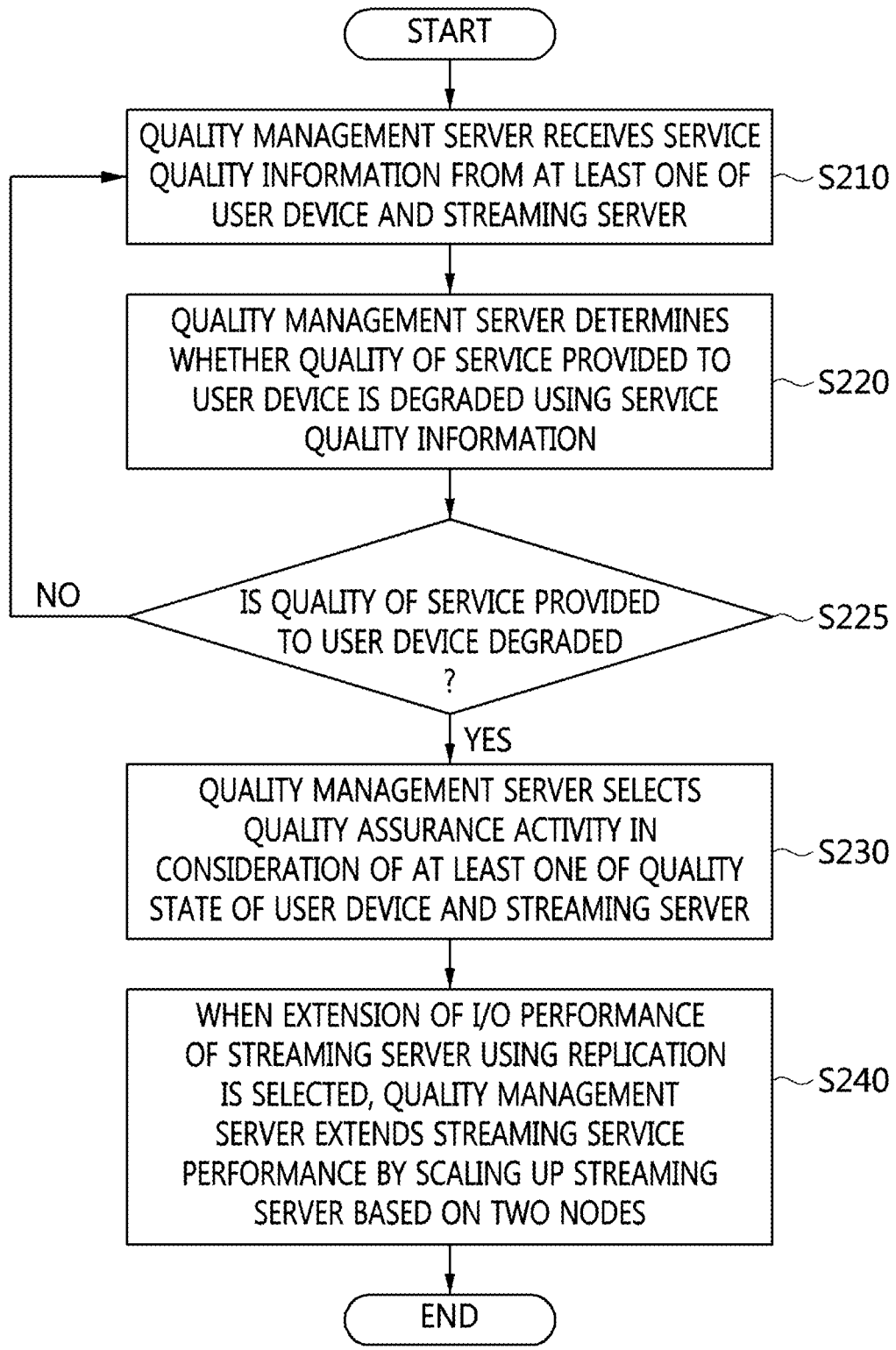
FIG. 33 is a flowchart that shows a method for improving the performance of a streaming service according to an embodiment of the present invention.

FIG. 33 is a flowchart that shows a method for improving the performance of a streaming service according to an embodiment of the present invention.

Referring to FIG. 33, in the method for improving the performance of a streaming service according to an embodiment of the present invention, the quality management server receives information about the service quality from at least one of a user device and a streaming server at step S210.

Here, each of the user device and the streaming server may collect and analyze information about service quality while the streaming service is operating, and may transmit the same to the quality management server.

The components and operation of the user device and the streaming server will be described in detail with reference to FIGS. 34 to 37.

Here, the information about service quality received from the user device and the streaming server may be stored in a quality information database that is separate from the quality management server.

Also, in the method for improving the performance of a streaming service according to an embodiment of the present invention, the quality management server determines whether the quality of the service provided to the user device is degraded using the information about service quality at step S220.

Here, the information about service quality stored in the quality information database may be extracted based on time information, and may be used to determine whether the quality of the service provided to the user device is degraded.

Here, when at least one of the state in which the response time of the read operation of the user device is longer than a preset maximum response time and the state in which the service bandwidth of the user device is less than a preset minimum bandwidth is maintained longer than a preset duration, it may be determined that the quality of the service provided to the user device is degraded.

Here, the preset duration may be freely set and changed by a streaming service administrator.

Also, in the method for improving the performance of a streaming service according to an embodiment of the present invention, when it is determined that the quality of the service provided to the user device is degraded, the quality management server selects a quality assurance activity in consideration of the quality of the service provided to the user device and the quality of the service provided by the streaming server at step S230.

Here, a quality assurance activity may be selected in consideration of at least one of the response time of the read operation of the user device, the service bandwidth of the user device, the bandwidth used by the streaming server, and the number of users accessing the streaming server.

Here, the bandwidth used by the streaming server and the number of users accessing the streaming server may be information about the streaming server that is associated with the user device that is determined to be provided with service having the degraded quality.

Here, when the service bandwidth of the user device is less than a preset minimum bandwidth, when the number of users accessing the streaming server is less than the preset maximum number of users, and when the bandwidth used by the streaming server is greater than a preset maximum bandwidth usage, extending the I/O performance of the streaming server using data replication may be selected as the quality assurance activity. That is, the exhaustion of the bandwidth allocated for the I/O operation of the streaming server means that the I/O performance required by the user device exceeds the I/O performance of the streaming server. Accordingly, in order to improve the I/O performance of the streaming server, extending the I/O performance of the streaming server using data replication may be performed.

Also, when the response time of the read operation is longer than a preset maximum response time, when the service bandwidth of the user device is greater than the preset minimum bandwidth, and when the bandwidth used by the streaming server is less than the preset maximum bandwidth usage, migration of the streaming server may be selected as the quality assurance activity. In this case, because the service bandwidth of the user device and the I/O performance of the streaming server are satisfactory, the latency of the response to the read operation is increased due to the long distance between the user device and the streaming server or due to a problem with the network. Therefore, the streaming server may be migrated.

Also, when the service bandwidth of the user device is less than the preset minimum bandwidth, when the bandwidth used by the streaming server is greater than the preset maximum bandwidth usage, and when the number of users accessing the streaming server is greater than the preset maximum number of users, replication of the streaming server may be selected as the quality assurance activity.

Also, in the method for improving the performance of a streaming service according to an embodiment of the present invention, when extending the I/O performance of a streaming server using data replication is selected as the quality assurance activity, the quality management server scales up the streaming server based on two or more nodes, whereby the performance of the streaming service is extended without the interruption of the service at step S240.

Here, when the streaming server corresponding to a master node, which is any one of the two or more nodes, receives streaming data, the master node calls slave nodes, which are the remaining nodes exclusive of the master node from the two or more nodes, thereby storing the streaming data.

For example, two or more candidate nodes are selected from among multiple nodes included in a cloud system, any one of the candidate nodes is selected as a master node, and the remaining candidate nodes, exclusive of the master node, are selected as slave nodes. That is, the master node may be a single node, and the multiple slave nodes may be operated by being called by the master node.

Here, a virtual machine is created in the master node, whereby a streaming server on which a remote memory management submodule for calling the slave nodes is running may be operated.

Also, a virtual machine is created in the slave node, whereby a streaming server on which a local memory management submodule for replicating streaming data from a block level is running may be operated.

Here, the remote memory management submodule running on the streaming server corresponding to the master node and the local memory management submodule running on the streaming server corresponding to the slave node will be described later with reference to FIG. 37.

Additionally, the local memory management submodule may replicate streaming data into a block device in consideration of at least one of a preset replication period and the amount of memory used in the slave node. For example, the block device may be a storage device such as a Hard Disk Drive (HDD).

Also, although not illustrated in FIG. 33, in the method for improving the performance of a streaming service according to an embodiment of the present invention, when the operation performed as the result of the quality assurance activity in the streaming server is confirmed after the completion of the quality assurance activity, information about service quality is consistently collected from the user device and the streaming server, and quality management and performance extension may be performed.

Also, although not illustrated in FIG. 33, in the method for improving the performance of a streaming service according to an embodiment of the present invention, various kinds of information generated during the process of improving the performance of a streaming service is stored.

Through the method for improving the performance of a streaming service, the performance of the streaming service may be improved using a scale-up method without the interruption of streaming service in order to support a stable cloud streaming service.

Also, the method using remote memory, which may provide better performance than data storage and management using a block device such as an HDD, is provided, whereby the I/O performance of the cloud streaming service may be improved without the purchase or installation of additional hardware. Also, information about the quality of the streaming service is periodically collected from a user device and the streaming server, whereby the service state may be monitored.

FIG. 34 is a block diagram that shows an example of the user device illustrated in FIG. 32.

Referring to FIG. 34, the user device 5120-1 illustrated in FIG. 32 includes a video production/replay module 5121, a service quality information collection module 5122, a service quality information analysis module 5123, and a service quality information transmission module 5124.

The video production/replay module 5121 may stream the video recorded by a user to a streaming server so as to be stored therein, that is, may produce video by requesting the streaming server to write the streaming data, and may play certain video by requesting the streaming server to read data for the video.

The service quality information collection module 5122 may measure the time at which the user device 5120-1 requests the streaming server to read or write data, the time at which reading or writing streaming data is completed, the size of streaming data transmitted from the user device 5120-1 to the streaming server, or the size of streaming data that the user device 5120-1 receives from the streaming server.

For example, when video is played in the user device 5120-1, multiple requests to read streaming data may be made. Here, the time at which a request to read the streaming data is made, the time at which streaming data first arrive after the request to read the streaming data is made, the size of streaming data received by the user device 5120-1 after the first request to read the streaming data is made, and the like may be measured.

The service quality information analysis module 5123 may select the streaming data write bandwidth, the streaming data read bandwidth, the response time, and the like as service quality attributes and calculate the selected service quality attributes.

For example, when video is produced in the user device 5120-1, multiple requests to write data may be made. Here, the time at which a request to write streaming data is made and the time at which streaming data are completely written are extracted from the service quality information collection unit 5122, whereby a write service time (WriteServiceTime) may be calculated.

In another example, the time at which a request to read streaming data is made and the time at which streaming data are completely read are extracted from the service quality information collection unit 5122, whereby a read service time (ReadServiceTime) may be calculated.

Also, the service quality information analysis module 5123 calculates the size of data transmitted to the streaming server during the write service time (WriteTotal StreamSize) and the size of data transmitted from the streaming server during the read service time (ReadTotalStreamSize), thereby calculating the write service bandwidth (WriteServiceBandwidth) and the read service bandwidth (ReadServiceBandWidth), as shown in FIG. 35.

Also, the service quality information analysis module 5123 may calculate a read service response time (ReadServiceResponseTime) as a quality attribute when video is played, as shown in FIG. 35.

The service quality information transmission module 5124 may transmit the service quality information calculated by the service quality information analysis module 5123 to the quality management server.

Figure 36:
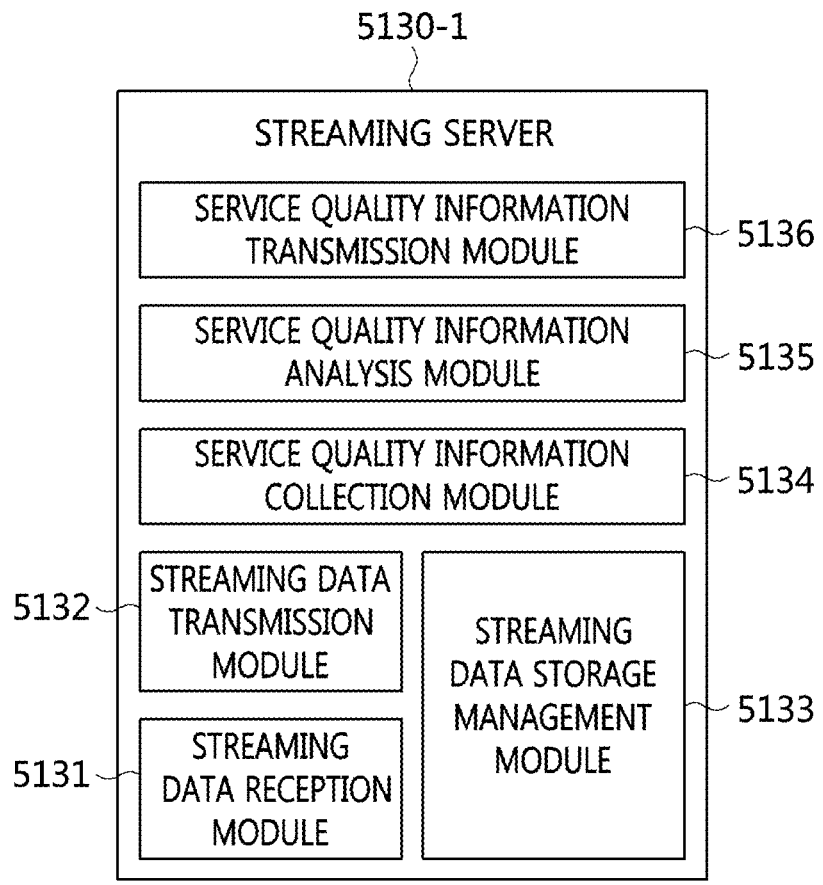
FIG. 36 is a block diagram that shows an example of the streaming server illustrated in FIG. 32.

FIG. 36 is a block diagram that shows an example of the streaming server illustrated in FIG. 32.

Referring to FIG. 36, the streaming server 5130-1 illustrated in FIG. 32 includes a streaming data reception module 5131, a streaming data transmission module 5132, a streaming data storage management module 5133, a service quality information collection module 5134, a service quality information analysis module 5135, and a service quality information transmission module 5136.

The streaming data reception module 5131 may store the streaming data input to the streaming server 5130-1 in such a way that the streaming data storage management module 5133 performs a write (output) operation.

The streaming data transmission module 5132 may read the streaming data requested to be read from the streaming server 5130-1 in such a way that the streaming data storage management module 5133 performs a read (input) operation.

Figure 37:
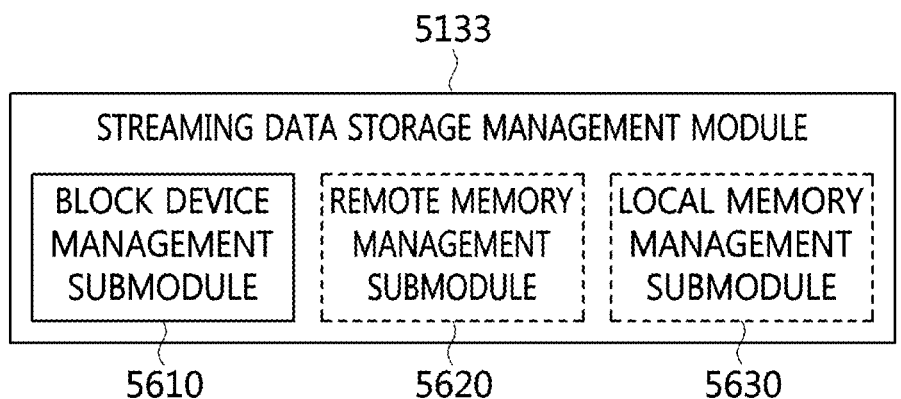
FIG. 37 is a block diagram that shows an example of the streaming data storage management module illustrated in FIG. 36.

The streaming data storage management module 5133 may include a block device management submodule 5610, a remote memory management submodule 5620, and a local memory management submodule 5630, as shown in FIG. 37.

Basically, the streaming data storage management module 5133 may store and manage data through the block device management submodule 5610. Here, the block device management submodule 5610 may store and manage streaming data based on a physical block device such as an HDD.

Here, the remote memory management submodule 5620 and the local memory management submodule 5630 may be used only when the quality management server extends the I/O performance of the streaming server 5130-1 using data replication as a quality assurance activity.

The remote memory management submodule 5620 may process the streaming service of the streaming server 5130-1 by calling the streaming service of another streaming server. Here, if the other streaming server, the streaming service of which is called by remote memory management submodule 5620 of the streaming server 5130-1, is the streaming server 5130-2 illustrated in FIG. 32, the local memory management submodule of the streaming server 5130-2 may input or output data from or to the local memory thereof.

The local memory management submodule 5630 may replicate the data stored in the memory into the block device, such as an HDD, in response to a request for an asynchronous write operation.

Here, the operation for replicating memory data into the block device may be performed periodically based on a certain period or when data fill the memory to a certain limit.

In the streaming server 5130-1, the service quality information collection module 5134, the service quality information analysis module 5135, and the service quality information transmission module 5136 for quality management may perform functions that are similar to the functions of the service quality information collection module 5122, the service quality information analysis module 5123, and the service quality information transmission module 5124 of the user device 5120-1, which have been described with reference to FIG. 34.

However, the service quality information collection module 5134 of the streaming server 5130-1 may differ from the service quality information collection module 5122 of the user device 5120-1 in that the quality information measured by the service quality information collection module 5134 of the streaming server 5130-1 includes the number of service users and the streaming data write bandwidth and the streaming data read bandwidth of the storage management submodule, which operates in the streaming data storage management module 5133.

FIG. 38 is a view that shows an example of a process for selecting a quality assurance activity according to the present invention.

Referring to FIG. 38, in order to select a quality assurance activity according to the present invention, the response time of the read operation of the user device ($RS\_RT_{userDevice}(U_j)$), the service bandwidth for read and write operations of the user device ($RW\_AB_{userDevice}(U_j)$), the bandwidth for read and write operations of the streaming server ($RW\_AB_{streamServer}(S_j)$), and the number of users accessing the streaming server ($UserNum_{streamServer}(S_j)$) are used as criteria.

The process of selecting a quality assurance activity in consideration of these criteria is as follows.

For example, when the response time of the read operation of the user device ($RS\_RT_{userDevice}(U_j)$) is longer than a preset maximum response time (Max Value), when the service bandwidth of the user device ($RW\_AB_{userDevice}(U_j)$) is greater than a preset minimum bandwidth (Min Value), and when the bandwidth used by the streaming server ($RW\_AB_{streamServer}(S_j)$) is less than a preset maximum bandwidth usage (Max Value), as illustrated in FIG. 38, it is determined that the user device is too distant from the streaming server, or that there is a problem with a network, and thus the streaming server may be migrated.

In another example, when the service bandwidth of the user device ($RW\_AB_{userDevice}(U_j)$) is less than the preset minimum bandwidth (Min Value), when the bandwidth used by the streaming server ($RW\_AB_{streamServer}(S_j)$) is greater than the preset maximum bandwidth usage (Max Value), and when the number of users accessing the streaming server ($UserNum_{streamServer}(S_j)$) is greater than the preset maximum number of users (Max Value), as illustrated in FIG. 38, it is determined that it is necessary to replicate the streaming server, and the streaming server may be replicated.

In another example, when the service bandwidth of the user device ($RW\_AB_{userDevice}(U_j)$) is less than the preset minimum bandwidth (Min Value), when the number of users accessing the streaming server ($UserNum_{streamServer}(S_j)$) is less than the preset maximum number of users (Max Value), and when the bandwidth used by the streaming server ($RW\_AB_{streamServer}(S_j)$) is greater than the preset maximum bandwidth usage (Max Value), as illustrated in FIG. 38, it is determined that the I/O bandwidth of the streaming server is exhausted because the I/O performance required by the user device exceeds the I/O performance of the streaming server, and thus extending the I/O performance of the streaming server using data replication may be performed.

Figure 39:
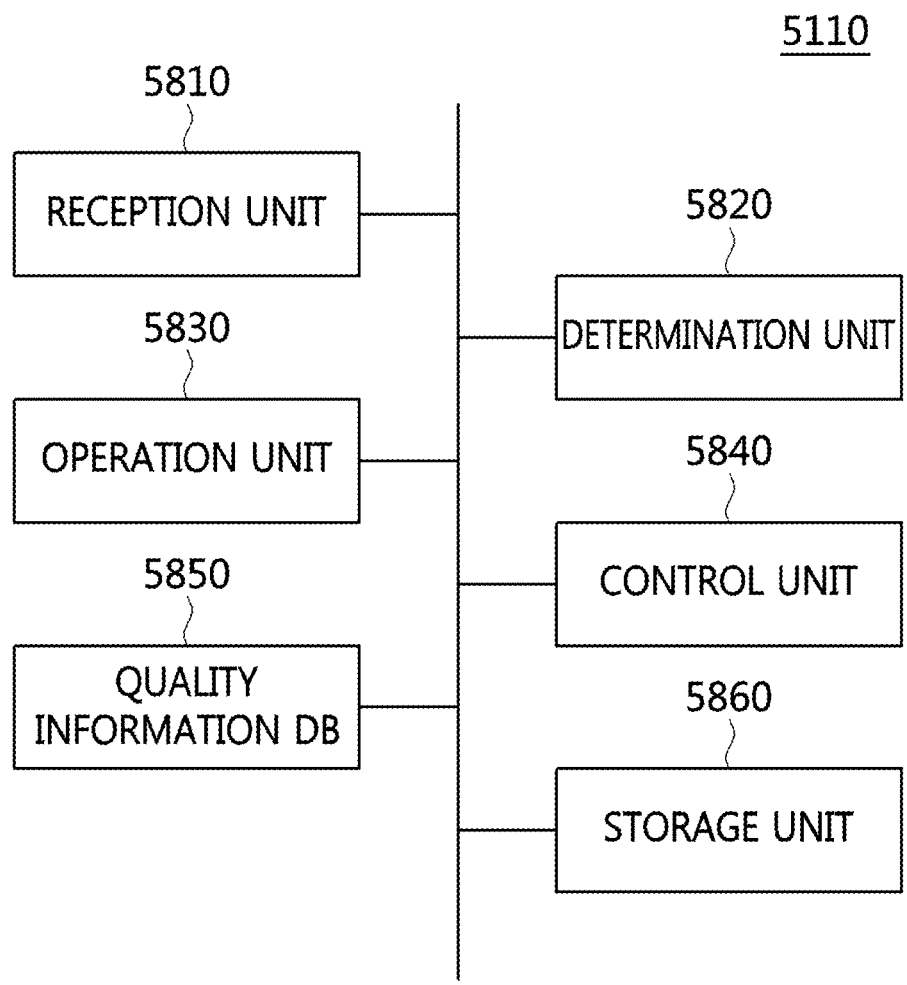
FIG. 39 is a block diagram that shows an example of the quality management server illustrated in FIG. 32.

FIG. 39 is a block diagram that shows an example of the quality management server illustrated in FIG. 32.

Referring to FIG. 39, the quality management server 5110 illustrated in FIG. 32 includes a reception unit 5810, a determination unit 5820, an operation unit 5830, a control unit 5840, a quality information database 5850, and a storage unit 5860.

The reception unit 5810 receives service quality information from at least one of a user device and a streaming server.

Here, each of the user device and the streaming server may collect and analyze service quality information while the streaming service is operating, and may transmit the service quality information to the quality management server.

Because the components and operations of the user device and the streaming server have been described with reference to FIGS. 34 to 37, a description thereof will be omitted.

Here, the service quality information received from the user device and the streaming server may be stored in the quality information database 5850.

The determination unit 5820 determines whether the quality of the service provided to the user device is degraded using the service quality information.

Here, the service quality information stored in the quality information database 5850 may be extracted based on time information, and may be used to analyze whether the quality of the service provided to the user device is degraded.

Here, when at least one of the state in which the response time of the read operation of the user device is longer than a preset maximum response time and the state in which the service bandwidth of the user device is less than a preset minimum bandwidth is maintained longer than a preset duration, it may be determined that the quality of the service provided to the user device is degraded.

Here, the preset duration may be freely set and changed by a streaming service administrator.

The operation unit 5830 selects a quality assurance activity in consideration of the quality state of at least one of the user device and the streaming server when it is determined that the quality of the service provided to the user device is degraded.

Here, in consideration of at least one of the response time of the read operation of the user device, the service bandwidth of the user device, the bandwidth used by the streaming server, and the number of users accessing the streaming server, the quality assurance activity may be selected.

Here, the bandwidth used by the streaming server and the number of users accessing the streaming server may be information about the streaming server that is associated with the user device that is determined to be provided with the service having the degraded quality.

Here, when the service bandwidth of the user device is less than a preset minimum bandwidth, when the number of users accessing the streaming server is less than the preset maximum number of users, and when the bandwidth used by the streaming server is greater than a preset maximum bandwidth usage, extending the I/O performance of the streaming server using data replication may be selected as the quality assurance activity. That is, the exhaustion of the bandwidth allocated for the I/O operation of the streaming server means that the I/O performance required by the user device exceeds the I/O performance of the streaming server. Accordingly, in order to improve the I/O performance of the streaming server, extending the I/O performance of the streaming server using data replication may be performed.

Also, when the response time of the read operation of the user device is longer than the preset maximum response time, when the service bandwidth of the user device is greater than the preset minimum bandwidth, and when the bandwidth used by the streaming server is less than the preset maximum bandwidth usage, migration of the streaming server may be selected as the quality assurance activity. In this case, because the service bandwidth of the user device and the I/O performance of the streaming server are satisfactory, the latency of the response to the read operation is increased due to the long distance between the user device and the streaming server or due to a problem with the network. Therefore, the streaming server may be migrated.

Also, when the service bandwidth of the user device is less than the preset minimum bandwidth, when the bandwidth used by the streaming server is greater than the preset maximum bandwidth usage, and when the number of users accessing the streaming server is greater than the preset maximum number of users, replication of the streaming server may be selected as the quality assurance activity.

The control unit 5840 extends the performance of the streaming service without interruption of service by scaling up the streaming server based on two or more nodes when extending the I/O performance of the streaming server using data replication is selected.

Here, when the streaming server corresponding to a master node, which is any one of the two or more nodes, receives streaming data, the master node calls slave nodes, which are the remaining nodes exclusive of the master node from the two or more nodes, thereby storing the streaming data.

For example, two or more candidate nodes are selected from among multiple nodes included in a cloud system, any one of the candidate nodes is selected as a master node, and the remaining candidate nodes, exclusive of the master node, are selected as slave nodes. That is, the master node may be a single node, and the multiple slave nodes may be operated by being called by the master node.

Here, a virtual machine is created in the master node, whereby a streaming server on which a remote memory management submodule for calling the slave nodes is running may be operated.

Also, a virtual machine is created in the slave node, whereby a streaming server on which a local memory management submodule for replicating streaming data from a block level is running may be operated.

Here, because the remote memory management submodule running on the streaming server corresponding to the master node and the local memory management submodule running on the streaming server corresponding to the slave node have been described with reference to FIG. 37, a description thereof will be omitted.

Here, the local memory management submodule may replicate streaming data into a block device in consideration of at least one of a preset replication period and the amount of memory used in the slave node. For example, the block device may be a storage device such as a Hard Disk Drive (HDD).

The storage unit 5860 stores various kinds of information generated in the above-described quality management server according to an embodiment of the present invention.

According to an embodiment, the storage unit 5860 is configured so as to be separate from the quality management server, thereby supporting the function for improving the performance of the streaming service. Here, the storage unit 5860 may operate as separate mass storage, and may include a control function for the operation.

Meanwhile, the quality management server may store information in memory installed therein. In an embodiment, the memory is a computer-readable recording medium. In an embodiment, the memory may be a volatile memory unit, and in another embodiment, the memory may be a nonvolatile memory unit. In an embodiment, the storage device is a computer-readable recording medium. In different embodiments, the storage device may include, for example, a hard disk device, an optical disk device, or any other kind of mass storage.

Also, the quality management server according to an embodiment of the present invention may perform quality management and performance extension by consistently receiving information about service quality from the user device and the streaming server when the operation performed as the result of the quality assurance activity in the streaming server is confirmed.

Through the quality management server, the performance of a streaming service may be improved using a scale-up method without interruption of streaming service in order to support a stable cloud streaming service.

Also, a method using remote memory, which may provide better performance than data storage and management using a block device such as an HDD, is provided, whereby the I/O performance of the cloud streaming service may be improved without the purchase or installation of additional hardware. Also, information about the quality of the streaming service is periodically collected from the user device and the streaming server, whereby the service state may be monitored.

Figure 40:
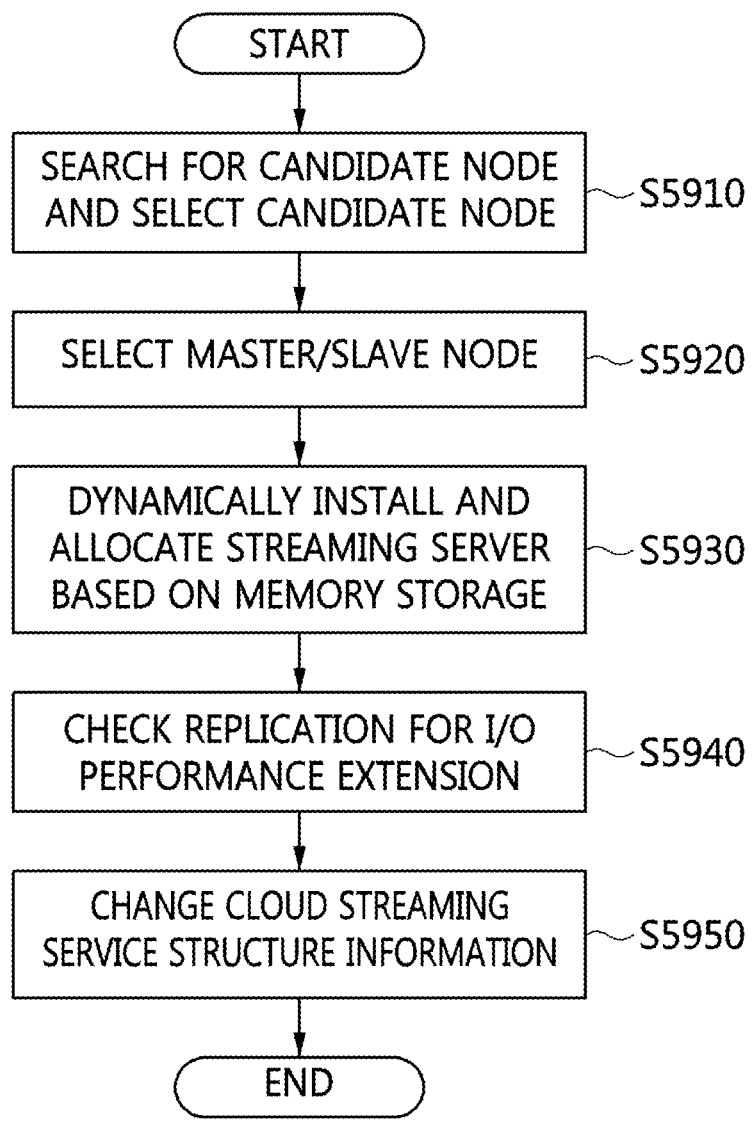
FIG. 40 is a flowchart that shows the process of extending the I/O performance of a streaming server through data replication according to an embodiment of the present invention.

FIG. 40 is a flowchart that shows the process of extending the I/O performance of a streaming server using data replication according to an embodiment of the present invention.

Referring to FIG. 40, in the process of extending the I/O performance of a streaming server using data replication according to an embodiment of the present invention, first, a quality management server may search for and select two or more candidate nodes at step S5910 for extending the I/O performance of a streaming server using data replication.

Then, any one of the two or more candidate nodes may be selected as a master node, and the remaining nodes may be selected as slave nodes at step S5920.

Then, the quality management server creates a virtual machine in the master node, thereby operating a streaming server on which a remote memory management submodule for calling a slave node is running. Also, the quality management server creates a virtual machine in each of the slave nodes, thereby operating a streaming server on which a local memory management submodule for replicating streaming data from a block level is running at step S5930.

Then, the quality management server may check whether data replication for scaling up the I/O performance is successfully performed at step S5940 by checking the operation after connecting the master node with the slave node.

Then, the quality management server may update information about the structure of a streaming service based on a cloud at step S5950.

Figure 41:
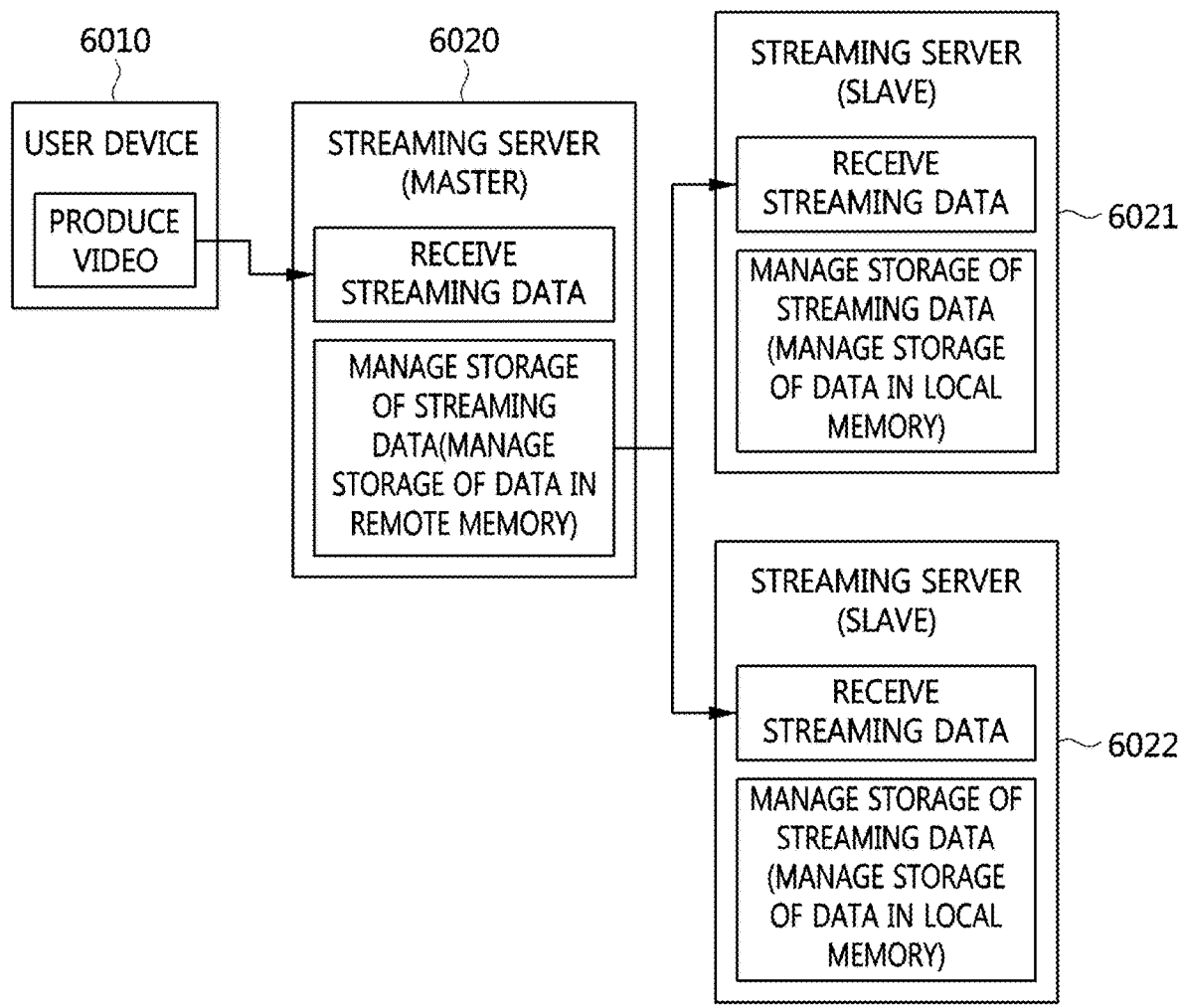
FIG. 41 is a view that shows the process of providing a streaming service through replication according to the present invention.

FIG. 41 is a view that shows the process of providing a streaming service through the extension of the I/O performance of a streaming server using data replication according to the present invention.

Referring to FIG. 41, in the process of providing a streaming service through the extension of the I/O performance of a streaming server using data replication according to the present invention, first, a user produces video using a user device 6010 and requests a streaming server corresponding to a master node 6020 to store the produced video.

Here, the user device 6010 may transmit streaming data to the streaming server corresponding to the master node 6020.

Here, the streaming server corresponding to the master node 6020 may request a streaming data storage management module to store the data received from the user device.

Here, the streaming data storage management module of the master node 6020 may transmit the corresponding data to the streaming servers corresponding to the slave nodes 6021 and 6022, which are to store the data.

Then, the streaming servers corresponding to the slave nodes 6021 and 6022 receive the data and store the received data in the local memory thereof.

Figure 42:
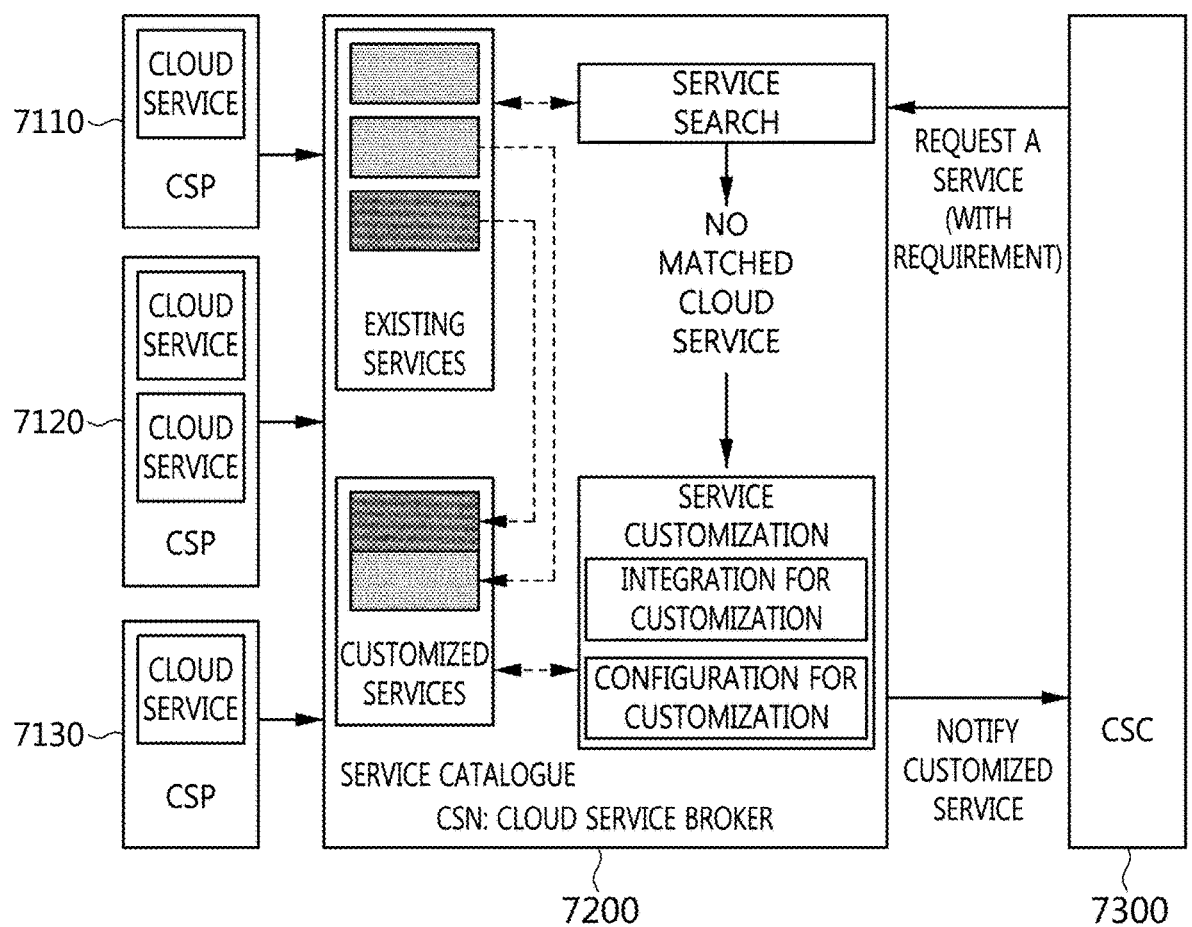
FIG. 42 is a view that shows an embodiment in which a virtual cloud service is provided through cloud service brokerage based on multiple clouds.

FIG. 42 is a view that illustrates an embodiment in which a virtual cloud service is provided through cloud service brokerage based on multiple clouds. This view shows an embodiment through which a cloud service may be implemented as a customized service.

This embodiment includes cloud service providers (CSPs) 7110, 7120 and 7130, a cloud service broker (CSB) 7200, and a cloud service client (CSC) 7300.

The CSB 7200 receives a request for a virtual cloud service depending on the requirements from the CSC 7300.

The CSB 7200 may provide the CSC 7300 with information about various services that may be provided by the CSPs 7110, 7120 and 7130 using a service catalogue.

Depending on the service requirements, the CSC 7300 may request an additional service, other than the services specified in the service catalogue, from the CSB. The service requirements may be generated using various parameters, in which case the parameters may include, for example, a service name, the amount of required resources, required service levels, required software, required components, configurations, and the like.

The CSB 7200 retrieves the service requested by the CSC 7300 from the existing services specified in the service catalogue.

Because the CSB 7200 and the CSC 7300 share a template for cloud service requirements, the CSB 7200 may understand the requirements of the CSC 7300.

The cloud service requirement template includes information about the SLA of a cloud service, and may also include information about the quality of the cloud service, the price thereof, policy violations, and the like. The cloud service requirement template may provide the details of the cloud service, for example, information about a virtual machine, the OS, applications, and the like.

When the CSB 7200 does not satisfy the requirements for the requested service and does not retrieve the requested service, the CSB 7200 may create a service customized for a user through a service creation process using some or all of the services included in the service catalogue.

This drawing shows an example in which the CSB 7200 creates a service customized for the user by integrating or configuring some or all of the existing services.

The CSB 7200 may register the newly created customized service in the service catalogue.

The CSB 7200 reports information about the customized service to the CSC 7300, and the CSC 7300 may decide whether to use the customized service based thereon.

That is, when the CSB 7200 creates a customized service, the CSB 7200 may create the new customized service by layering or combining process functions and new data.

The CSB 7200 may collect cloud services that may be provided by the CSPs 7110, 7120 and 7130, create and manage a cloud service catalogue that includes the list of the collected cloud services, and add the newly created customized cloud service in the service catalogue.

The CSB 7200 may receive the requests for cloud services and process orders for the cloud services of the multiple CSPs 7110, 7120 and 7130 on behalf of the CSC 7300. This is called 'cloud service combined ordering'.

Meanwhile, the CSB 7200 may provide a cloud service that is created by appropriately combining cloud service catalogues collected from the CSPs 7110, 7120 and 7130 and by performing cloud service integration and cloud service customization. Here, the process of appropriately combining the cloud service catalogues is called 'cloud service orchestration'.

For reference, the process in which the CSB 7200 merely collects multiple cloud services received from the CSPs 7110, 7120 and 7130 without change is called 'cloud service aggregation'. Meanwhile, the process in which the CSB 7200 creates another service with a different value by altering and combining multiple cloud services received from the CSPs 7110, 7120 and 7130 is called 'cloud service integration'.

Meanwhile, the CSB 7200 and the CSC 7300 may create a Service Level Agreement (SLA) in order to use the customized service.

When cloud service aggregation is performed, the CSB 7200 may manage the unified life cycle of cloud services provided by the multiple CSPs 7110, 7120 and 7130 based on the integrated and unified SLA.

When the CSB 7200 is not able to create a customized cloud service with registered services, the CSB 7200 may request the related CSPs 7110, 7120 and 7130 to alter the registered services so as to be suitable for the customized service.

When cloud service migration is performed, the CSB 7200 searches a service catalogue for a service that is the same as the currently provided service or a service at the same level as the currently provided service and selects the found service, thereby maintaining the same service or the same level of service during cloud service migration.

Also, preparation for a new service is checked in order to prevent data loss during cloud service migration. In this case, termination of the existing service may be delayed until the CSB 7200 confirms that the preparation is completed.

Figure 43:
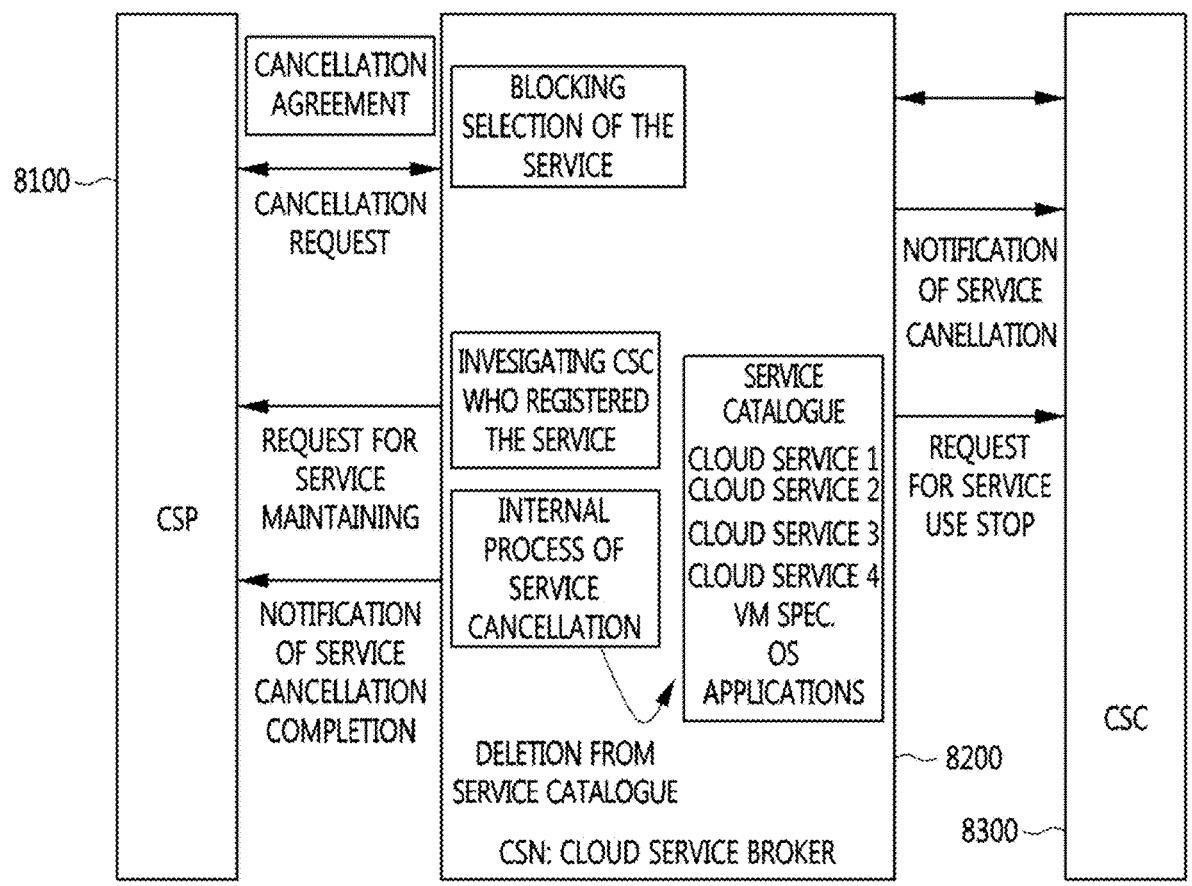
FIG. 43 is a view that shows another embodiment in which a virtual cloud service is provided through cloud service brokerage based on multiple clouds.

FIG. 43 is a view that shows another embodiment in which a virtual cloud service is provided through cloud service brokerage based on multiple clouds. The process of cancelling a provided or requested cloud service will be described as follows with reference to this view. The embodiment in which a cloud service is provided through cloud service brokerage may include a cloud service provider (CSP) 8100, a cloud service partner (CSN); cloud service broker 8200, and a cloud service client (CSC) 8300. In the embodiments to be described, the cloud service broker may be understood as assisting the cloud service partner (CSN), and may be referred to as a 'CSN' as shown in the drawing.

The CSP 8100 may register or deregister a cloud service.

The CSP 8100 may receive information about the conditions and status of cloud services managed in the CSN 8200.

Service cancellation may be performed after a contract is made between the CSP 8100 and the CSN 8200. Service cancellation may be performed in response to a request from the CSP 8100 or the CSN 8200. The CSP 8100 may cancel the service when it is impossible to change or use the service during provision of the cloud service. The CSN 8200 may request cloud service cancellation when the CSP 8100 violates the contract.

When the service is cancelled as agreed upon between the CSN 8200 and the CSP 8100, the CSN 8200 prevents the corresponding service from being retrieved or blocks selection of the corresponding service when a CSC 8300 requests a service, and deletes the corresponding service on the workspace from the service catalogue.

The CSN 8200 enquires about CSCs 8300 that are connected in order to use the service and notifies the registered CSCs 8300 of service cancellation. If the CSC 8300 is using the service at the time of receiving the notification, the CSN 8200 may request the CSP 8100 to maintain the service until the CSC 8300 finishes use of the corresponding service. Then, the CSN 8200 may cancel the contract corresponding to the cloud service between the CSN 8200 and the CSC 8300 or renew the contract in consideration of cancellation of the service.

In order to complete service cancellation, the CSN 8200 may perform an internal process for service cancellation. The CSN 8200 may remove the cancelled service from the service catalogue. Also, the CSN 8200 may delete or invalidate information related to the service, such as the account of the CSC 8300 and the like, and may deactivate monitoring of the service. The CSN 8200 may block access to the service by disabling the API of the CSP 8100, through which the CSC 8300 is connected with the CSP 8100.

The CSN 8200 may notify the CSP 8100 of completion of service cancellation.

Accordingly, as described in the embodiment, the CSN 8200 may cancel the cloud service registered in the service catalogue as agreed upon between the CSP 8100 and the CSN 8200.

The service cancellation process may be automatically performed under the management of the CSN 8200 after the service cancellation is confirmed.

The CSN 8200 may send notification of service cancellation to the CSC 8300, thereby preventing the CSC 8300 from using the corresponding service.

If the CSC 8300 is using the service when it receives notification of cancellation of the service, the CSN 8200 may request the CSP 8100 to cancel the service after the CSC 8300 finishes using the corresponding service.

Figure 44:
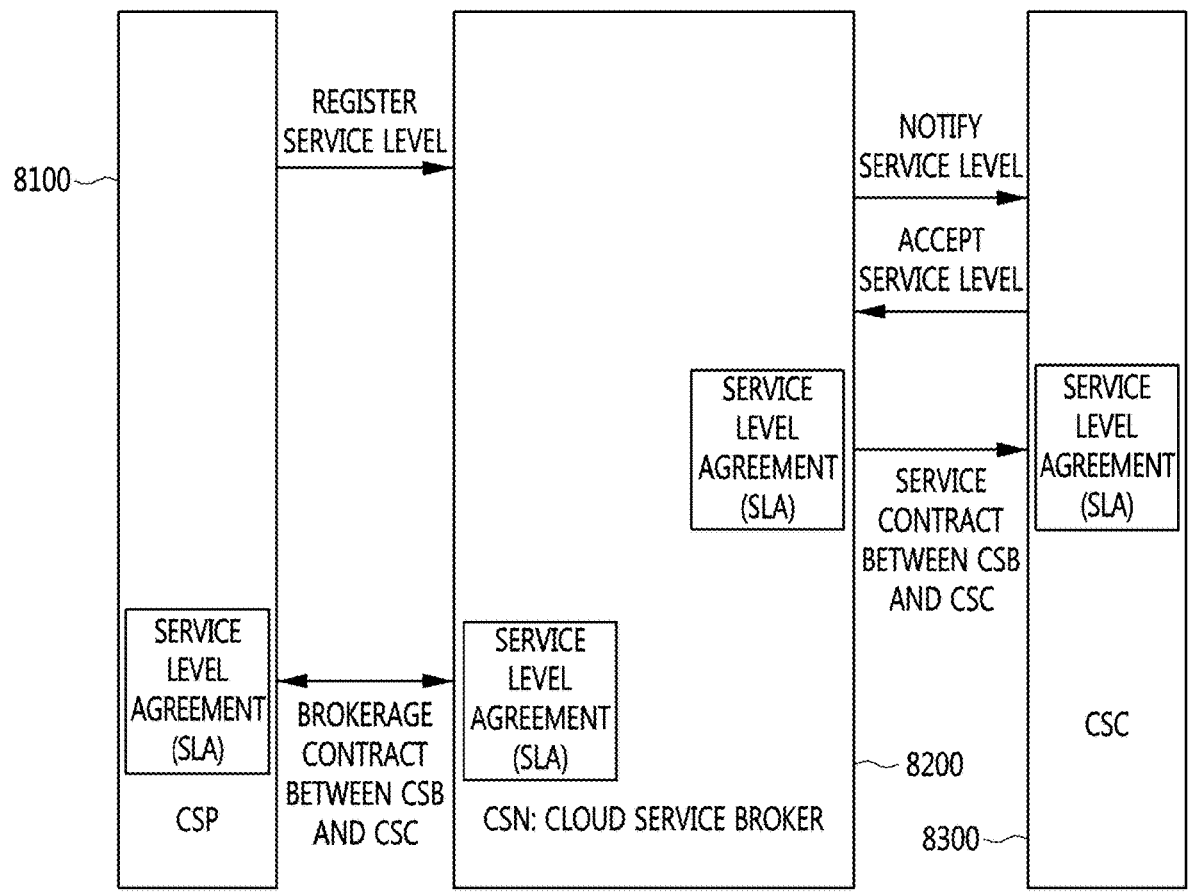
FIG. 44 is a view that shows still another embodiment in which a virtual cloud service is provided through cloud service brokerage based on multiple clouds.

FIG. 44 is a view that shows still another embodiment in which a virtual cloud service is provided through cloud service brokerage based on multiple clouds. With reference to this view, cloud service brokerage operations related to contracts for providing a customized service and fulfillment of the contracts will be described as below.

The embodiment in the drawing shows an example of reaching a Service Level Agreement (SLA). This embodiment includes a cloud service provider (CSP) 8100, a cloud service broker (CSN) 8200, and a cloud service client (CSC) 8300.

An SLA is part of a cloud service contract, and includes service level objectives and the qualitative service objectives of a provided cloud service.

A logical component for contract management within the CSN 8200 manages the SLA between the CSN and a CSC.

The SLA may include the entire agreement pertaining to the contract, such as the detailed description of a cloud service, a service level based on service quality, the price of the cloud service, remedial action to be taken when the service fails to fulfill the terms of the contract, and the like. The logical component of a cloud service provided through cloud service brokerage creates an SLA and notifies the CSC 8300 of creation of the SLA. When it fails to meet the defined service level, the logical component for contract management may take remedial action in response to violation of the SLA between the CSN and the CSC. The logical component for contract management may be related to retrieval of the optimal cloud service requested by the CSC and configuration of the service.

The CSN 8200 monitors and checks the service level, thereby detecting whether the SLA is fulfilled properly.

Because the CSN 8200 communicates with the CSC 8300 to consume the cloud service, the CSN 8200 is responsible for writing an SLA with the CSC 8300. Here, because the CSP 8100 provides information about a service level to the CSN, the CSN may acquire the information about an achievable service level.

When a CSP 8100 intends to provide a cloud service via the CSN 8200, the CSP 8100 registers cloud service information including a service level in the workspace of the CSN 8200. For example, the CSP 8100 may provide service level information about service availability, which is expressed as a percentage of the total time during which a cloud service is available in a given period. The CSP 8100 may register the lower bound on the service level (e.g., 99%) or events that violate the SLA in the CSN 8200.

The CSN 8200 may receive information for accessing the cloud service from the CSP 8100 and provide the same to the authenticated CSC 8300. In this case, the CSN 8200 may not disclose or store the information.

The CSN 8200 assesses all services with a service level description registered in the CSP 8100.

The CSP 8100 may repackage a brokerage service registered therein depending on requirements such as service customization, service integration, and the like. The CSN 8200 may provide the service levels of services required by the CSC. For example, the CSN 8200 may repackage a service and provide the service with 99.98% availability when the service level of the existing service registered in the CSP 8100 is 99.99%.

When the CSC 8300 wants a service that satisfies at least 99.99% availability, the CSC 8300 may connect to the workspace of the CSN 8200 and select a cloud service in consideration of the corresponding requirement.

After the CSC 8300 selects a cloud service, the CSN 8200 may create an SLA document and provide the same to the CSC 8300. When the CSC 8300 accepts the contract and the conditions in the document, the SLA between the CSC 8300 and the CSN 8200 may be signed.

After the SLA between the CSC 8300 and the CSN 8200 is signed, the CSN 8200 requests the CSP 8100 to initialize a service. When the CSN 8200 requests a service from the CSP 8100, an SLA between the CSP 8100 and the CSN 8200 is signed based on the service level description registered in the CSP 8100.

In this case, the CSP 8100 has already registered service information including the service level in the workspace of the CSN 8200.

According to this embodiment, the CSN 8200 provides an interface for the CSC 8300, whereby service level objectives based on the requirements of the CSC 8300 may be found and selected.

The CSN 8200 may include functions of managing the signed SLA documents or contract.

The CSN 8200 provides an SLA model through which terms, conditions, or content related to a cloud service may be described.

Figure 45:
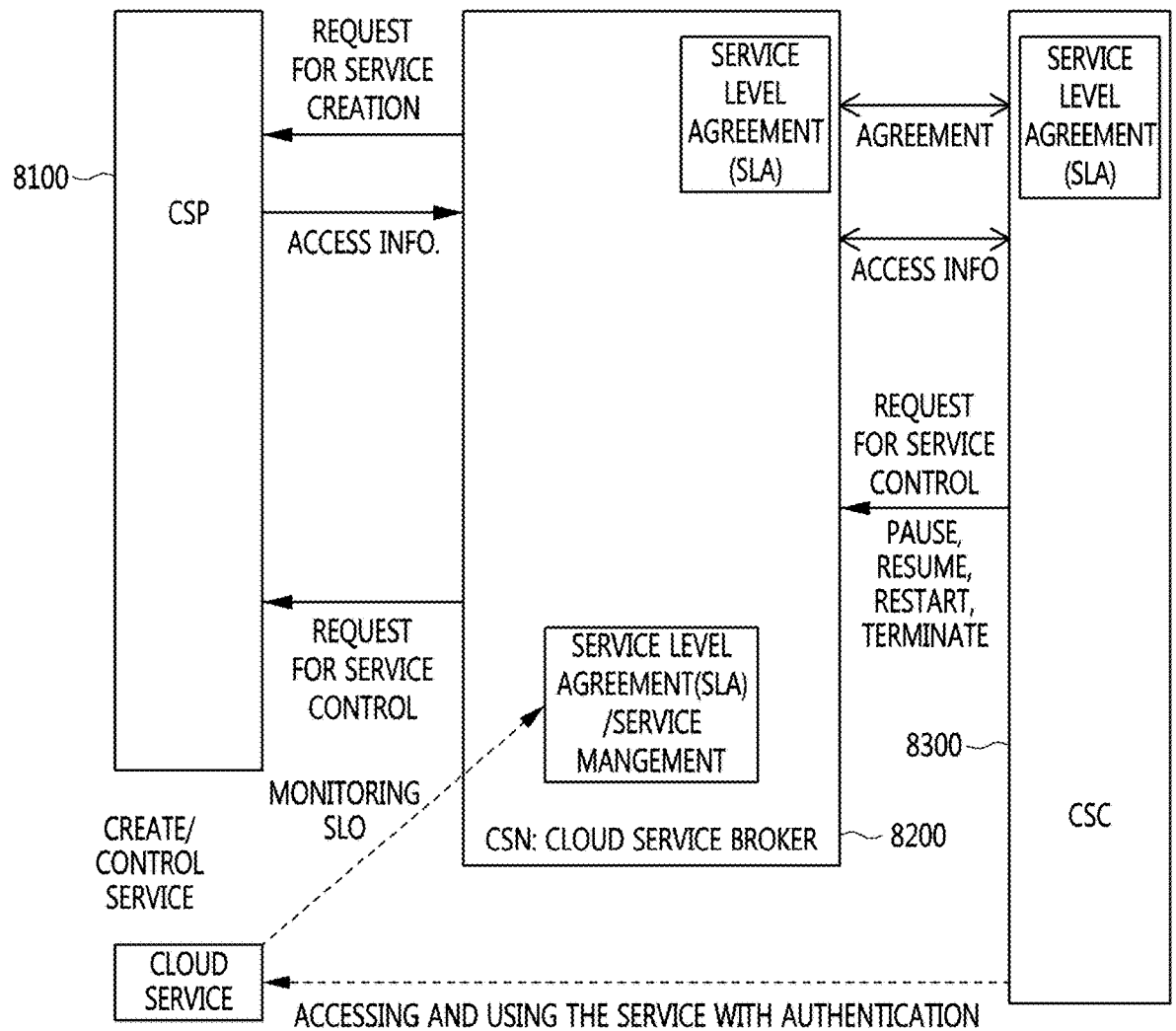
FIG. 45 is a view that shows still another embodiment in which a virtual cloud service is provided through cloud service brokerage based on multiple clouds.

FIG. 45 is a view that shows still another embodiment in which a virtual cloud service is provided through cloud service brokerage based on multiple clouds. Using this view, an embodiment in which a service life cycle is managed through cloud service brokerage will be disclosed. This embodiment shows an example of providing a cloud service to a CSC and managing the service during a service period.

First, on behalf of a CSC 8300, the CSN 8200 requests the CSP 8100 to create a service by providing service requirements thereto.

The CSP 8100, having received the request, creates a service depending on the service requirements.

The CSP 8100 may notify the CSN 8200 of creation of the service, and may also provide information for accessing the service to the CSN 8200. In this case, the information may be an access point identifier of the CSN 8200, a password, and the like.

The CSN 8200 delivers the information for accessing the service to the authenticated CSC 8300.

The CSC 8300 may access and use the created service using the received information.

Meanwhile, the CSN 8200 may manage an SLA during the service period.

The CSN 8200 may periodically monitor a service in order to check a service level. For example, in the SLA signed between the CSN 8200 and the CSC 8300, an SLA that says service availability must be higher than 99.98% may be specified.

When it detects that a service level is lower than the service level agreed upon in the SLA, the CSN 8200 may notify the CSC 8300 of the violation. In the above example, when the measured availability is lower than 99.98%, the violation may be made known to the CSC 8300. Here, the CSN 8200 may take a penalty action for the violation based on the SLA. For example, scaling up the service, providing bonus points to the CSC 8300, and the like may be included in such a penalty action.

Also, when the violation is caused by the CSP 8100 operating the corresponding service, the CSN 8200 and the CSP 8100 may resolve the violation by agreement therebetween.

When the CSC 8300 controls a service during the service period by sending a service control request to the CSN 8200, the service life cycle may be managed as follows.

The CSN 8200 registers information requested by the CSC 8300.

The CSN 8200 transmits a service control request (e.g., interruption, resumption restart, or the like of a service) to the CSP 8100 that is operating the service.

The CSP 8100 controls the corresponding service in response to the request from the CSN 8200 and responds to the CSN 8200 with the control result.

The CSN 8200 checks whether the service is operating normally by checking the control result.

The CSN 8200 announces the result of the processed request to the CSC 8300 through the workspace.

During the service period, the CSC 8300 may request the CSN 8200 to stop or terminate the created service.

The CSN 8200 may deliver the request to the CSP 8100 that is operating the service.

The CSP 8100 stops or terminates the service in response to the request from the CSN 8200 and responds to the CSN 8200 with the result.

The CSN 8200 may check whether the service is stopped or terminated normally.

The CSN 8200 may announce stoppage or termination of the corresponding service to the CSC 8300 through the workspace, and may provide information about the service fee.

According to this embodiment, the CSN 8200 provides an interface through which the service control request made by the CSC 8300 is capable of being processed, thereby enabling the service to be controlled in response to the request and providing the function of managing a service life cycle.

When it receives a request for service control from the CSC 8300, the CSN 8200 may check whether the cloud service is provided or changed normally in response to the request.

The CSN 8200 may repeatedly check the status of the service based on a service control check period by communicating with the CSP 8100. In this case, the CSN 8200 may check whether the control request is processed. The service control check period is a time period for checking the status of the service. With regard to this, the embodiment for improving the performance in FIGS. 32 to 41 may be referred to.

As described above, the CSN 8200 may manage a history in which the checking results are recorded, and may store or manage information about the time required to complete the deletion of a cloud service when verification of the service control status is finished.

The CSN 8200 may provide the function of monitoring the status of a cloud service. The CSN 8200 monitors and checks a service level, thereby checking whether the SLA is violated. The CSN 8200 may include the function of compensating for violation of the SLA. The function of compensation may include migration of a cloud service, scaling up the service, extension of a service use period, and the like.

The CSN 8200 may monitor the status of the logical resources (e.g., virtual machines) of the cloud service. When a CSC 8300 requires additional cloud services, the CSN 8200 may request the additional cloud services from the CSP 8100.

According to an embodiment, a cloud service broker may earn profit while satisfying the quality of service required by a cloud service consumer. When a cloud service requested by a cloud service consumer is deployed in a cloud, the use of multiple clouds may reduce costs. Also, a cloud service consumer may be provided with a cloud service at a lower price, and a cloud service broker may increase revenue when the cloud service broker profits from brokerage.

Furthermore, the present invention may be applied not only to a cloud service brokerage platform but also to a cost-effective service deployment method in a multiple-cloud environment, which is a kind of cloud service brokerage platform, or in a single large-scale cloud environment in which distributed data centers are managed.

According to the present invention, various clouds services that meet user requirements may be provided by offering intermediation for multiple heterogeneous cloud services that are geographically dispersed.

Also, the prevent invention may support fast service deployment using a service image store.

Also, the present invention may stimulate an open cloud service market by eliminating the complication in configuration and settings of a service and supporting circulation of the registration, sale, sharing, and acquisition of a service image.

The method and apparatus for cloud service brokerage according to an embodiment of the present invention are configured such that cloud service providers register the services to sell and a cloud service consumer inputs requirements for a desired service in a heterogeneous cloud-computing environment including multiple cloud service providers. Here, a cloud service broker analyzes the requirements of the cloud service consumer, selects and offers the optimal cloud service provider that matches the requirements, and manages connection with a cloud so that the cloud service consumer is provided with the optimal service.

Also, the cloud service broker forms a service catalogue in which cloud services are categorized, whereby information about services registered by cloud service providers and service requirements of a cloud service consumer may be easily made known, and a service may be easily retrieved. Also, the brokerage and management efficiency of cloud service brokerage may be maximized.

The present invention may reduce the communication load of a system operating in connection with clouds and the communication load of multiple cloud-computing systems, and may improve the speed of service control.

Also, the present invention may improve the responsiveness and Quality of Experience (QoE) of a system operating in connection with a cloud and multiple cloud-computing systems.

Also, the present invention may accurately predict the time at which service control is completed and set a check period using a statistical prediction method.

According to the present invention, the performance of a streaming service may be improved using a scale-up method without interrupting the streaming service in order to support a stable cloud streaming service.

Also, the present invention provides a remote memory usage method that exhibits better performance than data storage and management using a block device such as a hard disk drive (HDD), thereby improving the input/output (I/O) performance of a cloud streaming service without the purchase or installation of additional hardware.

Also, the present invention periodically collects information about the quality of a streaming service from a user device and a streaming server, whereby a service state may be monitored.

What is claimed is:

1. A method of providing a cloud brokerage service based on multiple cloud-computing systems, the method comprising:
    receiving, by a cloud service broker, a first request from a cloud service client, wherein the cloud service broker is connected with the multiple cloud-computing systems;
    providing, by the cloud service broker, a cloud service brokerage based on multiple cloud services of the multiple cloud-computing systems, wherein the cloud service broker creates a newly customized cloud service complying with the first request and provides the newly customized cloud service to the cloud service client;
    monitoring, by the cloud service broker, a service level of the newly customized cloud service during provision of the newly customized cloud service; and
    controlling, by the cloud service broker, the newly customized cloud service such that the service level satisfies conditions of the first request,
    wherein the cloud service broker delivers a service control request for the newly customized cloud service from the cloud service client to a cloud computing system among the multiple cloud-computing systems,
    wherein the cloud service broker initiates validation of a service control status of the newly customized cloud service only after the cloud service broker receives acknowledgement for the service control request from the cloud computing system, and
    wherein the cloud service broker provides a checking period for the validation of the service control status by predicting completion time of service control.

2. The method of claim 1, further comprising:
    transmitting, by the cloud service broker, a second request for additional cloud resources for the newly customized cloud service to one or more cloud-computing systems of the multiple cloud-computing systems when the cloud service client sends the second request for the additional cloud resources.

3. The method of claim 2, wherein the cloud service broker takes remedies in terms of a service level agreement when the newly customized cloud service fails to meet the first or second request.

4. An apparatus for providing a cloud brokerage service based on multiple cloud-computing systems, the apparatus comprising:
    a receiver for receiving a first request from a cloud service client;
    a controller for providing a cloud service brokerage based on multiple cloud services of the cloud-computing systems, creating a newly customized cloud service complying with the first request and provides the newly customized cloud service to the cloud service client, monitoring a service level of the newly customized cloud service during provision of the newly customized cloud service, and controlling the newly customized cloud service such that the service level satisfies conditions of the first request,
    wherein the apparatus delivers a service control request for the newly customized cloud service from the cloud service client to a cloud computing system among the multiple cloud-computing systems,
    wherein the apparatus initiates validation of a service control status of the newly customized cloud service after receiving acknowledgement for the service control request from the cloud computing system, and
    wherein the apparatus provides a checking period for the validation of the service control status by predicting completion time of service control.

5. The apparatus of claim 4, wherein the controller further performs:
    when the cloud service client sends a second request for additional cloud resources for the newly customized cloud service, transmitting the second request for the additional cloud resources to one or more cloud-computing systems of the multiple cloud-computing systems.

6. The apparatus of claim 5, wherein the controller takes remedies in terms of a service level agreement when the newly customized cloud service fails to meet the first or second request.

7. A non-transitory memory for storing a program that provides a cloud brokerage service based on multiple cloud-computing systems, the memory comprising:
    a receiving module for receiving a first request from a cloud service client; and
    a control module for providing a cloud service brokerage based on multiple cloud services of the cloud-computing systems, creating a newly customized cloud service complying with the first request, providing the newly customized cloud service to the cloud service client, monitoring a service level of the newly customized cloud service during provision of the newly customized cloud service, and controlling the newly customized cloud service such that the service level satisfies conditions of the first request,
    wherein a service control request for the newly customized cloud service is delivered from the cloud service client to a cloud computing system among the multiple cloud-computing systems,
    wherein validation of a service control status of the newly customized cloud service is initiated after receiving acknowledgement for the service control request from the cloud computing system, and wherein a checking period for the validation of the service control status is provided by predicting completion time of service control.

\* \* \* \* \*